US008045014B2

(12) United States Patent
Fujiwara et al.

(10) Patent No.: US 8,045,014 B2
(45) Date of Patent: Oct. 25, 2011

(54) AUTO WHITE BALANCE CORRECTION VALUE CALCULATION DEVICE, METHOD, PROGRAM, AND IMAGE PICKUP DEVICE

(75) Inventors: Shinya Fujiwara, Miyagi (JP); Tomokazu Nakamura, Miyagi (JP); Kenkichi Hayashi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 454 days.

(21) Appl. No.: 12/174,541

(22) Filed: Jul. 16, 2008

(65) Prior Publication Data

US 2009/0021602 A1    Jan. 22, 2009

(30) Foreign Application Priority Data

Jul. 17, 2007 (JP) ................................ 2007-185873

(51) Int. Cl.
 *H04N 9/73* (2006.01)
 *H04N 5/228* (2006.01)
 *G06K 9/00* (2006.01)
(52) U.S. Cl. .................. 348/223.1; 348/222.1; 382/167; 382/162
(58) Field of Classification Search ..... 348/222.1–225.1
 See application file for complete search history.

(56) References Cited

U.S. PATENT DOCUMENTS

| | | | |
|---|---|---|---|
| 6,678,407 B1 * | 1/2004 | Tajima | 382/167 |
| 6,975,759 B2 | 12/2005 | Lin | |
| 7,146,041 B2 * | 12/2006 | Takahashi | 382/167 |
| 7,148,921 B2 * | 12/2006 | Ikeda et al. | 348/223.1 |
| 7,573,505 B2 * | 8/2009 | Kawaguchi et al. | 348/222.1 |
| 2003/0169348 A1 * | 9/2003 | Ikeda et al. | 348/223.1 |
| 2006/0284991 A1 * | 12/2006 | Ikeda | 348/223.1 |
| 2007/0070214 A1 * | 3/2007 | Nakamura | 348/222.1 |
| 2009/0002519 A1 * | 1/2009 | Nakamura | 348/223.1 |

FOREIGN PATENT DOCUMENTS

| | | |
|---|---|---|
| JP | 11-283025 A | 10/1999 |
| JP | 2005-531189 A | 10/2005 |
| JP | 2006-33519 A | 2/2006 |
| JP | 2006-352795 A | 12/2006 |
| JP | 2008-236101 A | 10/2008 |

OTHER PUBLICATIONS

Explanation of Circumstances Concerning Accelerated Examination dated Sep. 14, 2010.
Japanese Office Action—Notice of Reasons for Rejection, Dec. 9, 2010.

* cited by examiner

*Primary Examiner* — Sinh Tran
*Assistant Examiner* — Christopher K Peterson
(74) *Attorney, Agent, or Firm* — Birch, Stewart, Kolasch & Birch, LLP

(57) ABSTRACT

A normal AWB (auto white balance) correction value is calculated based on inputted image data. Further, a face area is identified from the inputted image data and a face AWB correction value is calculated based on image data in the face area. Then, first feature data and second feature data are extracted from the inputted image data and image data in the face area, respectively. A total AWB correction value is calculated in accordance with at least one of the face AWB correction value and the normal AWB correction value based on a comparison result of the first feature data and the second feature data. Thus, an erroneous correction can be prevented in an AWB correction using a face detection function.

14 Claims, 52 Drawing Sheets

$$L = \sqrt{(normalR/G - faceR/G)^2 + (normalB/G - faceB/G)^2}$$

L : DIFFERENCE (DISTANCE) BETWEEN LIGHT SOURCE COLORS
normalR/G : R/G COMPONENTS OF LIGHT SOURCE COLOR OF NORMAL AWB
normalB/G : B/G COMPONENTS OF LIGHT SOURCE COLOR OF NORMAL AWB
faceR/G : R/G COMPONENTS OF LIGHT SOURCE COLOR OF FACE AWB
faceB/G : B/G COMPONENTS OF LIGHT SOURCE COLOR OF FACE AWB

IMAGE DATA

ESTIMATE LIGHT SOURCE COLOR FROM ENTIRE COLOR DISTRIBUTION OR THE LIKE

ESTIMATE LIGHT SOURCE COLOR FROM FACIAL COLOR (WHITE BECAUSE IT IS STATUE)

$$TotalWB = (faceWB - normalWB) \times \alpha + normalWB$$

$$\begin{pmatrix} TotalWB & : \text{TOTAL WB CORRECTION VALUE} \\ normalWB & : \text{NORMAL AWB CORRECTION VALUE} \\ faceWB & : \text{FACE AWB CORRECTION VALUE} \end{pmatrix}$$

$$TotalLight = (faceLight - normalLight) \times \alpha + normalLight$$

$$\begin{pmatrix} TotalLight & : TOTAL\ LIGHT\ SOURCE\ COLOR \\ normalLight & : LIGHT\ SOURCE\ COLOR\ OF\ NORMAL\ AWB \\ faceLight & : LIGHT\ SOURCE\ COLOR\ OF\ FACE\ AWB \end{pmatrix}$$

FIG.21

| AREA1 | AREA2 | AREA3 | AREA4 |
| --- | --- | --- | --- |
| AREA5 | AREA6 | AREA7 | AREA8 |
| AREA9 | AREA10 | AREA11 | AREA12 |
| AREA13 | AREA14 | AREA15 | AREA16 |

FIG.29

$$L=\sqrt{(\text{area R/G}-\text{faceR/G})^2 + (\text{area B/G}-\text{faceB/G})^2}$$

| | |
|---|---|
| L | : DIFFERENCE (DISTANCE) BETWEEN LIGHT SOURCE COLOR AND REPRESENTATIVE COLOR |
| area R/G | : R/G COMPONENTS OF REPRESENTATIVE COLOR OF EACH AREA |
| area B/G | : B/G COMPONENTS OF REPRESENTATIVE COLOR OF EACH AREA |
| faceR/G | : R/G COMPONENTS OF LIGHT SOURCE COLOR OF FACE AWB |
| faceB/G | : B/G COMPONENTS OF LIGHT SOURCE COLOR OF FACE AWB |

FIG.35

$$L = \sum_{i=1}^{n} L_i \times \beta_i \bigg/ \sum_{i=1}^{n} \beta_i$$

{
L : TOTAL DIFFERENCE (DISTANCE)
Li : DIFFERENCE BETWEEN REPRESENTATIVE COLOR OF AREA i AND LIGHT SOURCE COLOR (DISTANCE)
βi : WEIGHT OF Li
}

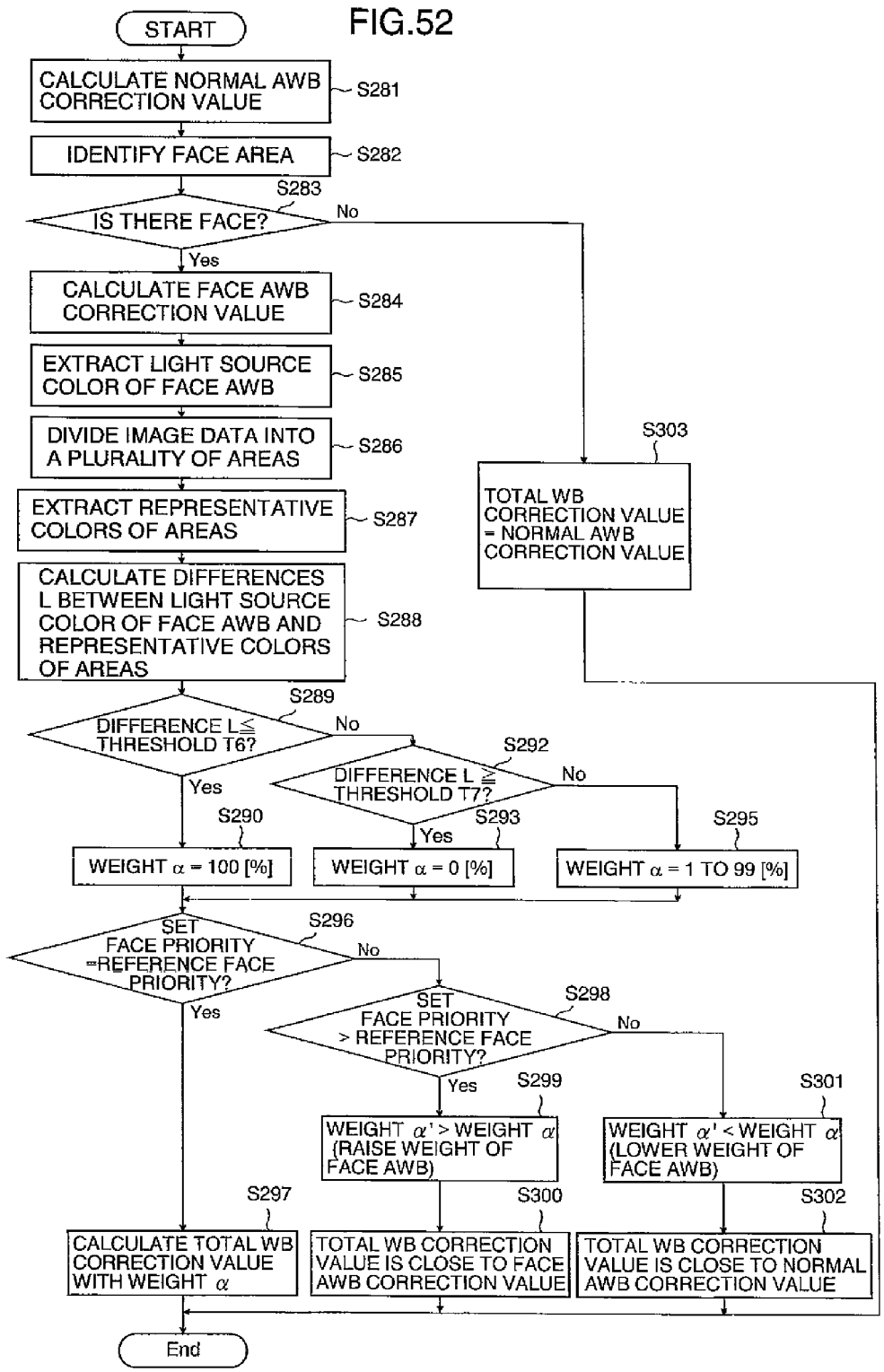

AUTO WHITE BALANCE CORRECTION VALUE CALCULATION DEVICE, METHOD, PROGRAM, AND IMAGE PICKUP DEVICE

BACKGROUND OF THE INVENTION

1. Field of the Invention

The present invention relates to a white balance adjustment of an image using a face detection function.

2. Description of the Related Art

In Japanese Patent Application Laid-Open No. 11-283025, a skin color region in an image is identified, and a light source is identified in accordance with the tone of the skin color region to thereby obtain a white balance (WB) correction value.

In Japanese National Publication of International Patent Application No. 2005-531189, a face area in an image is identified, a representative skin color is extracted from the face area, and a light source is identified in accordance with the representative skin color to thereby obtain a WB correction value.

SUMMARY OF THE INVENTION

However, according to Japanese Patent Application Laid-Open No. 11-283025 and Japanese National Publication of International Patent Application No. 2005-531189, the correct light source cannot be identified when a face other than the face of a person, such as a sculpture or a statue, is detected or when a painted face of a person with no skin color is detected. Therefore, an appropriate white balance correction value cannot be obtained. For example, assuming that it is estimated based on the color distribution of the face of a white statue that a blue light is directed to a skin color of a face so that the face has turned white, the image becomes yellow if the white balance is adjusted on the basis that the blue light is the light source color (so called color failure phenomenon).

An object of the present invention is to prevent an erroneous correction in an auto white balance correction using a face detection function.

An auto white balance correction value calculation method according to an aspect of the present invention comprises: inputting image data; calculating a normal AWB correction value, which is a first auto white balance (AWB) correction value, based on the inputted image data; identifying a face area from the image data; calculating a face AWB correction value, which is a second AWB correction value, based on the face area of the image data; extracting first feature data from the image data and extracting second feature data from image data in the face area; and calculating a total AWB correction value in accordance with at least one of the face AWB correction value and the normal AWB correction value based on a comparison result of the first feature data and the second feature data.

The first feature data is a light source color identified based on the image data, and the second feature data is a light source color identified based on the face area.

The method may further comprise: calculating a difference between the light source color of the image data and the light source color of the face area; and calculating the total AWB correction value based on the difference.

The method may further comprise selecting one of the face AWB correction value and the normal AWB correction value as the total AWB correction value based on the comparison result of the first feature data and the second feature data.

The method may further comprise calculating the total AWB correction value by obtaining a weighted average of the face AWB correction value and the normal AWB correction value with a predetermined weight $\alpha$, which is 0% or more and 100% or less, based on the comparison result of the first feature data and the second feature data.

The method may further comprise: obtaining a total light source color by finding a weighted average of the light source color of the image data and the light source color of the face area with a predetermined weight $\alpha$, which is 0% or more and 100% or less, based on the comparison result of the first feature data and the second feature data; and calculating the total AWB correction value in accordance with the total light source color.

An auto white balance correction value calculation method according to another aspect of the present invention comprises: inputting image data; calculating a normal AWB correction value, which is a first auto white balance (AWB) correction value, based on the inputted image data; identifying a face area from the image data; calculating a face AWB correction value, which is a second AWB correction value, based on the face area of the image data; dividing the image data into a plurality of areas and extracting feature data from each area; extracting feature data from the face area; and calculating a total AWB correction value in accordance with at least one of the face AWB correction value and the normal AWB correction value based on a comparison result of the feature data extracted from the areas and the feature data extracted from the face area.

A light source color is extracted from the face area as the feature data, and representative colors of the areas are extracted from the areas as feature data.

The method may further comprise: calculating differences between representative colors of specific areas among the representative color of each area and the light source color of the face area; and calculating the total AWB correction value based on the differences.

The method may further comprise: calculating differences between the representative colors of the specific areas among representative colors of the areas and the light source color of the face area; and calculating the total AWB correction value based on a value obtained by finding a weighted average of differences of a predetermined number of areas near the face area among the differences with a predetermined weight $\beta$, which is 0% or more and 100% or less, corresponding to the differences.

The method may further comprise selecting one of the face AWB correction value and the normal AWB correction value as the total AWB correction value based on a comparison result of the feature data extracted from the areas and the feature data extracted from the face area.

The method may further comprise calculating the total AWB correction value by obtaining a weighted average of the face AWB correction value and the normal AWB correction value with a predetermined weight $\alpha$, which is 0% or more and 100% or less, based on the comparison result of the feature data extracted from the areas and the feature data extracted from the face area.

The method may further comprise: obtaining a total light source color by finding a weighted average of the light source color of the image data and the light source color of the face area with a predetermined weight $\alpha$ which is 0% or more and 100% or less; and calculating the total AWB correction value in accordance with the total light source color.

The method may further comprise displaying the total AWB correction value.

The method may further comprise displaying an area in which the feature data compared with the feature data of the face area is extracted.

The method may further comprise: accepting selection of a face priority; and changing the weight of the total AWB correction value in accordance with the face priority.

An auto white balance correction value calculation program causing a computer to execute the auto white balance correction value calculation method is also included in the scope of the present invention. In addition, the program may be recorded on a recording medium.

An auto white balance correction value calculation device according to an aspect of the present invention comprises: an image data input unit which inputs image data; a normal AWB correction value calculation unit which calculates a normal AWB correction value, which is a first auto white balance (AWB) correction value, based on the image data inputted in the image data input unit; a face area identification unit which identifies a face area from the image data; a face AWB correction value calculation unit which calculates a face AWB correction value, which is a second AWB correction value, based on the face area of the image data; a feature data extraction unit which extracts first feature data from the image data and extracts second feature data from the image data in the face area; and a total AWB correction value calculation unit which calculates a total AWB correction value in accordance with at least one of the face AWB correction value and the normal AWB correction value based on a comparison result of the first feature data and the second feature data.

The first feature data is a light source color identified based on the image data, and the second feature data is a light source color identified based on the face area.

The device may further comprise a difference calculation unit which calculates a difference between the light source color of the image data and the light source color of the face area, and the total AWB correction value calculation unit may calculate the total AWB correction value based on the difference.

The total AWB correction value calculation unit may select one of the face AWB correction value and the normal AWB correction value as the total AWB correction value based on the comparison result of the first feature data and the second feature data.

The total AWB correction value calculation unit may calculate the total AWB correction value by obtaining a weighted average of the face AWB correction value and the normal AWB correction value with a predetermined weight $\alpha$, which is 0% or more and 100% or less, based on the comparison result of the first feature data and the second feature data.

The device may further comprise a total light source color calculation unit which obtains a total light source color by finding a weighted average of the light source color of the image data and the light source color of the face area with the predetermined weight $\alpha$, which is 0% or more and 100% or less, based on the comparison result of the first feature data and the second feature data, and the total AWB correction value calculation unit may calculate the total AWB correction value in accordance with the total light source color.

An auto white balance correction value calculation device according to an aspect of the present invention comprises: an image data input unit which inputs image data; a normal AWB correction value calculation unit which calculates a normal AWB correction value, which is a first auto white balance (AWB) correction value, based on the image data inputted in the image data input unit; a face area identification unit which identifies a face area from the image data; a face AWB correction value calculation unit which calculates a face AWB correction value, which is a second AWB correction value, based on the face area of the image data; an area feature data extraction unit which divides the image data into one or a plurality of areas and extracts feature data from the areas; a face area feature data extraction unit which extracts feature data from the face area; and a total AWB correction value calculation unit which calculates a total AWB correction value in accordance with at least one of the face AWB correction value and the normal AWB correction value based on a comparison result of the feature data extracted from the areas and the feature data extracted from the face area.

A light source color is extracted from the face area as the feature data, and representative colors of the areas are extracted from the areas as the feature data.

The device may further comprise a difference calculation unit which calculates differences between representative colors of specific areas among the representative colors of the areas and the light source color of the face area, and the total AWB correction value calculation unit may calculate the total AWB correction value based on the differences.

The device may further comprise a difference calculation unit which calculates differences between representative colors of specific areas among the representative colors of the areas and the light source color of the face area, and the total AWB correction value calculation unit may calculate the total AWB correction value based on a value obtained by finding a weighted average of differences of a predetermined number of areas near the face area among the differences with a predetermined weight $\beta$, which is 0% or more and 100% or less, corresponding to the differences.

The total AWB correction value calculation unit may select one of the face AWB correction value and the normal AWB correction value as the total AWB correction value based on a comparison result of the feature data extracted from the areas and the feature data extracted from the face area.

The total AWB correction value calculation unit may calculate the total AWB correction value by obtaining a weighted average of the face AWB correction value and the normal AWB correction value with a predetermined weight $\alpha$, which is 0% or more and 100% or less, based on the comparison result of the feature data extracted from the areas and the feature data extracted from the face area.

The device may further comprise a total light source color calculation unit which obtains a total light source color by finding a weighted average of the light source color of the image data and the light source color of the face area with a predetermined weight $\alpha$, which is 0% or more and 100% or less, and the total AWB correction value calculation unit may calculate the total AWB correction value in accordance with the total light source color.

The device may further comprise a display unit which displays the total AWB correction value.

The device may further comprise a display unit which displays an area in which the feature data compared with the feature data of the face area is extracted.

The device may further comprise a face priority selection unit which accepts selection of a face priority, and the total AWB correction value calculation unit may change the weight of the total AWB correction value in accordance with the face priority.

An image pickup device according to an aspect of the present invention comprises: an auto white balance correction value calculation device, an image pickup element which receives an object image through a photographing optical system and outputs an analog image signal indicative of the object image; an image data output unit which converts the analog image signal to digital image data and outputs the digital image data to the image data input unit; and a correction unit which corrects a white balance of the image data based on the total AWB correction value calculated by the auto white balance correction value calculation device.

According to the aspects of the present invention, when correcting the white balance on the basis of face area, even if a face which does not have a normal skin color is identified, an erroneous white balance adjustment based on the face can be prevented as much as possible.

BRIEF DESCRIPTION OF THE DRAWINGS

FIG. 21 illustrates dividing of the entire image data into one or a plurality of areas;

FIG. 29 illustrates a formula for calculating difference (distance) L between representative color of each area in the color space and a light source color obtained by a face AWB light source color extraction unit 52c-1;

FIG. 35 illustrates a formula for calculating a weighted average L of distances Li;

FIG. 52 is a flow chart of a white balance correction process according to the sixteenth embodiment.

DETAILED DESCRIPTION OF THE PREFERRED EMBODIMENTS

First Embodiment

Figure 1:
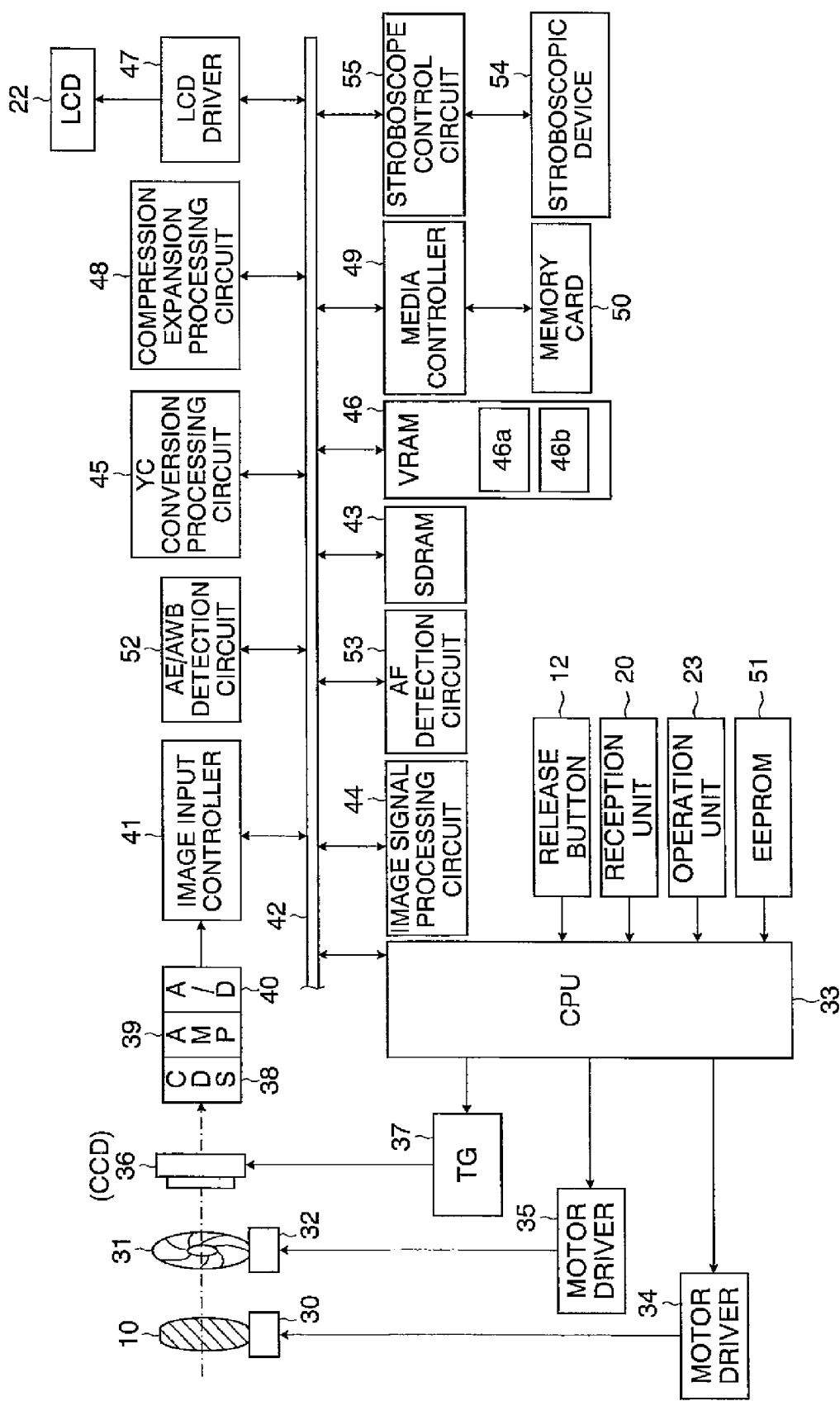
FIG. 1 depicts an electrical configuration of a digital camera.

FIG. 1 illustrates an electrical configuration of a digital camera 2. A lens motor 30 is connected to imaging lenses 10. An iris motor 32 is connected to an aperture 31. The motors 30 and 32 are formed of stepping motors and operated and controlled by a driving pulse transmitted from motor drivers 34 and 35 connected to a CPU 33. The motors 30 and 32 execute an imaging preparation process associated with a half-press of a release button 12.

The lens motor 30 moves zoom lenses of the imaging lenses 10 to the wide side or to the tele side in conjunction with an operation of a zoom operation button 24. The lens motor 30 also moves focus lenses (not shown) of the imaging lenses 10 in accordance with the magnification or the like of the zoom lenses to adjust the focus so as to obtain optimal shooting conditions. The iris motor 32 operates the aperture 31 to adjust the exposure.

A CCD 36 that images an object image penetrated through the imaging lenses 10 are arranged on the back of the imaging lenses 10. A timing generator (TG) 37 controlled by the CPU 33 is connected to the CCD 36, and a timing signal (clock pulse) inputted from the TG 37 determines the shutter speed of the electric shutter.

An imaging signal outputted from the CCD 36 is inputted to a correlated double sampling circuit (CDS) 38 and outputted as R, G, and B image data accurately corresponding to the amount of stored charge of each cell of the CCD 36. The image data outputted from the CDS 38 is amplified by an amplifier (AMP) 39 and converted to digital image data by an A/D converter (A/D) 40.

An image input controller 41 is connected to the CPU 33 through a bus 42 and controls the CCD 36, the CDS 38, the AMP 39, and the A/D 40 in accordance with a control command of the CPU 33. The image data outputted from the A/D 40 is temporarily stored in an SDRAM 43.

An image signal processing circuit 44 reads out the image data from the SDRAM 43 to execute various image processes such as grayscale conversion, white balance correction, and γ correction process and again records the image data in the SDRAM 43. A YC conversion processing circuit 45 reads out the image data, to which the various processes are applied in the image signal processing circuit 44, from the SDRAM 43 and converts the image data to a luminance signal Y and color difference signals Cr and Cb.

A VRAM 46 is a memory for outputting a through image (live view image) on an LCD 22 and stores the image data that has passed through the image signal processing circuit 44 and the YC conversion processing circuit 45. Memories 46a and 46b of two frames are reserved in the VRAM 46 so that writing and reading of the image data can be performed in parallel. The image data stored in the VRAM 46 is converted to an analog composite signal by an LCD driver 47 and displayed on the LCD 22 as a through image.

A compression expansion processing circuit 48 compresses the image data that is YC-converted in the YC conversion processing circuit 45 in a predetermined compression format (for example, JPEG format). The compressed image data is stored in a memory card 50 through a media controller 49.

The release button 12, the reception unit 20, the operation unit 23 as well as an EEPROM 51 are connected to the CPU 33. The EEPROM 51 records programs, setting information, and the like for various controls. The CPU 33 reads out the information from the EEPROM 51 to the SDRAM 43, which is a work memory, and executes various processes.

The bus 42 is connected with: an AE/AWB detection circuit 52 that detects whether the exposure, i.e. shutter speed of the electric shutter, and the aperture value of the aperture 31 are suitable for imaging and that detects whether the white balance is suitable for imaging; an AF detection circuit 53 that detects whether the focus adjustment of the imaging lenses 10 is suitable for imaging; and a stroboscope control circuit 55 that controls the operation of a stroboscopic device 54.

The AE/AWB detection circuit 52 detects the suitability of the exposure and the white balance based on an integrated value of the luminance signal Y and the color difference signals Cr and Cb of the image data that is YC-converted in the YC conversion processing circuit 45 and transmits the detection result to the CPU 33. The CPU 33 controls the operation of the imaging lenses 10, the aperture 31, and the CCD 36 based on the detection result transmitted from the AE/AWB detection circuit 52.

The AF detection circuit 53 calculates a focus evaluation value indicative of the sharpness of an image from the image data digitalized by the A/D 40 and transmits the calculation result to the CPU 33. The focus evaluation value can be obtained by applying a contour extraction process with band-pass filtering or the like to image data of a specific area of the image, such as the midsection of the photographic angle of view, and then integrating a contour signal thus extracted and a luminance value of the image data of the midsection. A larger focus evaluation value denotes that a large amount of high frequency components exist in that part, indicating the part is in focus.

The CPU 33 determines a search range of the focus position of the focus lenses from the position of the zoom lenses during an imaging preparation process associated with a half-press of the release button 12, controls the operation of the lens motor 30 through the motor driver 34, moves the focus lenses, for example, from the near point to the far point within the determined search range, and compares the magnitude of the focus evaluation values sequentially transmitted from the AF detection circuit 53 at that point, thereby halting the focus lenses at a position with the largest focus evaluation value, i.e., at the focus position.

If a release signal is received from the remote controller 16 through the reception unit 20 under a self-shooting mode and if the calculation result of the integrated value of the luminance calculated by the AE/AWB detection circuit 52 is smaller than a preset threshold, the image signal processing circuit 44 extracts image data indicative of a light emitted from the light source 19 of the remote controller 16 during transmission of the release signal from the image data read out from the SDRAM 43.

Specifically, to extract the image data indicative of the light emitted from the light source 19, a difference between image data of the prior frame and the current frame is obtained, and a region where the light is imaged is identified from the difference between the image data of a frame in which the light emitted from the light source 19 is imaged and a frame in which the light is not imaged, thereby extracting the image data indicative of the region or the periphery including the region. The case in which the calculation result of the integrated value of luminance calculated by the AE/AWB detection circuit 52 is smaller than the preset threshold indicates a situation where the focus adjustment is difficult (such as a dark place).

The AF detection circuit 53 calculates the focus evaluation value of the image data indicative of the light extracted by the image signal processing circuit 44. The CPU 33 sets the point at the valley of the waveform of the focus evaluation value as the focus position and controls the operation of the lens motor through the motor driver 34 to halt the focus lenses at the position.

Figure 2:
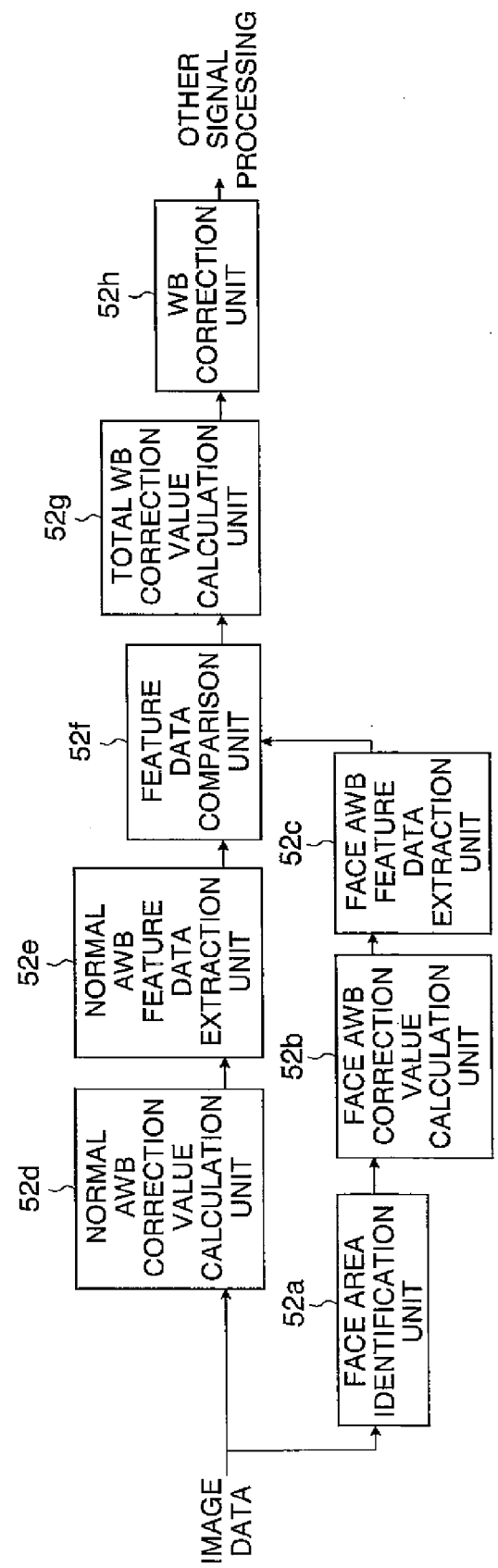
FIG. 2 is a block diagram of an image signal processing circuit according to a first embodiment.

FIG. 2 illustrates a block configuration of main parts of the image signal processing circuit 44 according to the first embodiment. The detailed functions of the blocks disclosed in FIG. 2 will be described later.

A face area identification unit 52a identifies a face area, which is an area including the face part of a person, from digital image data (still images, through images, or moving image frames for recording) of the SDRAM 43. A technique disclosed, for example, in Japanese Patent Application Laid-Open No. 2007-124112 by the present applicant can be applied as the detection method of the face area.

Thus, the face area identification unit 52a reads image data P0' of a photographed image and detects a face part P0f in the image P0'. Specifically, as described in Japanese Patent Application Laid-Open No. 2005-108195, a first amount of features indicative of the direction of the gradient vector indicative of the direction and dimensions of the edges of the pixels of the image P0' is inputted to a plurality of first discriminators to determine whether a face candidate region exists in the image P0'. If the face candidate region exists, the region is extracted, and the magnitude of the gradient vector in each pixel of the extracted face candidate region is normalized. A second amount of features indicative of the magnitude and the direction of the normalized gradient vector is inputted to a second discriminator to determine whether the extracted face candidate region is a real face area. If the area is a real face area, the area can be detected as the face part P0f. The first and second discriminators herein are obtained by a learning process using a machine learning method such as AdaBoost that inputs the first and second amounts of features calculated for images, as learning samples, previously identified to be faces and for images previously identified not to be faces.

In addition to a method using a correlation score between an eigenface expression and an image as shown in Japanese National Publication of International Patent Application No. 2004-527863, various known methods can used as a detection method of a face part P1f such as a knowledge-based method, a feature extraction method, a template matching method, a graph matching method, and a statistical method (neural network, SVM, and HMM). However, a face detection method dependent on the color of the face of the person, such as a method using a skin color detection, will not be employed in the embodiments of this application to allow face detection independent from a color of a face of a person (for example, allowing detection of a face of a bronze statue or a painted face).

A face AWB correction value calculation unit 52b determines a correction value of the white balance applied to the entire image based on the image data of the face area identified by the face area identification unit 52a.

A face AWB feature data extraction unit 52c extracts feature data based on the image data in the face area identified by the face area identification unit 52a. The feature data includes, for example, a type of light source estimated from the image data in the face area (such as sunlight, tungsten, and fluorescence) or a color temperature of the light source (for example, the color temperature is estimated between 2500K and 9400K). Alternatively, a representative color of the face area can be used.

A normal AWB correction value calculation unit 52d determines a correction value of the white balance applied to the entire image based on a normal AWB area that is a specific area (for example, the entire image data or the entire image data excluding a predetermined peripheral area. However, the specific area is not the same as the face area) for determining a normal white balance correction value.

A normal AWB feature data extraction unit 52e extracts feature data based on the normal AWB area. Examples of the feature data include a light source type, a color temperature, and a representative color estimated from the image data of the normal AWB area.

A WB correction unit 52h increases and decreases image data of each color at a rate corresponding to the type of the light source or the color temperature of the light source, thereby adjusting a photographed image to an appropriate white balance, i.e., correcting the color to prevent the tone of white color to be strong.

A feature data comparison unit 52f compares the feature data obtained by the face AWB feature data extraction unit 52c and the feature data obtained by the normal AWB feature data extraction unit 52e. As will be described later, this is conducted by, for example, obtaining distances between light source color L1 and light source color L2 in various color spaces.

A total WB correction value calculation unit 52g selects a calculation method of a white balance correction value for the entire image based on a comparison result of two pieces of feature data from the normal AWB feature data extraction unit 52e and the face AWB feature data extraction unit 52c. As will be described later, this is conducted by, for example, selecting a correction value formula from one of a correction value formula used by the normal AWB correction value calculation unit 52d and a correction value formula used by the face AWB correction value calculation unit 52b based on whether the distance between the light source colors L1 and L2 is equal to or greater than a predetermined threshold or less than the threshold.

The WB correction unit 52h corrects the white balance of the entire image with a white balance correction value calculated by a calculation method selected by the total WB correction value calculation unit 52g.

Figure 3:
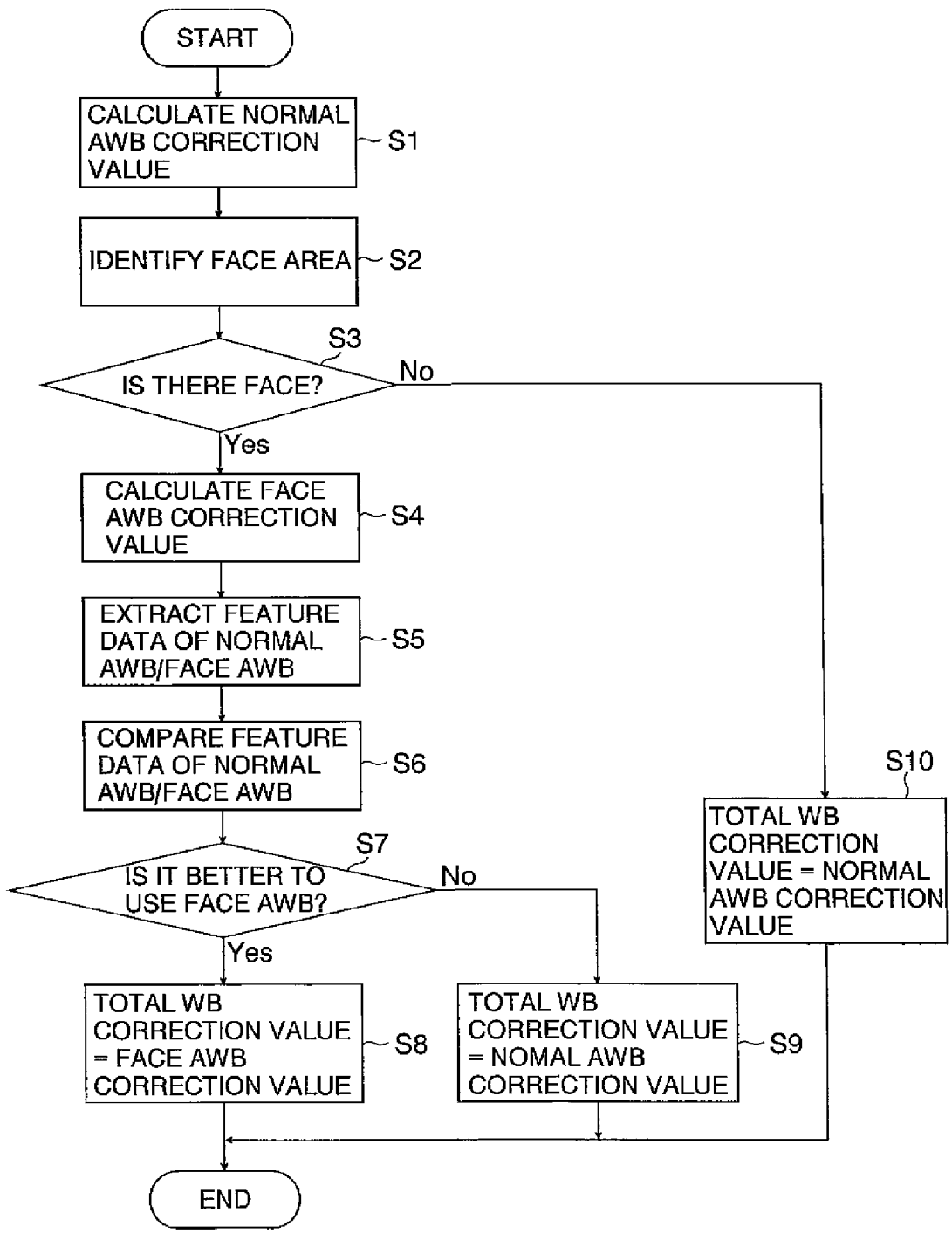
FIG. 3 is a flow chart of a white balance correction process according to the first embodiment.

FIG. 3 is a flow chart of a white balance correction process executed by the image signal processing circuit 44 according to the first embodiment.

In step S1, the normal AWB correction value calculation unit 52d calculates a correction value.

In step S2, the face area identification unit 52a attempts to identify a face area.

In step S3, whether the face area identification unit 52a has succeeded in identifying the face area is determined. If the identification of the face area is successful, the process proceeds to step S4, and if not, the process proceeds to S10.

In step S4, the face AWB correction value calculation unit 52b calculates a face AWB correction value.

In step S5, the face AWB feature data extraction unit 52c and the normal AWB feature data extraction unit 52e extract feature data in the color space, respectively.

In step S6, the feature data comparison unit 52f compares two pieces of feature data extracted in step S5. For example, the feature data comparison unit 52f obtains two representative colors in the normal AWB area and the face area and compares color differences (distances) of two representative colors in a predetermined color space or on a chromaticity diagram.

In step S7, the total WB correction value calculation unit 52g selects one appropriate calculation method of the white balance correction value for the entire image based on a comparison result of two pieces of feature data. For example, the total WB correction value calculation unit 52g selects one of a calculation method by the face AWB correction value calculation unit 52b and a calculation method of the normal AWB correction value calculation unit 52d. If the calculation method by the face AWB correction value calculation unit 52b is selected, the process proceeds to step S8. If the calculation method by the normal AWB correction value calculation unit 52d is selected, the process proceeds to step S9. As for the selection of the calculation method based on the comparison result of two pieces of feature data, for example, a face AWB calculation method is selected if the color difference (distance) of two representative colors is less than a predetermined threshold, while a normal AWB calculation method is selected if the color difference is equal to or larger than a predetermined threshold.

In step S8, the WB correction unit 52h corrects the white balance of the entire image with a total WB correction value=face AWB correction value obtained by the white balance correction value calculation method selected by the total WB correction value calculation unit 52g.

In step S9, the WB correction unit 52h corrects the white balance of the entire image with the total WB correction value=normal AWB correction value obtained by the white balance correction value calculation method selected by the total WB correction value calculation unit 52g.

In step S10, the WB correction unit 52h corrects the white balance of the entire image with a normal AWB correction value.

Thus, in the first embodiment, the correction value calculation method is selected in accordance with the comparison result of the feature data of the normal AWB area and the feature data of the face area.

Second Embodiment

Figure 4:
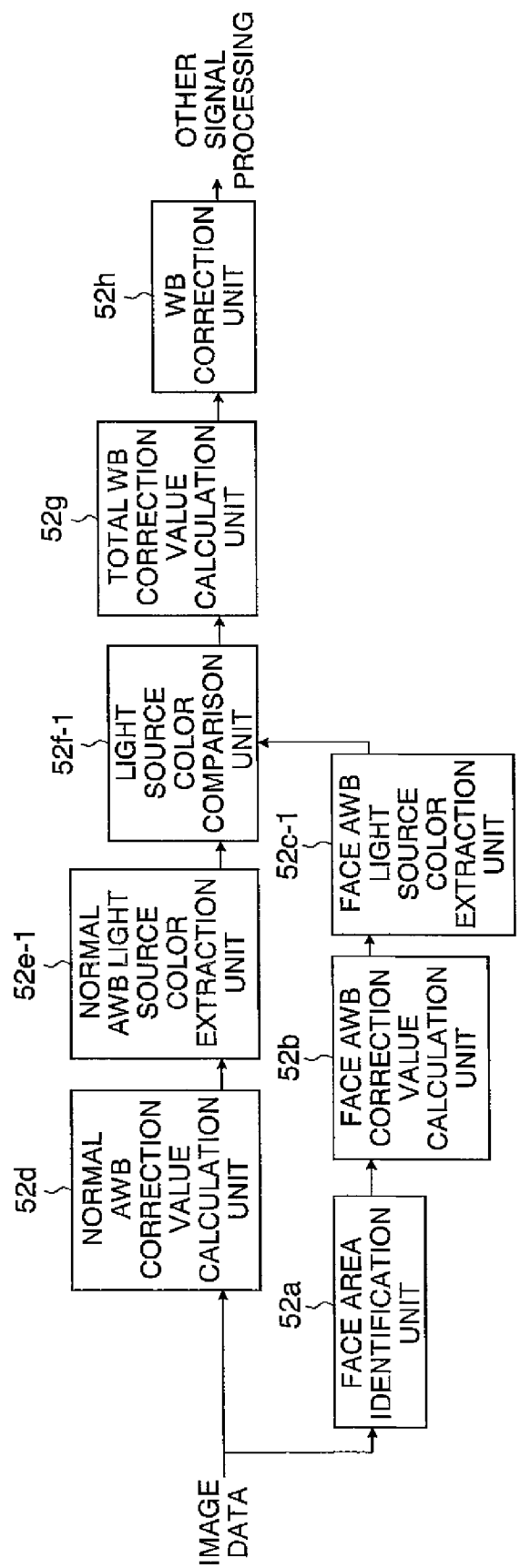
FIG. 4 is a block diagram of the image signal processing circuit according to a second embodiment.

FIG. 4 illustrates a detailed block configuration of the image signal processing circuit 44 according to a second embodiment. A face AWB light source color extraction unit 52c-1 is illustrated as an example of the face AWB feature data extraction unit 52c in FIG. 2. A normal AWB light source color extraction unit 52e-1 is illustrated as an example of the normal AWB feature data extraction unit 52e. A light source color comparison unit 52f-1 is illustrated as an example of the feature data comparison unit 52f.

The face AWB light source color extraction unit 52c-1 extracts a light source color based on the image data in the face area identified by the face area identification unit 52a. This is conducted by, for example, estimating a light source color (R1, G1, B1) using various methods (for example, methods disclosed in Japanese Patent Application Laid-Open Nos. 2000-209598 or No. 2006-222928) of estimating a light source color from part of image data for adjusting the white balance and then converting the estimated light source color to a coordinate L1=(R1/G1, B1/G1) of a color space formed of a ratio of R/G and B/G. Various color spaces such as YCrCb may be used as the color space for plotting the light source color.

Figure 5:
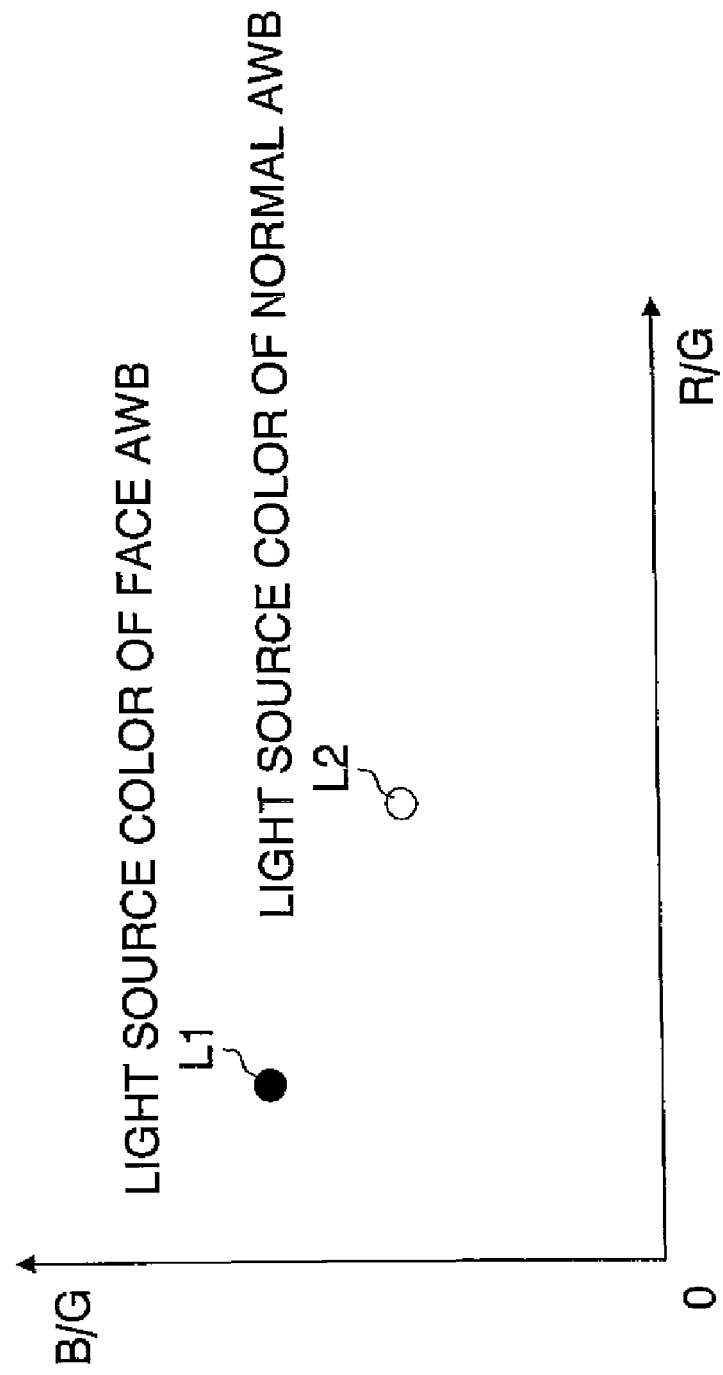
FIG. 5 illustrates light source colors L1 and L2 in a color space (R/G, B/G)

The normal AWB light source color extraction unit 52e-1 extracts a light source color based on the image data of the normal AWB area. This is conducted by, for example, estimating a light source color (R2, G2, B2) using various methods for estimating a light source color from the entire image data for the white balance adjustment and then converting the estimated light source color to a coordinate L2=(R2/G2, B2/G2) of a color space formed of the ratio of R/G and B/G (FIG. 5).

The light source color comparison unit 52f-1 compares the light source color L1 obtained by the face AWB light source color extraction unit 52c-1 and the light source color L2 obtained by the normal AWB light source color extraction unit 52e-1. As will be described later, this is conducted by, for example, obtaining a color difference (distance in the color space) between the light source color L1 and the light source color L2.

The normal AWB correction value calculation unit 52d determines a correction value of the white balance to be applied to the entire image based on the image data of the normal AWB area.

The WB correction unit 52h increases and decreases image data of each color at a rate corresponding to the type of light source or the color temperature of the light source, thereby adjusting a photographed image to an appropriate white balance, i.e., correcting the color to prevent the tone of white color from being tinged.

The total WB correction value calculation unit 52g selects a calculation method of the white balance correction value of the entire image based on a comparison result of the light source colors L1 and L2 in the color space. As will be described later, this is conducted by, for example, selecting one of the correction value calculated by the normal AWB correction value calculation unit 52d and the correction value calculated by the face AWB correction value calculation unit 52b based on whether the distance between the light source colors L1 and L2 is equal to or greater than a predetermined threshold or less than the threshold.

The WB correction unit 52h corrects the white balance of the entire image by a white balance correction value calculated with the calculation method selected by the total WB correction value calculation unit 52g.

Figure 6:
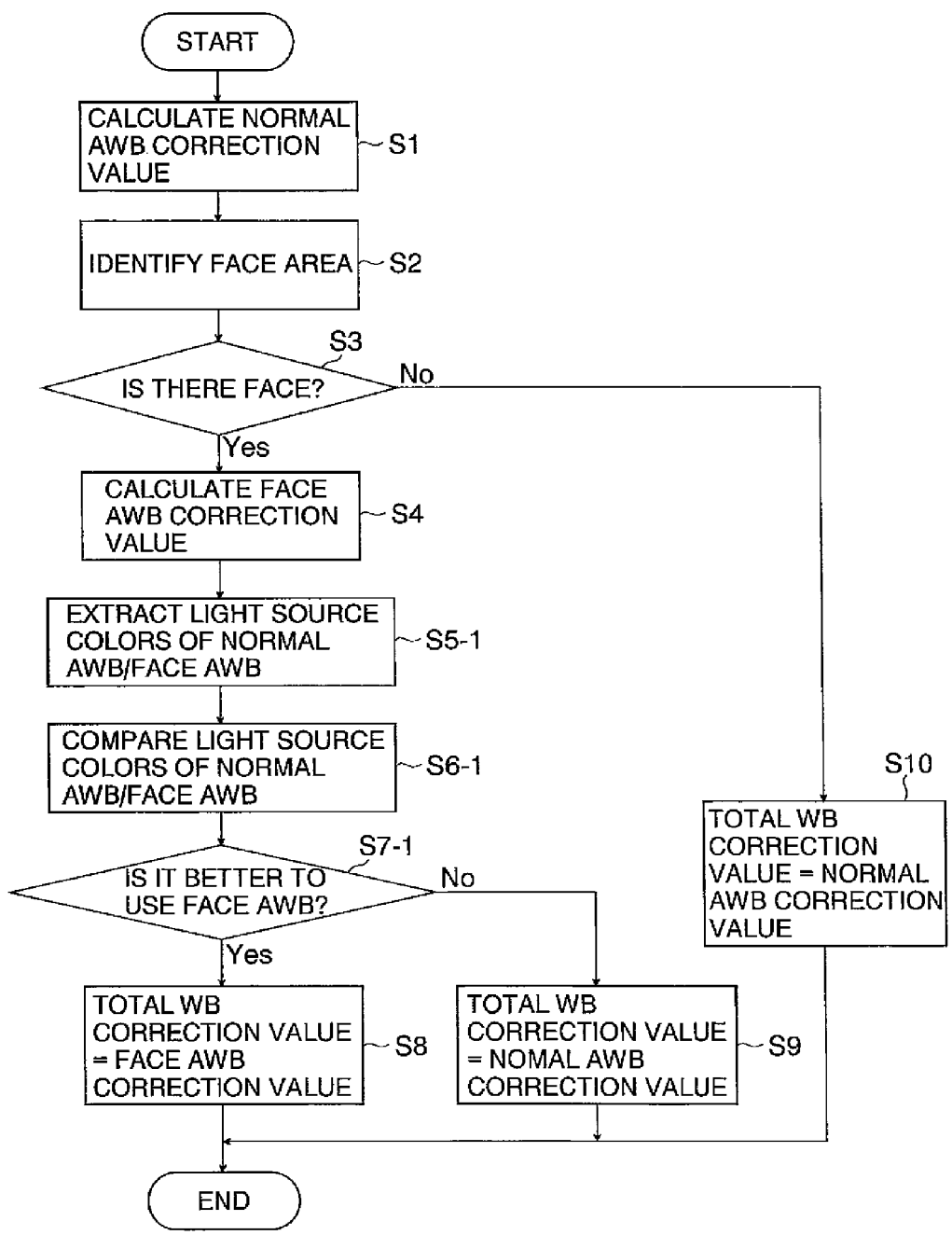
FIG. 6 is a flow chart of a white balance correction process according to the second embodiment.

FIG. 6 illustrates a flow of a white balance correction process executed in the image signal processing circuit 44.

In step S1, the normal AWB correction value calculation unit 52d calculates a correction value.

In step S2, the face area identification unit 52a attempts to identify a face area.

In step S3, whether the face area identification unit 52a has succeeded in identifying the face area is determined. If the identification of the face area is successful, the process proceeds to step S4, and if not, the process proceeds to step S10.

In step S4, the face AWB correction value calculation unit 52b calculates a face AWB correction value.

In step S5-1, a face AWB light source color extraction unit 52c-1 and a normal AWB light source color extraction unit 52e-1 extract light source colors L1 and L2 in the face area and the normal AWB area, respectively.

In step S6-1, a light source color comparison unit 52f-1 compares the light source colors L1 and L2.

In step S7-1, the total WB correction value calculation unit 52g selects an appropriate white balance correction value calculation method for the entire image, such as one of the calculation method by the face AWB correction value calculation unit 52b and the calculation method by the normal AWB correction value calculation unit 52d, based on the comparison result of the light source colors L1 and L2 compared by the light source color comparison unit 52f-1. If the calculation method by the face AWB correction value calculation unit 52b is selected, the process proceeds to step S8. If the calculation method by the normal AWB correction value calculation unit 52d is selected, the process proceeds to step S9.

In step S8, the WB correction unit 52h corrects the white balance of the entire image with a total WB correction value=face AWB correction value obtained by the white balance correction value calculation method selected by the total WB correction value calculation unit 52g.

In step S9, the WB correction unit 52h corrects the white balance of the entire image with a total WB correction value=normal AWB correction value obtained by the white balance correction value calculation method selected by the total WB correction value calculation method 52g.

In step S10, the WB correction unit 52h corrects the white balance of the entire image with the normal AWB correction value.

Thus, in the present embodiment, the correction value calculation method is selected in accordance with the comparison result of the light source color of the normal AWB area and the light source color of the face area.

Third Embodiment

Figure 7:
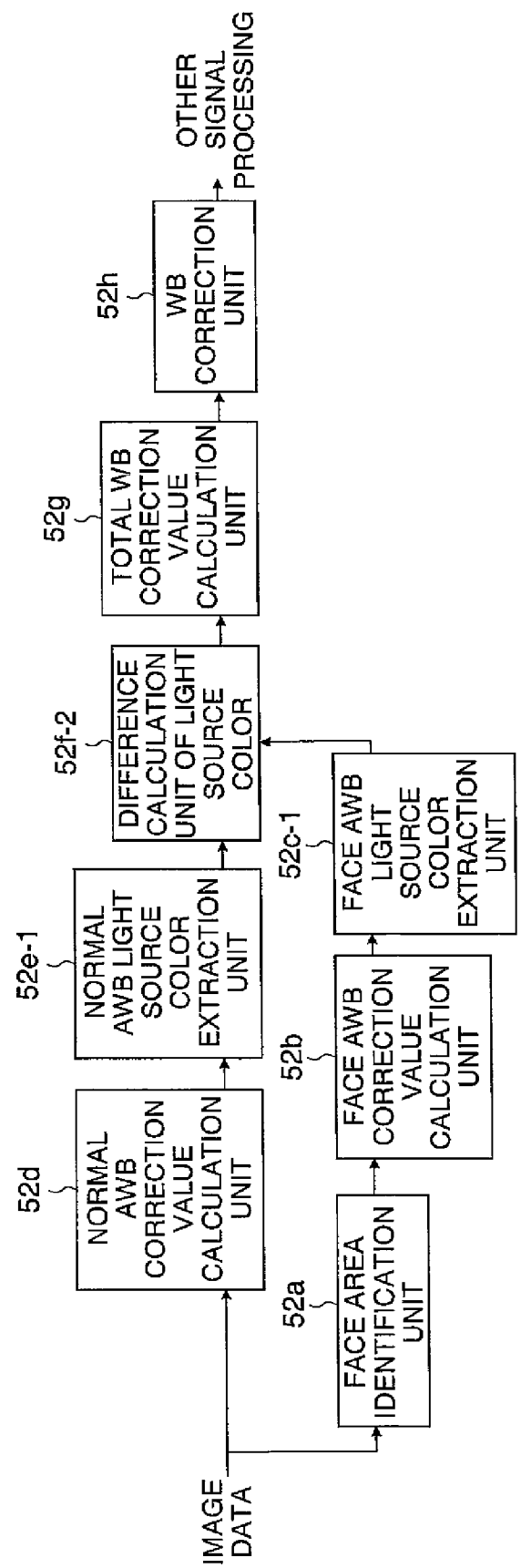
FIG. 7 is a block diagram of the image signal processing circuit according to a third embodiment.

FIG. 7 illustrates a block configuration of the image signal processing circuit 44 according to the third embodiment. As shown in FIG. 7, the configuration of the image signal processing circuit 44 according to the third embodiment is almost the same as that of the second embodiment except that a light source color difference calculation unit 52f-2 is included as an example of the light source color comparison unit 52f of FIG. 4.

Figures 8A, 8B:
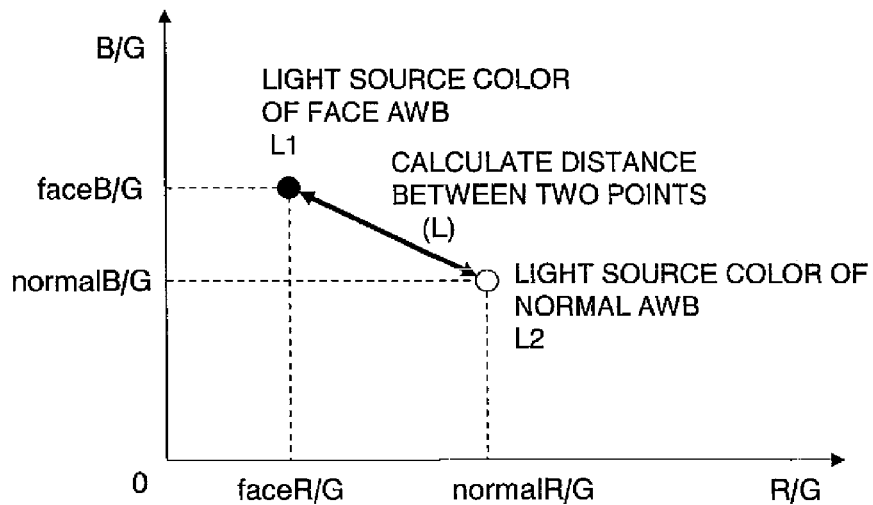
FIGS. 8A and 8B depict an example of a formula of a difference (distance) between the light source colors L1 and L2.

The difference calculation unit 52f-2 of the light source color calculates a difference between the light source color L1 obtained by the face AWB light source color extraction unit 52c-1 and the light source color L2 obtained by the normal AWB light source color extraction unit 52e-1. As will be described later, this is conducted by, as shown in FIGS. 8A and 8B as an example, obtaining a distance L between the light source color L1 and the light source color L2 in a color space.

Figure 9:
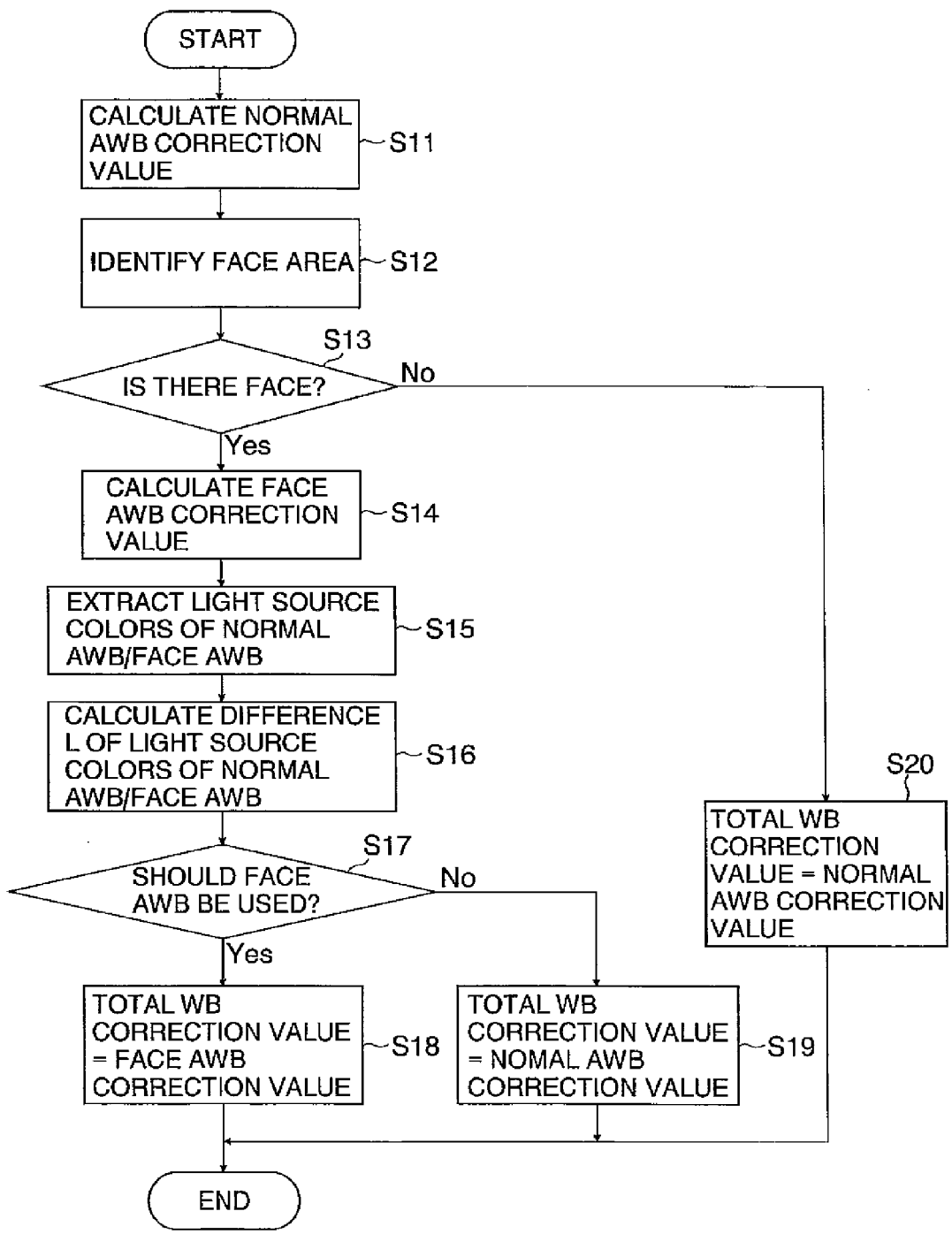
FIG. 9 is a flow chart of a white balance correction process according to the third embodiment.

FIG. 9 illustrates a flow of a white balance correction process executed in the image signal processing circuit 44.

Steps S11 to S15 are the same as steps S1 to S5 in FIG. 3, respectively.

In step S16, the difference calculation unit 52f-2 of the light source color calculates the difference L between the light source colors L1 and L2. Specifically, as shown in FIG. 8A, the difference L designates a distance (color difference) between the light source colors L1 and L2 in a color space. The value can be obtained with a formula as shown in FIG. 8B.

In step S17, the total WB correction value calculation unit 52g selects an optimal correction value calculation method (for example, the same method as in the first and second embodiments) based on the difference L between the light source colors L1 and L2 calculated by the difference calculation unit 52f-2 of the light source. If the calculation method of the face AWB correction value is selected, the process proceeds to S18. If the calculation method of the normal AWB correction value is selected, the process proceeds to step S19.

Steps S18 to S20 are the same as steps S8 to S10.

Fourth Embodiment

Figure 10:
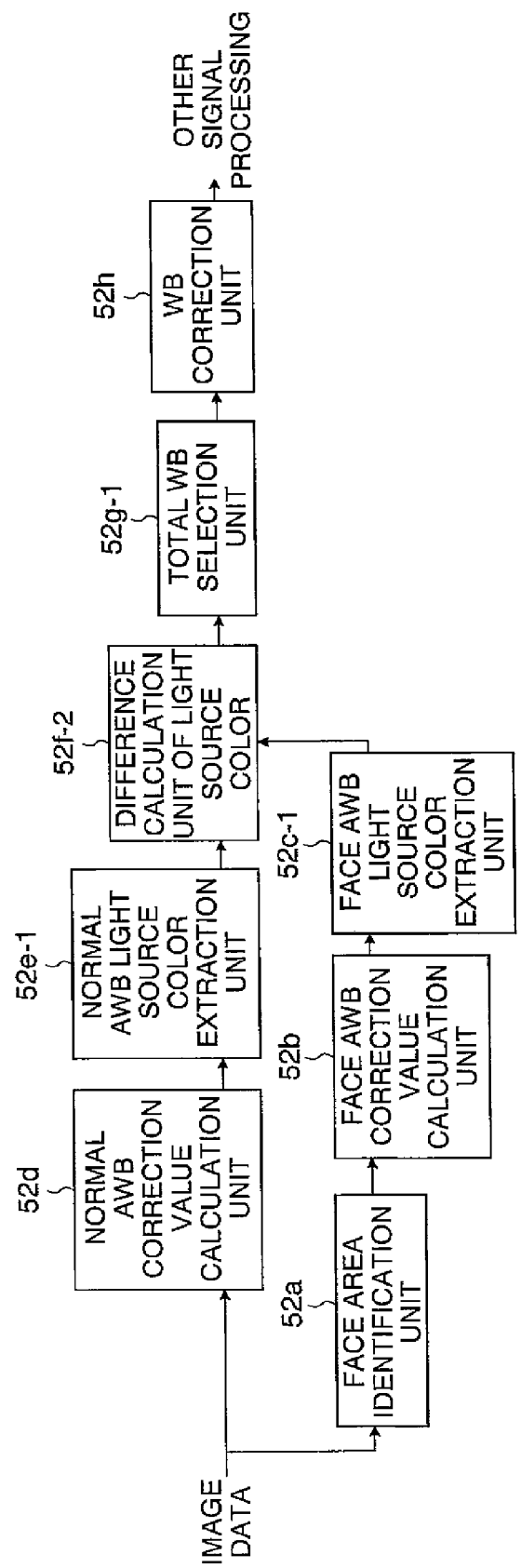
FIG. 10 is a block diagram of the image signal processing circuit according to a fourth embodiment.

FIG. 10 illustrates a block configuration of the image signal processing circuit 44 according to a fourth embodiment. As shown in FIG. 10, the configuration of the image signal processing circuit 44 according to the fourth embodiment is almost the same as that of the third embodiment except that a total WB selection unit 52g-1 is included as an example of the total WB correction value calculation unit 52g in FIGS. 2, 4 and 7. This function will be described later.

Figure 11:
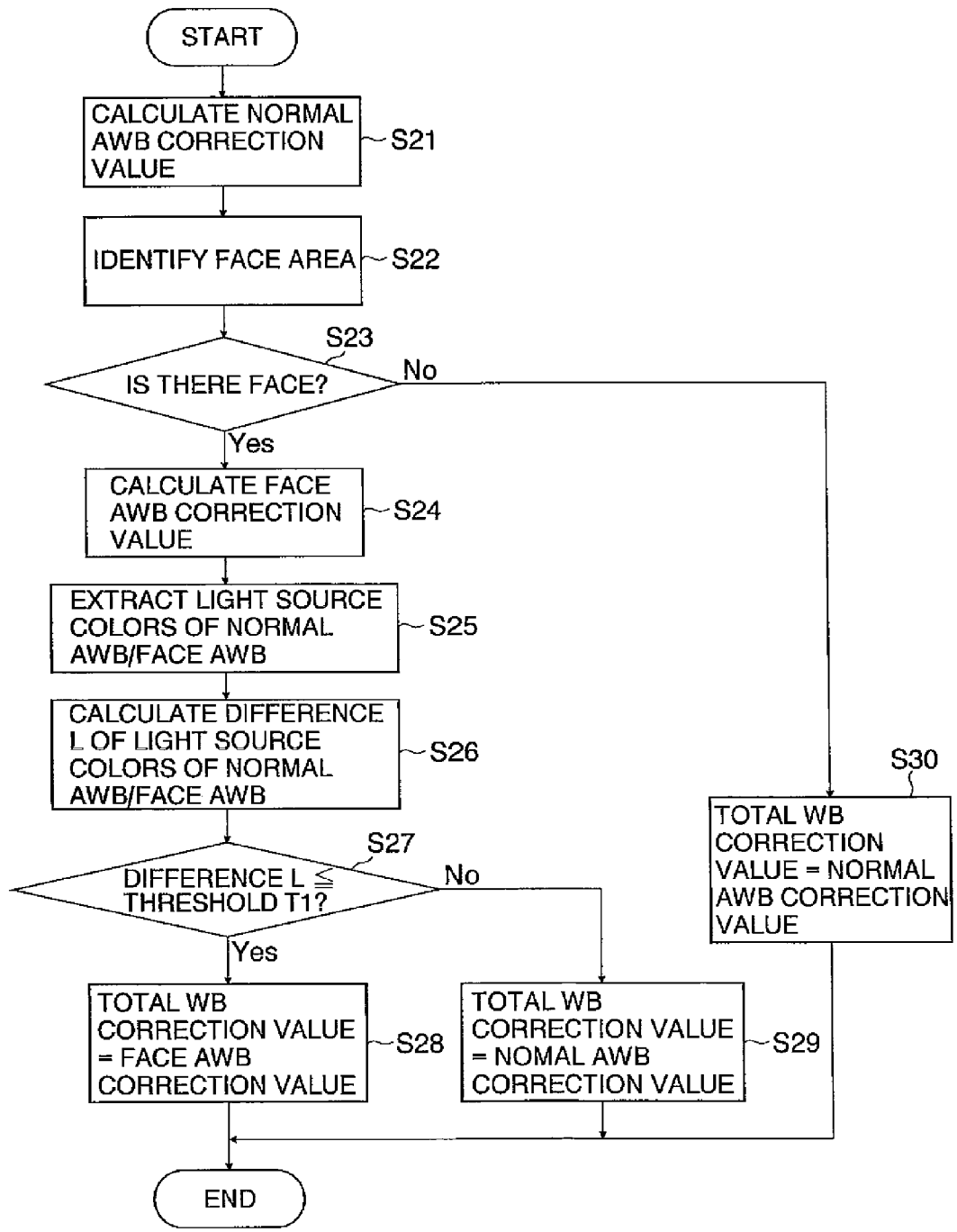
FIG. 11 is a flow chart of a white balance correction process according to the fourth embodiment.

FIG. 11 illustrates a flow of a white balance correction process executed in the image signal processing circuit 44.

Steps S21 to S26 are the same as steps S11 to S16, respectively.

Figure 12:
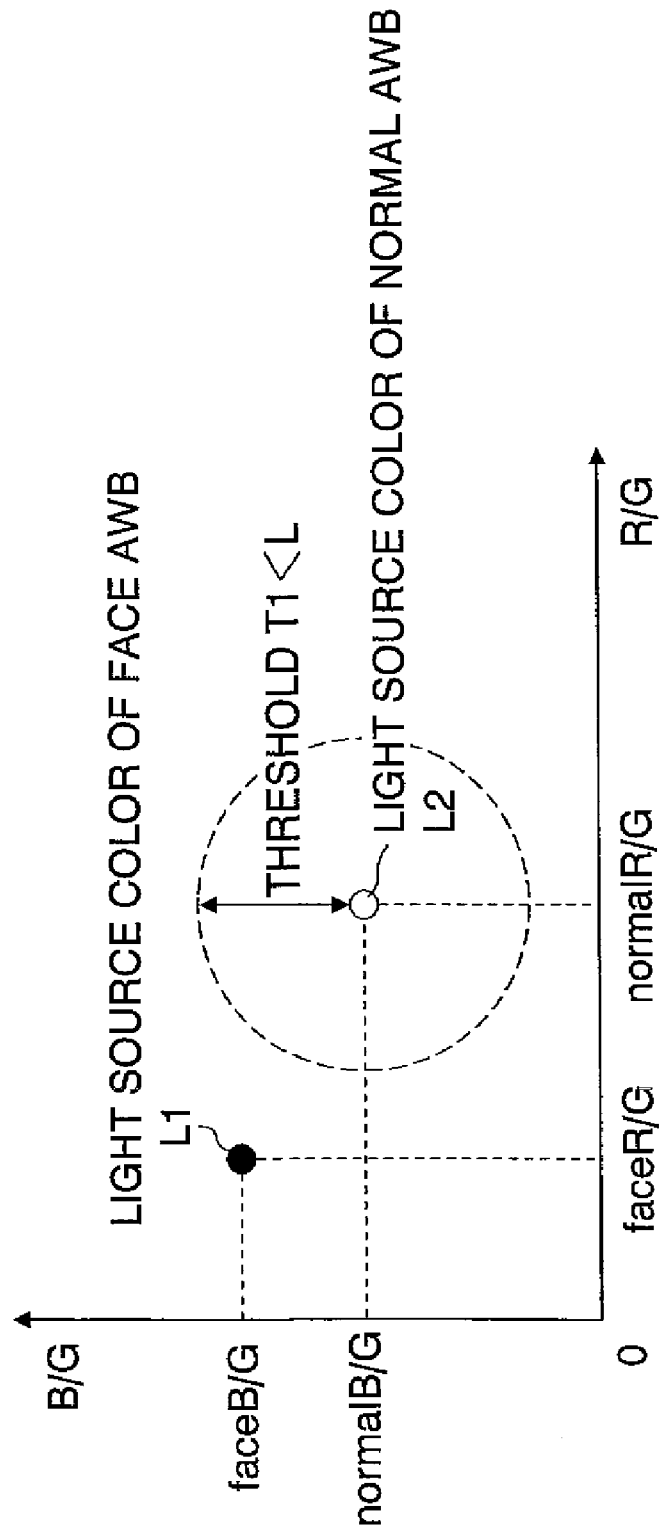
FIG. 12 illustrates a relationship between the light source colors L1 and L2 and a threshold.

In step S27, the total WB correction value selection unit 52g-1 determines whether the difference L between the light source colors L1 and L2 is equal to or less than a predetermined threshold T1. If L≦T1, the process proceeds to step S28. If L>T1, the process proceeds to step S29. FIG. 12 illustrates a case where L>T1. Reference character T1 designates a value for determining which of the face AWB correction value and the normal AWB correction value makes the white balance correction appropriate. Therefore, it is suitable that the threshold T1 be empirically defined in accordance with shooting conditions.

In step S28, the total WB correction value selection unit 52g-1 determines the face AWB correction value as the total WB correction value. The WB correction unit 52h corrects the white balance of the entire image with the final WB correction value=face AWB correction value determined by the final WB correction value calculation unit 52g.

In step S29, the total WB correction value selection unit 52g-1 determines the normal AWB correction value as the final WB correction value. The WB correction unit 52h corrects the white balance of the entire image with the total WB correction value=normal AWB correction value determined by the total WB correction value calculation unit 52g.

Step S30 is the same as step S10.

FIGS. 13A to 13D illustrate a specific advantage of the white balance correction.

Figure 13A:
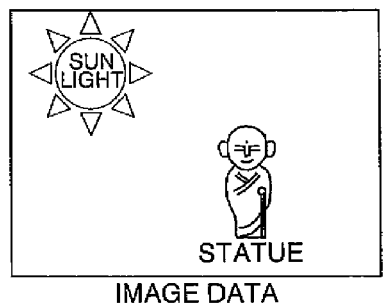
FIGS. 13A, 13B, 13C and 13D illustrate a specific advantage of the white balance correction of the present embodiment.

For example, as shown in FIG. 13A, it is assumed that image data of a whitish statue as an object is illuminated by the sunlight.

Figure 13B:
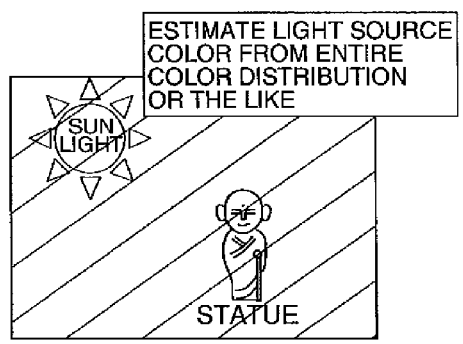

As shown in FIG. 13B, the normal AWB light source color extraction unit 52e-1 estimates the light source color from the color distribution of the entire image data. In this case, it is assumed that the light source color is the sunlight.

Figure 13C:
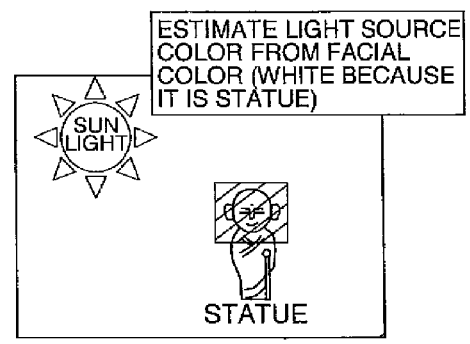

As shown in FIG. 13C, the face AWB light source color extraction unit 52c-1 estimates the light source color from the color distribution or the like in the face area in the image data identified by the face area identification unit 52a. In this case, assuming that it is estimated from the color distribution of the face of a white statue that a blue light is directed to the skin color of the face so that the face has turned white, the image becomes yellow-tinged if the white balance is adjusted on the basis that the blue light is the light source color.

Figure 13D:
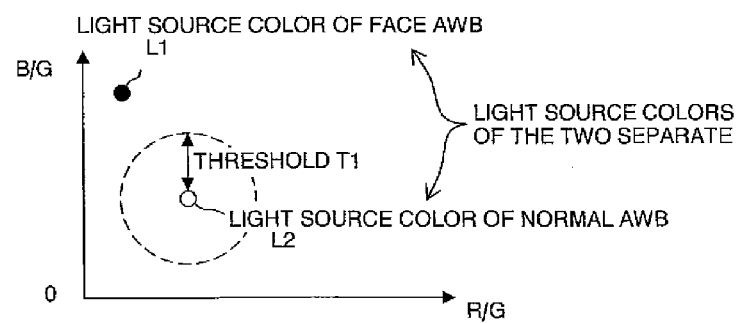

In this case, as shown in FIG. 13D, the distance L between the light source color L1 of the face AWB light source color extraction unit 52c-1 and the light source color L2 of the normal AWB light source color extraction unit 52e-1 tends to separate. If the distance L exceeds a predetermined threshold T1, the discrepancy between the two is large, and the reliability of the estimation of the light source color L1 of the face AWB light source color extraction unit 52c-1 is low. Therefore, it is more preferable to determine the WB correction value based on the light source color L2 of the normal AWB light source color extraction unit 52e-1. Thus, if L>T1, the white balance of the entire image is corrected with the normal AWB correction value.

On the other hand, if L≦T1, the white balance of the entire image is corrected with the face AWB correction value, because the reliability of the estimation of the light source color L1 is reserved to some extent.

In this way, when correcting the white balance based on the face area, even if a face that does not have a normal skin color is identified, an erroneous white balance adjustment based on the face can be prevented as much as possible.

Fifth Embodiment

Figure 14:
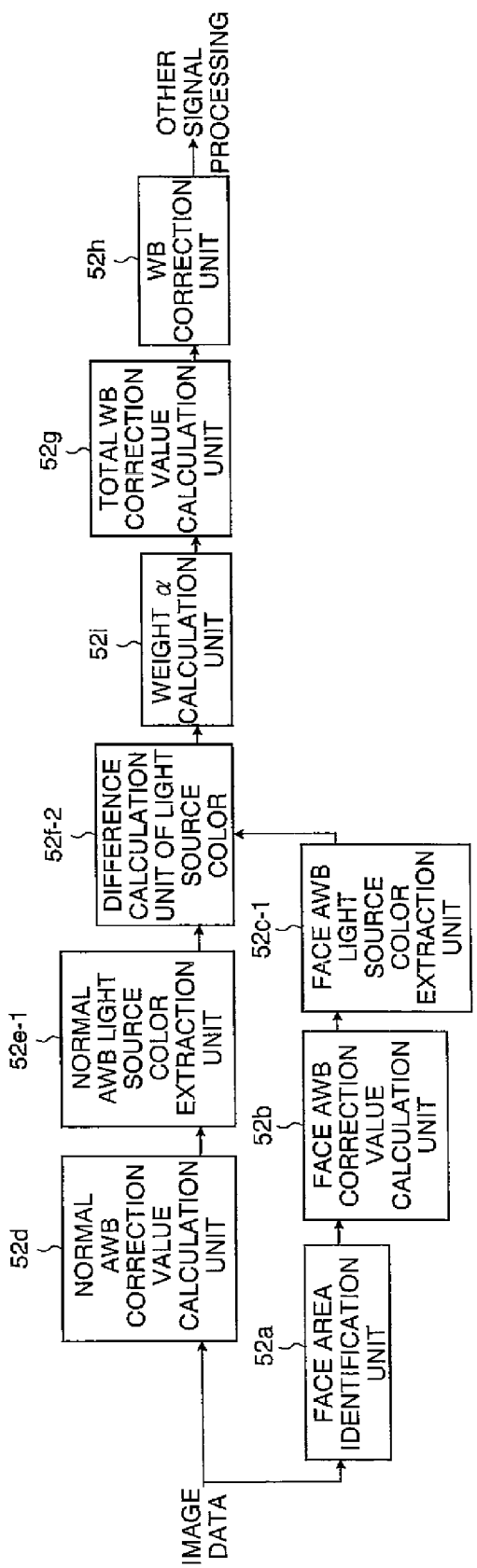
FIG. 14 is a block diagram of the image signal processing circuit according to a fifth embodiment.

FIG. 14 illustrates a block configuration of the image signal processing circuit 44 according to a fifth embodiment. As shown in FIG. 14, in the fifth embodiment, a weight α calculation unit 52i is added to the configuration of the third embodiment shown in FIG. 7.

Figures 15A, 15B:
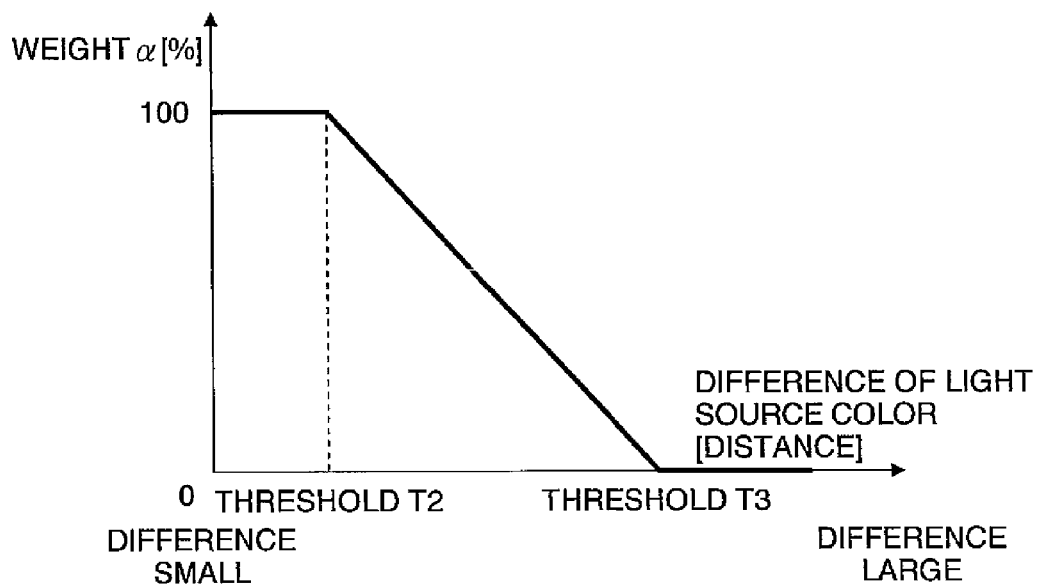
FIGS. 15A and 15B illustrate a weight α identification function and a formula for obtaining a weighted average of a normal AWB correction value and a face AWB correction value.

The weight α calculation unit 52i stores, for example, a function (weight α decision function) defining the relationship between the difference L and the weight α as exemplified in FIG. 15A. The weight α calculation unit 52i identifies the weight α corresponding to the value of the difference L from the function to thereby calculate the weight α of the function.

The final WB correction value calculation unit 52g calculates the final WB correction value with a formula, such as the one shown in FIG. 15B, for obtaining a weighted average of the normal AWB correction value and the face AWB correction value using the weight α.

Figure 16:
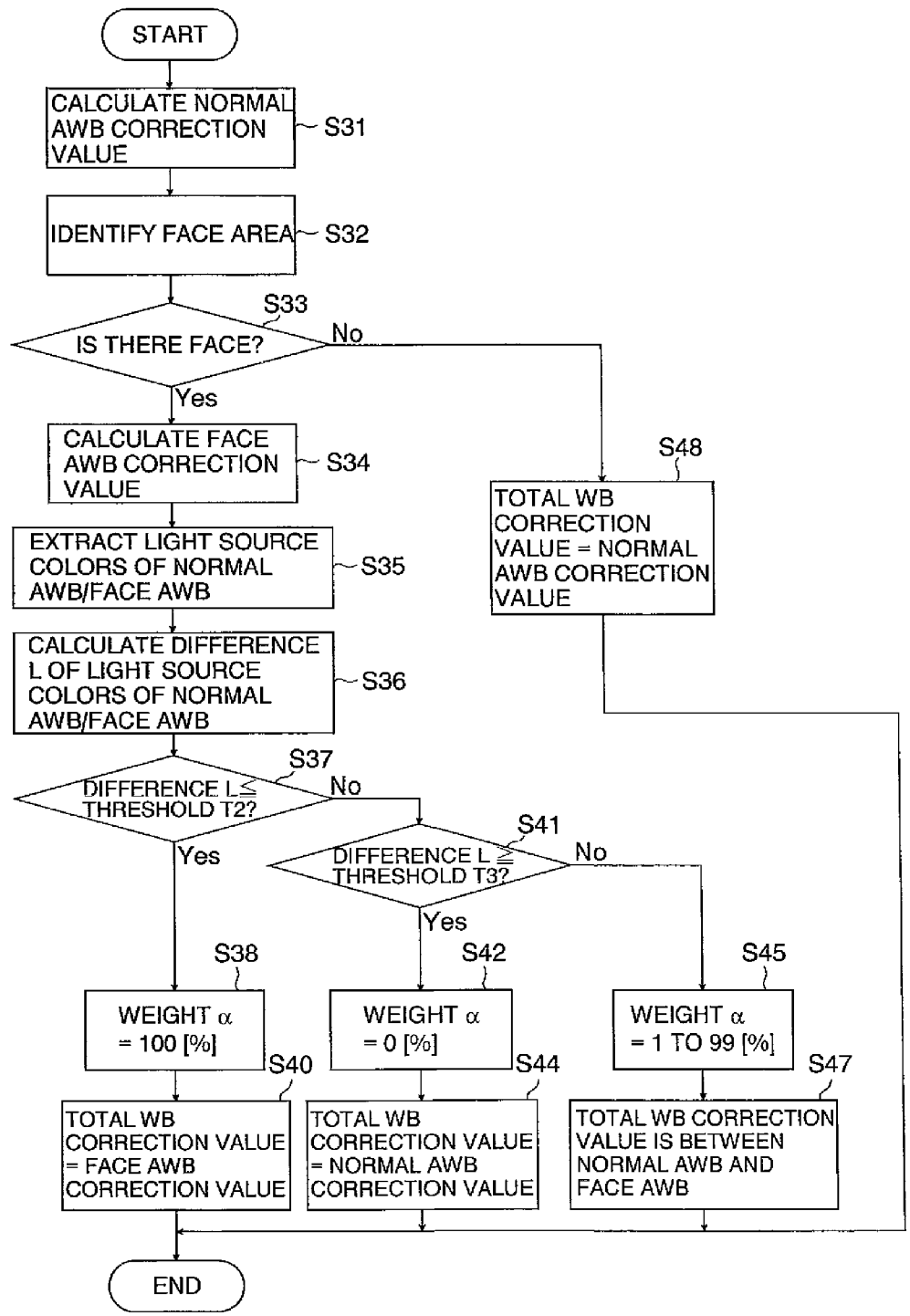
FIG. 16 is a flow chart of a white balance correction process according to the fifth embodiment.

FIG. 16 is a flow chart of a white balance correction process according to the fifth embodiment.

Steps S31 to S36 are the same as steps S11 to S16.

In step S37, whether the difference L is equal to or less than a predetermined threshold T2 is determined. If L≦T2, the process proceeds to step S38. If L>T2, the process proceeds to step S41.

The weight α is set to 100(%) in step S38.

In step S40, the face AWB correction value is set as the final WB correction value. This value is a value where α=100 in the formula of FIG. 15B.

In step S41, whether the difference L is equal to or greater than a predetermined threshold T3 is determined. If L≧T3, the process proceeds to step S42. If L<T3, the process proceeds to step S45.

In step S42, the weight α is set to 0(%).

In step S44, the normal AWB correction value is set as the final WB correction value. This value is the value where α=0 in the formula of FIG. 15B.

In step S45, the weight α is set to a value of 1 to 99(%) corresponding to the difference L. For example, a function (weight α decision function) defining the relationship between the difference L and the weight α as shown in FIG. 15A is stored in advance, and the weight α corresponding to the value of the difference L is identified from the function.

In step S47, the final WB correction value is calculated with a formula, such as the one shown in FIG. 15B, for obtaining a weighted average of the normal AWB correction value and the face AWB correction value using the weight α.

Step S48 is the same as step S10.

Sixth Embodiment

Figure 17:
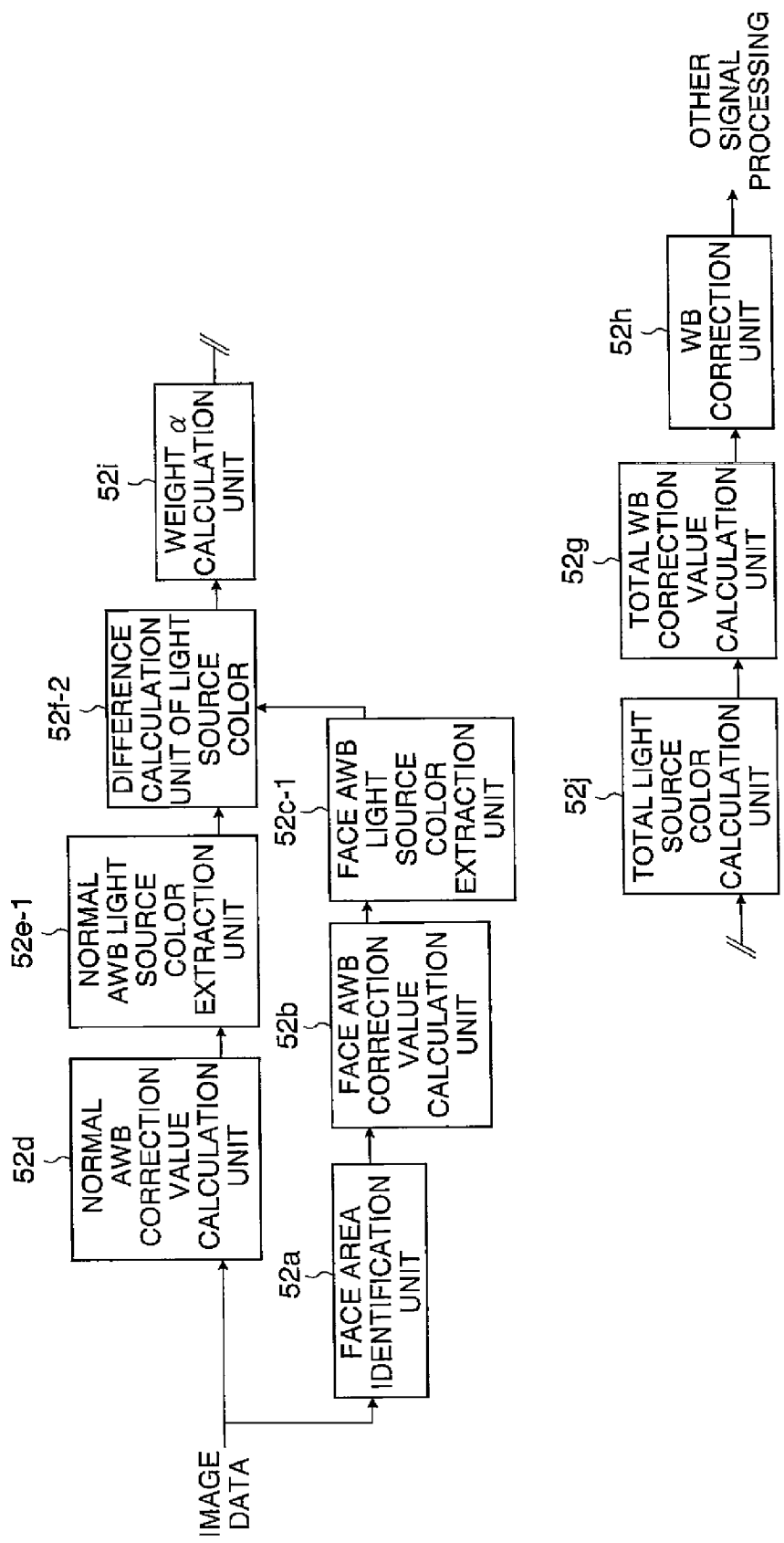
FIG. 17 is a block diagram of the image signal processing circuit according to a sixth embodiment.

FIG. 17 illustrates a block configuration of the image signal processing circuit 44 according to a sixth embodiment. As shown in FIG. 17, a final light source color calculation unit 52j is added to the configuration of the fifth embodiment shown in FIG. 14.

Figures 18A, 18B:
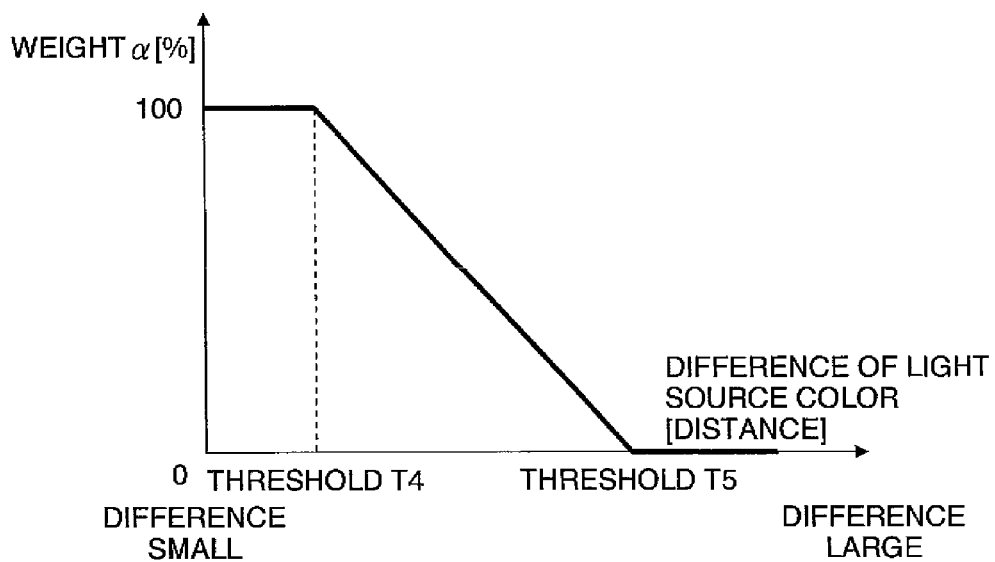
FIGS. 18A and 18B illustrate a weight α identification function and a formula for obtaining a weighted average of a light source color of normal AWB and a light source color of face AWB.

For example, a function (weight α decision function) defining the relationship between the difference L and the weight α as exemplified in FIG. 18A is stored in advance in the weight α calculation unit 52i, and the weight α calculation unit 52i identifies the weight α corresponding to the value of the difference L from the function to calculate the weight α of the light source color.

The final light source color calculation unit 52j calculates a total light source color with a formula, such as the one shown in FIG. 18B, for obtaining a weighted average of the normal AWB light source color and the face AWB light source color using the weight α.

Figure 19:
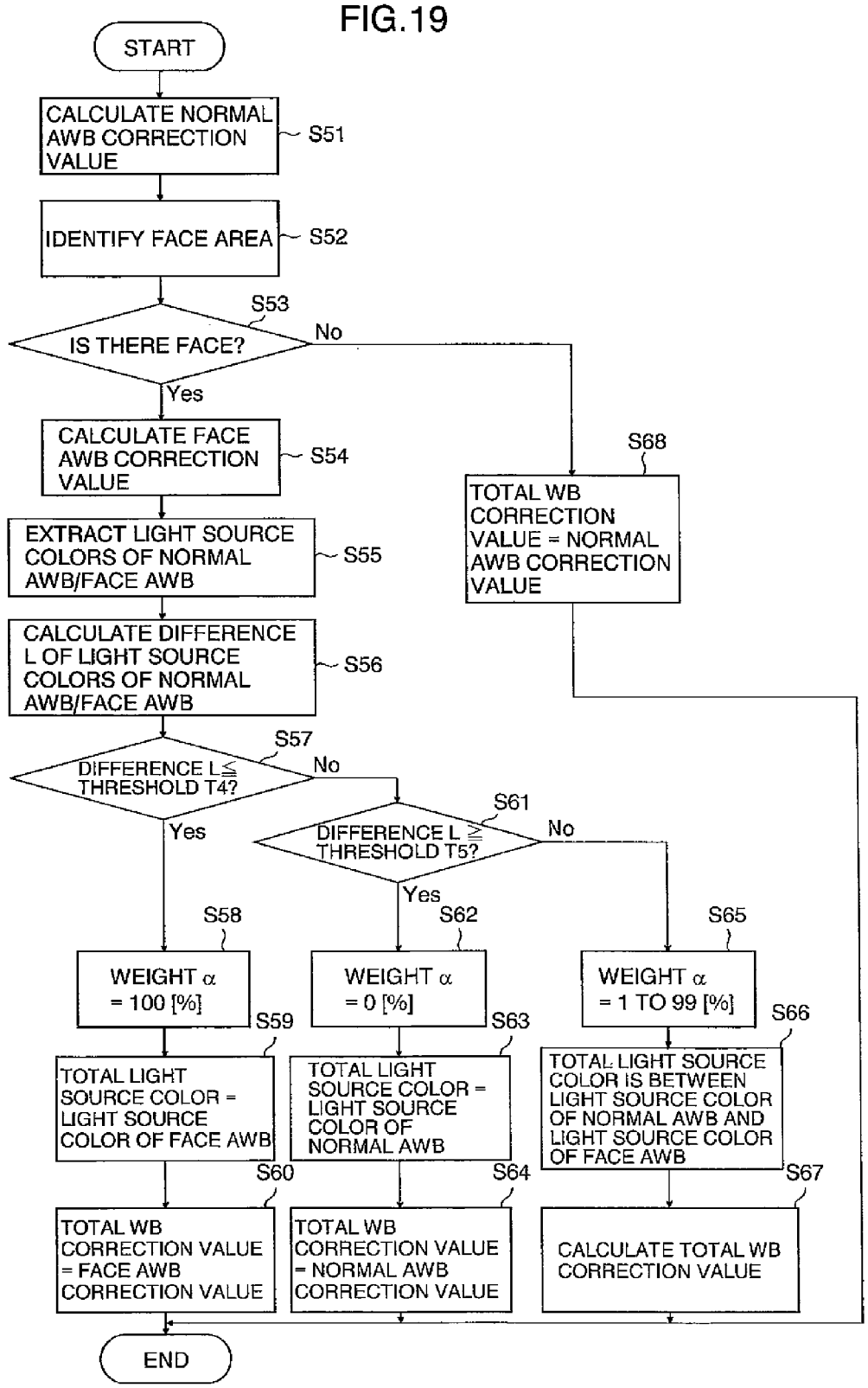
FIG. 19 is a flow chart of a white balance correction process according to the sixth embodiment.

FIG. 19 is a flow chart of a white balance correction process according to a sixth embodiment.

Steps S51 to S56 are the same as steps S31 to S36.

In step S57, whether the difference L is equal to or less than a predetermined threshold T4 is determined. If L≦T4, the process proceeds to step S58. If L>T4, the process proceeds to step S61.

The weight α is set to 100(%) in step S58.

In step S59, the light source color extracted by the face AWB light source color extraction unit 52c-1 is set as the total light source color.

In step S60, the light source color extracted by the face AWB light source color extraction unit 52c-1, which is the total light source color, is set as calculation criteria of the correction value, and the face AWB correction value is set as the total WB correction value.

In step S61, whether the difference L is equal to or greater than a predetermined threshold T5 is determined. If L≧T5, the process proceeds to step S62. If L<T5, the process proceeds to step S65.

The weight α is set to 0(%) in step S62.

In step S63, the light source color extracted by the normal AWB light source color extraction unit 52e-1 is set as the total light source color.

In step S64, the light source color extracted by the normal AWB light source color extraction unit 52e-1, which is the total light source color, is set as calculation criteria of the correction value, and the normal AWB correction value is set as the total WB correction value.

In step S65, the weight α is set to a value of 1 to 99(%) corresponding to the difference L. For example, a function (weight α decision function) defining the relationship between the difference L and the weight α as exemplified in FIG. 18A is stored in advance, and the weight α corresponding to the value of the difference L is identified from the function.

In step S66, the total light source color is calculated with a formula, such as the one in FIG. 18B, for obtaining a weighted average of two light source colors using the weight α.

In step S67, the total light source color is set as calculation criteria of the correction value to calculate the final WB correction value.

Step S68 is the same as step S10.

Seventh Embodiment

Figure 20:
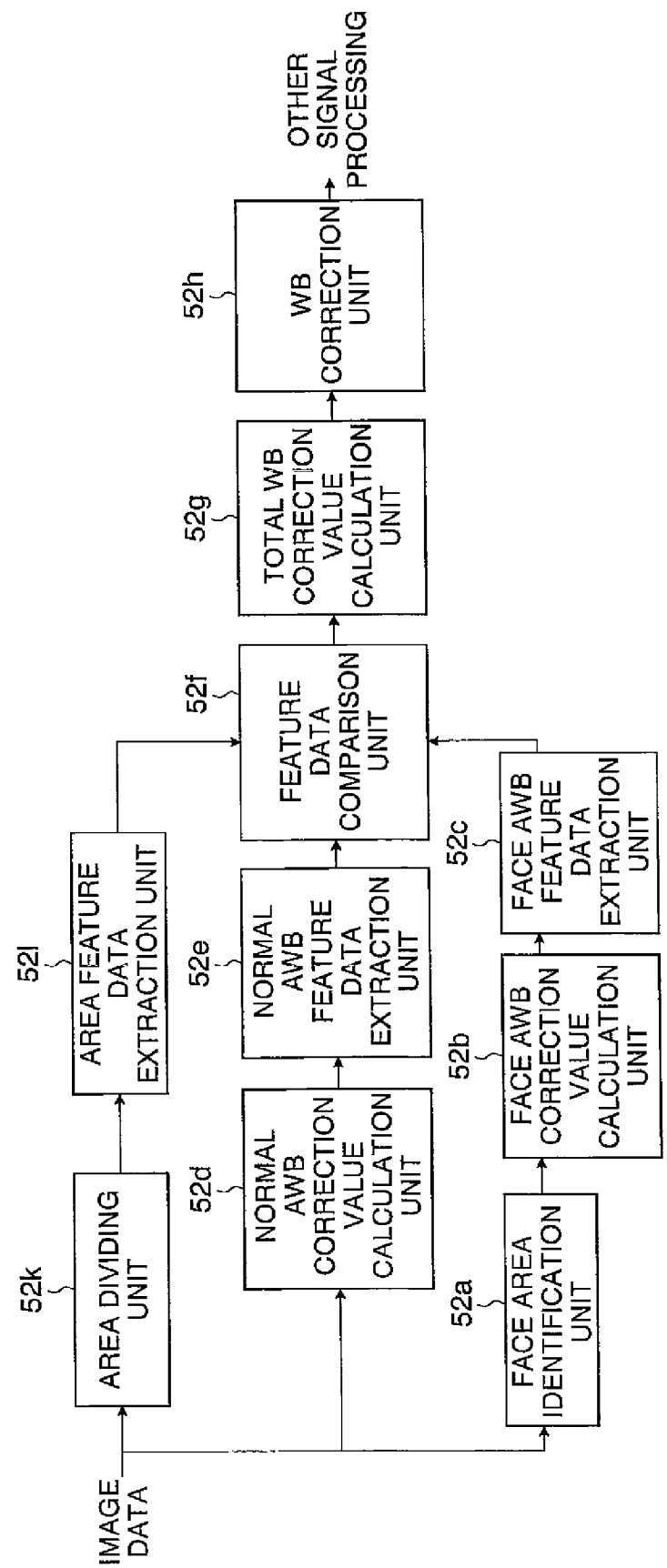
FIG. 20 is a block diagram of the image signal processing circuit according to a seventh embodiment.

FIG. 20 illustrates a block configuration of the image signal processing circuit 44 according to a seventh embodiment. Like reference numerals refer to like blocks in the above embodiments, and the description will be omitted. An area dividing unit 52k and an area feature data extraction unit 52l are added to the configuration of the first embodiment.

The area dividing unit 52k divides the entire image data into predetermined one or a plurality of areas.

FIG. 21 is an example of dividing the image data into a plurality of areas. The method for dividing into a plurality of areas is not limited to the one shown in FIG. 21, and the image data may be divided into more or less small areas. The divided areas do not have to have equal areas or equal intervals, and more precise area division may be performed in accordance with features (for example, whether the areas are contained in the face area) or importance of the areas. The image may also be divided based on different hues. Division into one area means obtaining the entire image data.

Figure 22:
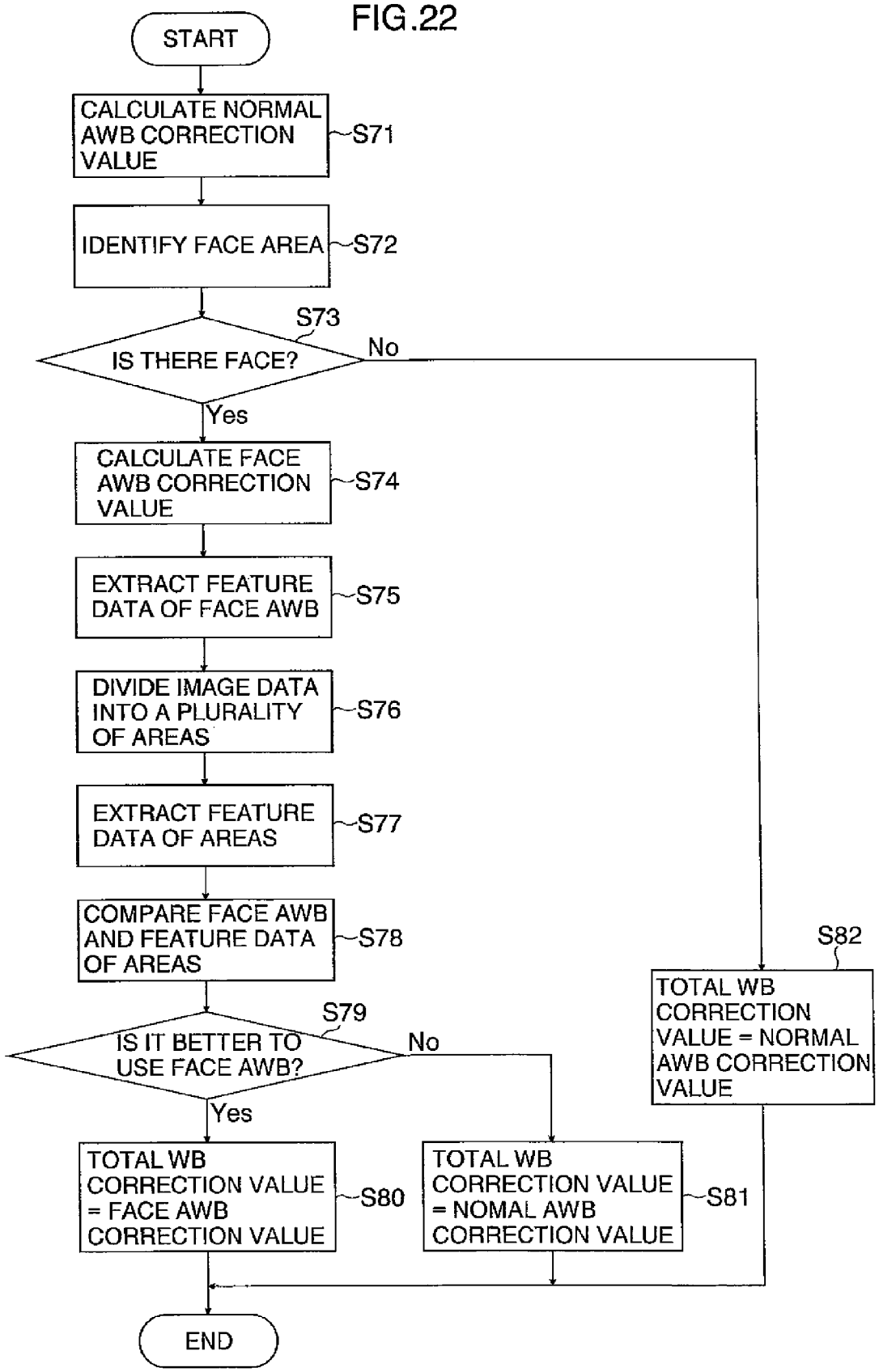
FIG. 22 is a flow chart of a white balance correction process according to the seventh embodiment.

FIG. 22 is a flow chart of a white balance correction process according to the seventh embodiment.

Steps S71 to S75 are the same as steps S1 to S5.

In step S76, the area dividing unit 52k divides the entire image data into one or a plurality of areas.

In step S77, the area feature data extraction unit 52l extracts feature data of the areas. The feature data designates, for example, a representative color of each area. To obtain the representative color of each area, for example, as described in paragraph 0038 of Japanese Patent Application Laid-Open No. 2007-36462 by the present applicant, the image data of each area is used to convert the color of each pixel to each coordinate in the R/G-B/G space, coordinates of the center of gravity of each of the coordinates are then obtained, and the coordinates are set as the coordinates of the representative color.

In step S78, the feature data comparison unit 52f compares the feature data of each area and the feature data from the face area.

In step S79, an appropriate correction value formula is selected in accordance with the result of the comparison between the feature data of each area and the feature data from the face area. For example, as described above, an optimal correction value of one of the correction value (normal AWB correction value) calculated by the normal AWB correction value calculation unit 52d and the correction value (face AWB correction value) calculated by the face AWB correction value calculation unit 52b is selected.

Steps S80 to S82 are the same as steps S8 to S10.

FIGS. 23A to 23D illustrate a specific advantage of the white balance correction.

Figure 23A:
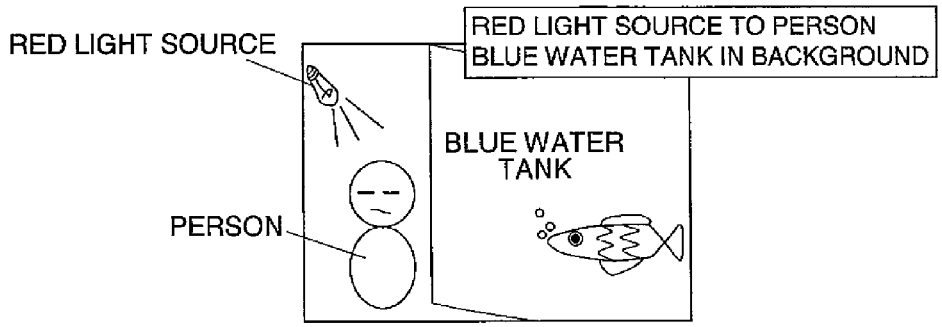
FIGS. 23A, 23B, 23C and 23D illustrate a specific advantage of the white balance correction of the present embodiment.

It is assumed, for example, that a red light source is directed to a person, and a blue water tank exists in the background in one image data, as shown in FIG. 23A.

Figure 23B:
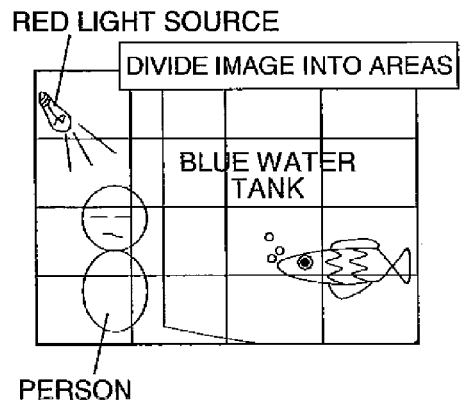

In this case, one screen is divided into a plurality of areas as shown in FIG. 23B, and representative color of each area is calculated as feature data of each area. The representative color of the areas near the water tank is blue, while the representative color of the areas near the light source is red.

Figure 23C:
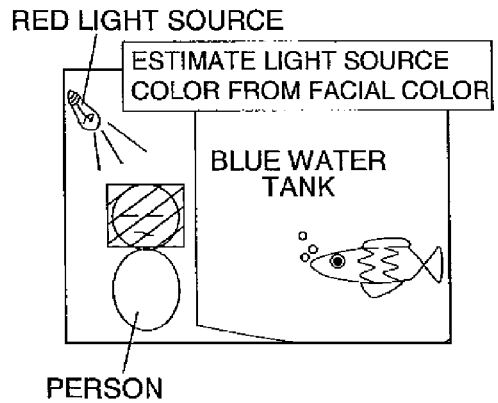

As shown in FIG. 23C, the light source color is estimated from the detected face area. In this case, the light source color is estimated to be red light source from the facial color.

More specifically, a discrepancy occurs between the feature data of the areas and the feature data of the face area, and image data to be obtained will differ if the white balance correction is performed in accordance with both feature data. Therefore, a more appropriate white balance correction needs to be performed based on one of the feature data.

Figure 23D:
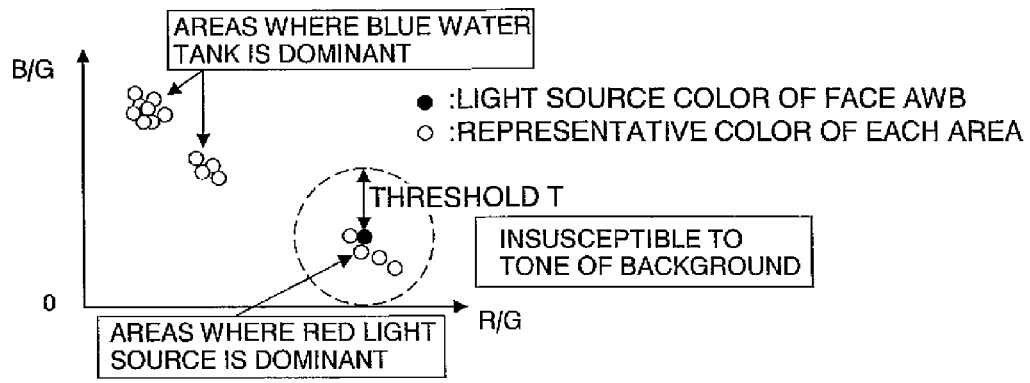

As shown in FIG. 23D, when the feature data (representative color) of the face area and the feature data (representative colors) of each area are plotted in the R/G-B/G color space, feature data of areas near the light source where the red light source is dominant is concentrated around the feature data of the face area, and areas near the water tank are concentrated on locations where blue is dominant.

If a certain amount of feature data of the divided areas exist in the neighborhood of a predetermined threshold T with the face area at its center, it can be determined that the correct light source color is indicated. It can also be identified that the blue feature data outside the neighborhood is a color dominating the background, thereby enabling to identify that the white balance correction with the face AWB is a better correction method.

This method is especially effective when the light source estimation in the normal AWB is quite different from the light source estimation in the face AWB as a result of the dominance of the majority of the image with a color unrelated to the original color as shown in FIGS. 24A to 24D.

Figure 24A:
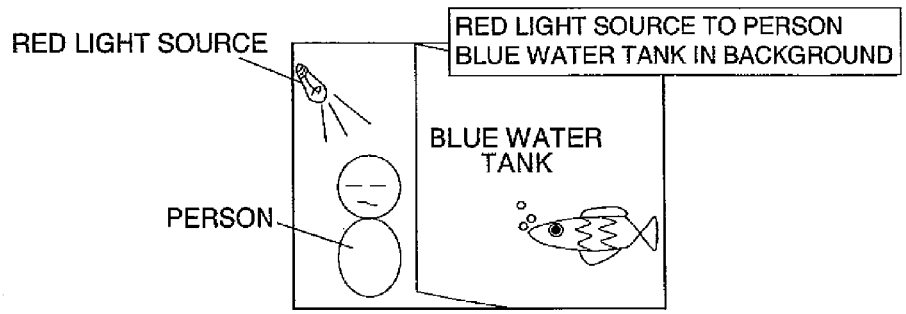
FIGS. 24A, 24B, 24C and 24D illustrate image data in which a light source estimated in the normal AWB is quite different from a light source estimated in the face AWB.
Figure 24B:
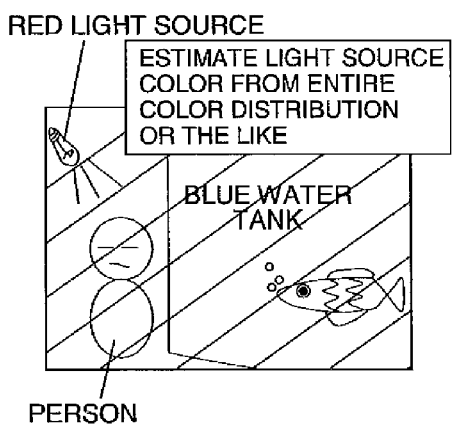
Figure 24C:
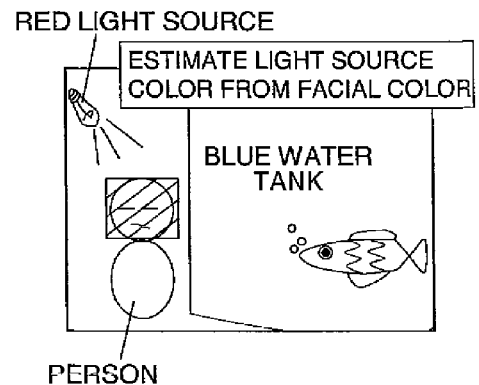
Figure 24D:
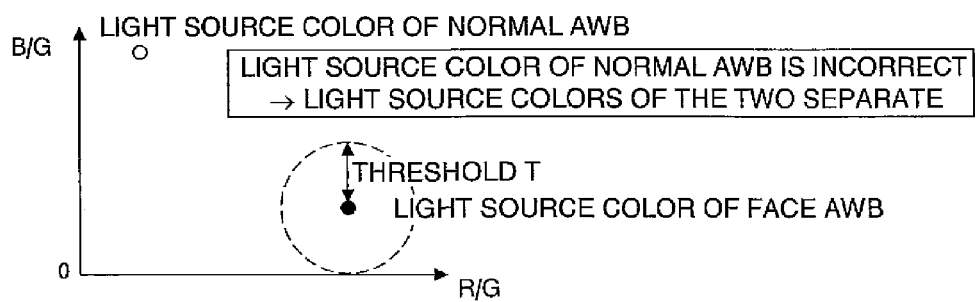

FIGS. 24A to 24D show the remove of light source colors estimated in the normal AWB and that in the face AWB under the same condition as FIGS. 23A to 23D. As shown in FIG. 24B, in the normal AWB, a light source color is estimated based on the color distribution and so on of the whole image. On the other hand, as shown in FIG. 24C, in the face AWB, a light source color is estimated based on the facial color in the face area. As a result, as shown in FIG. 24D, the light source color estimated in the normal AWB and that in the face AWB are far removed from each other.

Eighth Embodiment

Figure 25:
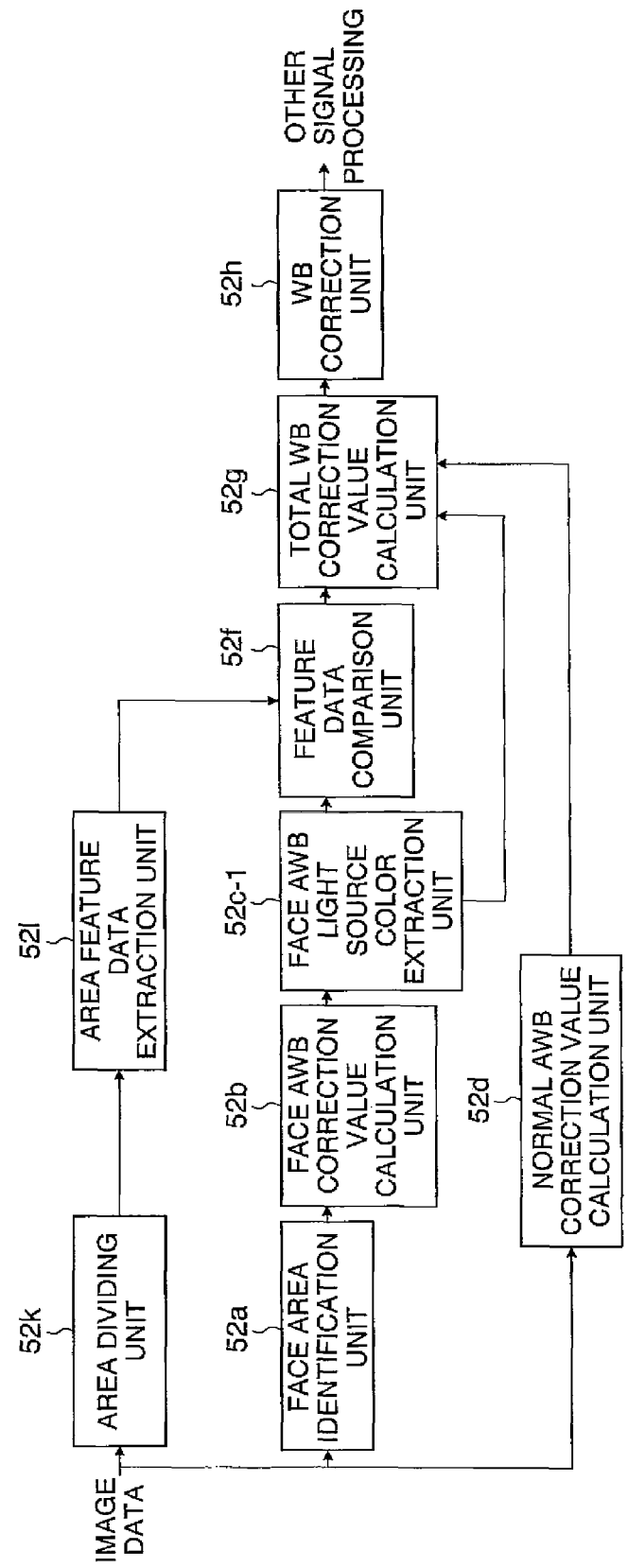
FIG. 25 is a block diagram of the image signal processing circuit according to an eighth embodiment.

FIG. 25 illustrates a block configuration of the image signal processing circuit 44 according to an eighth embodiment. Like reference numerals refer to like blocks in other embodiments.

Figure 26:
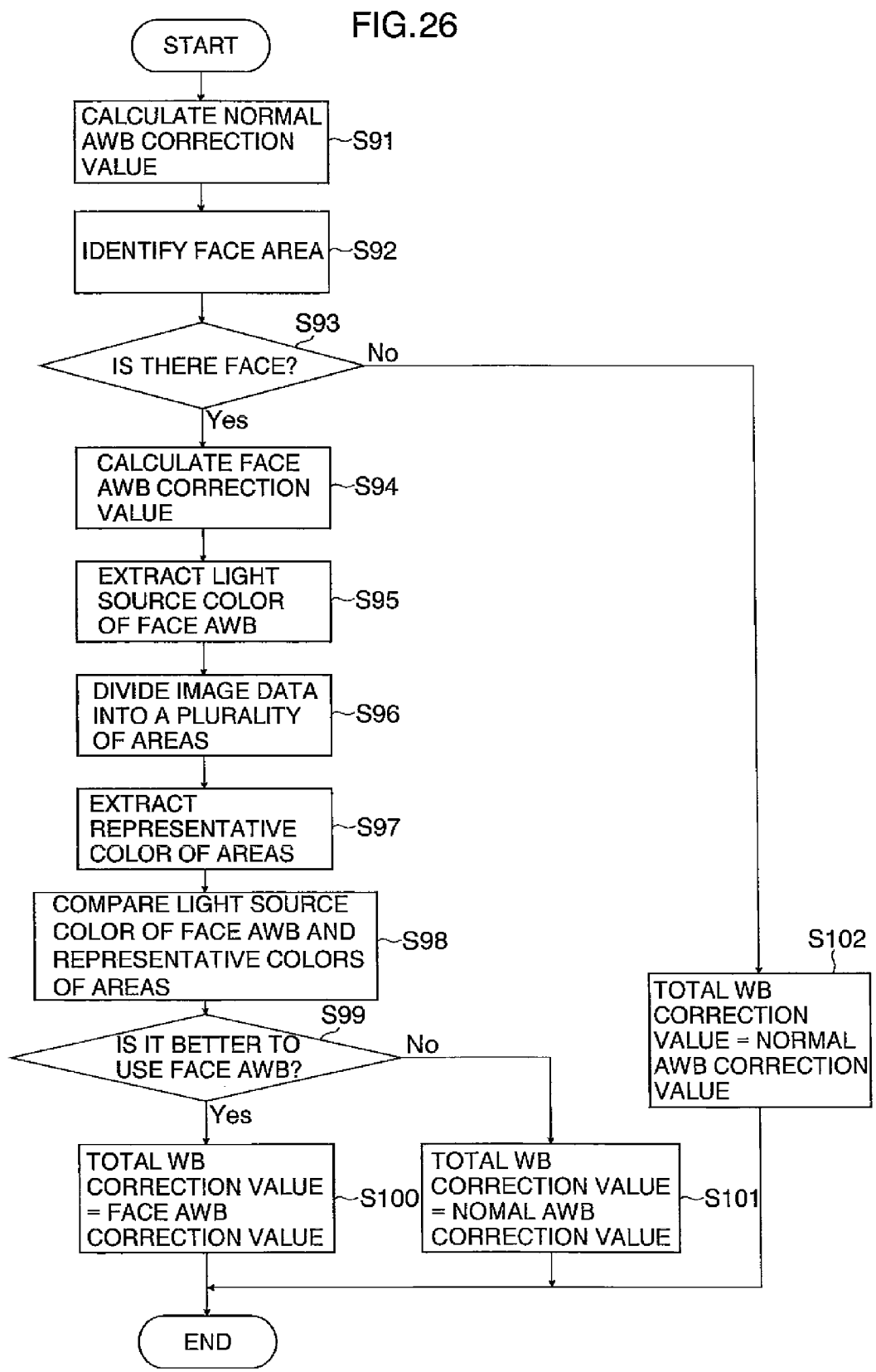
FIG. 26 a flow chart of a white balance correction process according to the eighth embodiment.

FIG. 26 is a flow chart of a white balance correction process according to the eighth embodiment.

Steps S91 to S94 are the same as steps S71 to S74.

Figure 27:
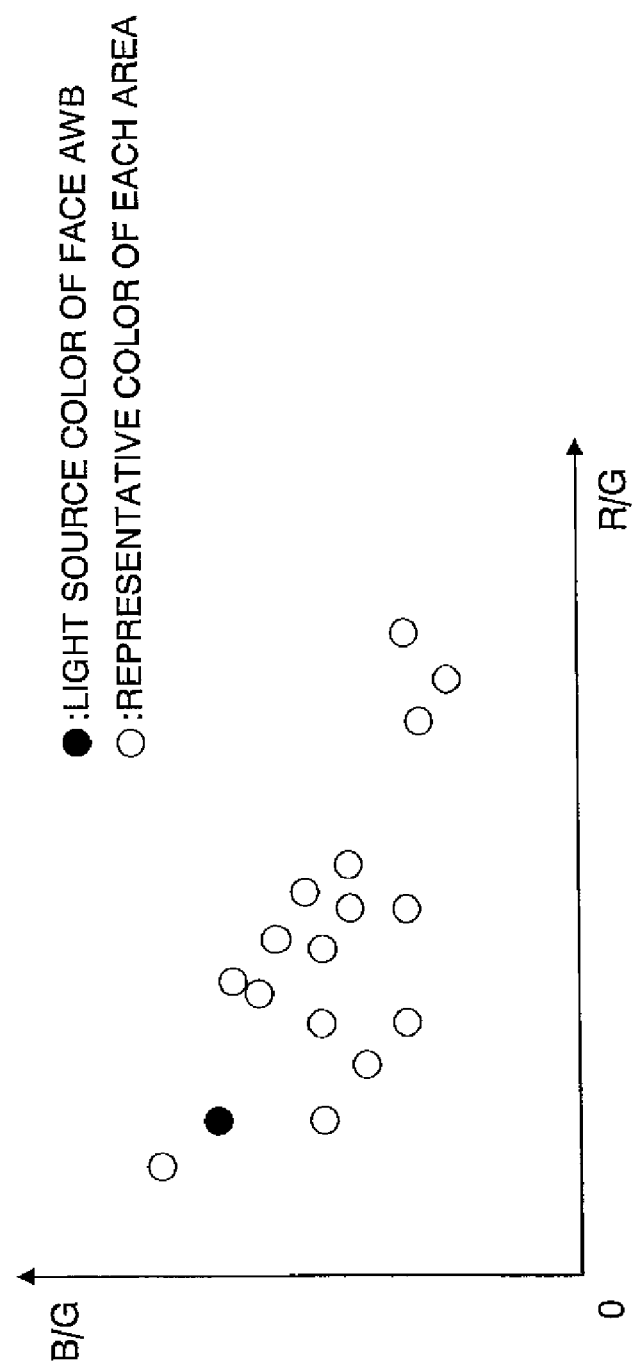
FIG. 27 illustrates plotting of a light source color of a face area and representative colors of areas in the color space.

In step S95, the face AWB feature data extraction unit 52c extracts the light source color from the face area and then plots the extracted light source color to the color space (see, for example, FIG. 27).

Step S96 is the same as step S76.

In step S97, the area feature data extraction unit 52l extracts a representative color of each area (for example, an average color of the pixels in each area) from each of the area and then plots the extracted representative color of each area to the color space (see, for example, FIG. 27).

In step S98, the feature data comparison unit 52f compares the representative color of each area with the light source color of the face area.

Step S99 is branched into step S100 or step S101 in accordance with the comparison result in step S98.

Steps S100 to S102 are the same as steps S80 to S82.

Ninth Embodiment

Figure 28:
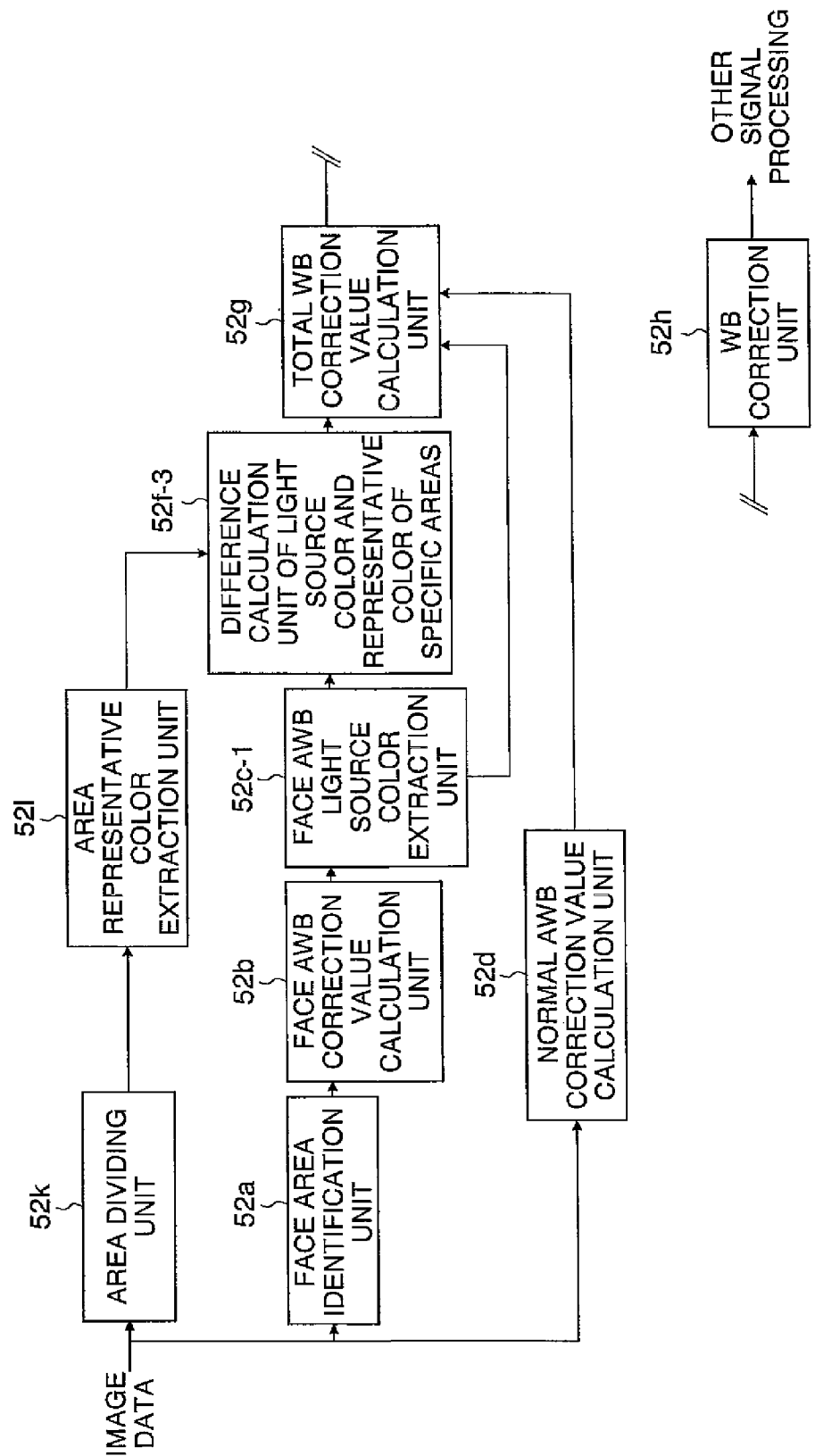
FIG. 28 is a block diagram of the image signal processing circuit according to a ninth embodiment.

FIG. 28 illustrates a block diagram of the image signal processing circuit 44 according to a ninth embodiment. Like reference numerals refer to like blocks in other embodiments.

A difference calculation unit 52f-3 of the light source color and the representative color of specific areas calculates, with a formula as shown in FIG. 29, differences (distances) L between the representative color of each area in the color space and the light source color obtained by the face AWB light source color extraction unit 52.

Figure 30:
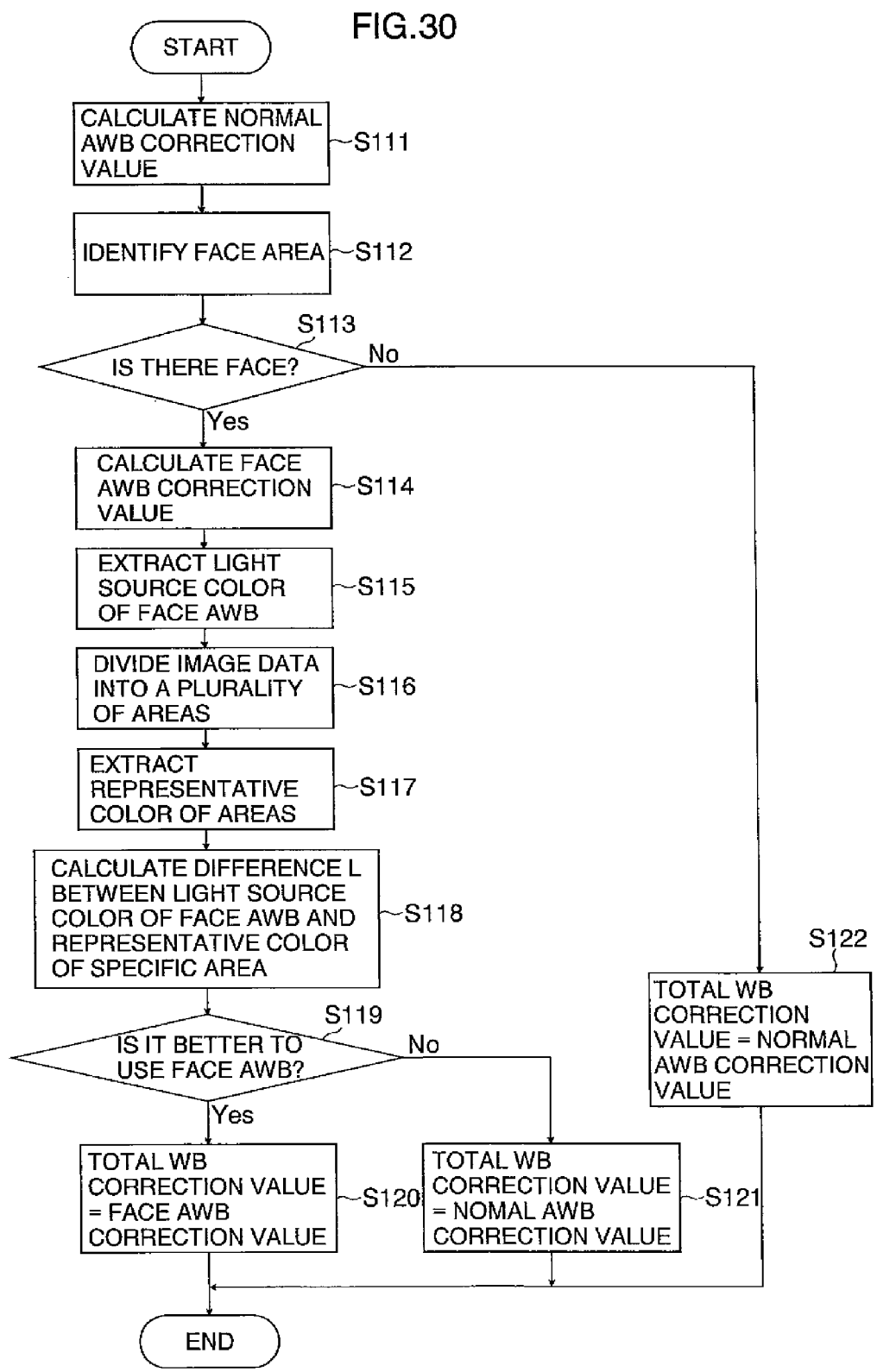
FIG. 30 is a flow chart of a white balance correction process according to the ninth embodiment.

FIG. 30 is a flow chart of a white balance correction process according to the ninth embodiment.

Steps S111 to S117 are the same as steps S91 to S97.

Figure 31:
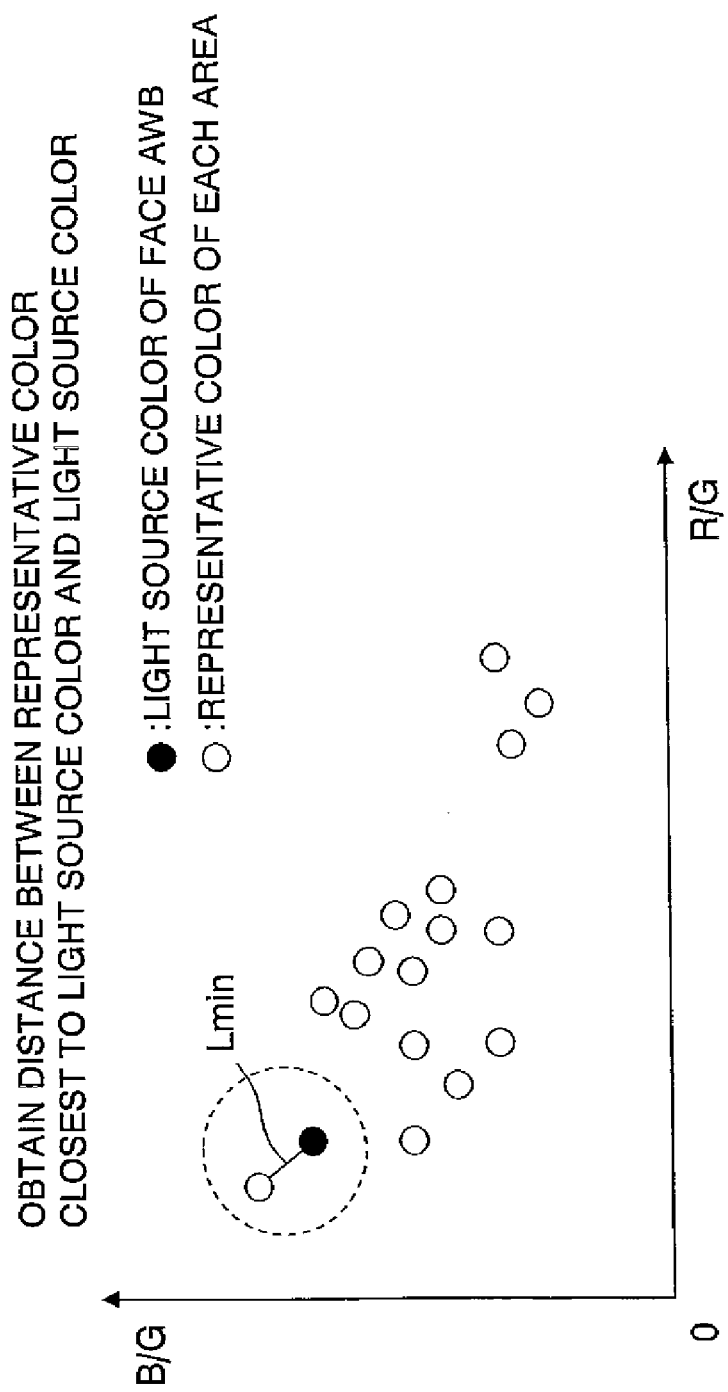
FIG. 31 illustrates a minimum value Lmin among the differences Li from the light source color of the face area obtained for representative colors of the areas.

In step S118, differences (distances) Li (reference character i is an integer designating a suffix provided to an area, i=1 to n, n: total number of areas) between the representative color of each area Ri in the color space and the light source color obtained by the face AWB light source color extraction unit 52 are calculated based on a formula such as the one illustrated in FIG. 29. A minimum value Lmin is then determined from the differences Li (L1 to Ln) obtained for each area (see FIG. 31).

In step S119, the total WB correction value calculation unit 52g selects an appropriate correction value calculation method based on the difference Lmin. For example, as described above, this is conducted by selecting the optimal correction value from one of the correction value (normal AWB correction value) calculated by the normal AWB correction value calculation unit 52d and the correction value (face AWB correction value) calculated by the face AWB correction value calculation unit 52b in accordance with the magnitude correlation between the difference Lmin and a predetermined threshold. If the face AWB correction value is selected, the process proceeds to step S120. If the normal AWB correction value is selected, the process proceeds to step S121.

Steps S120 to S122 are the same as steps S100 to S102.

Tenth Embodiment

Figure 32:
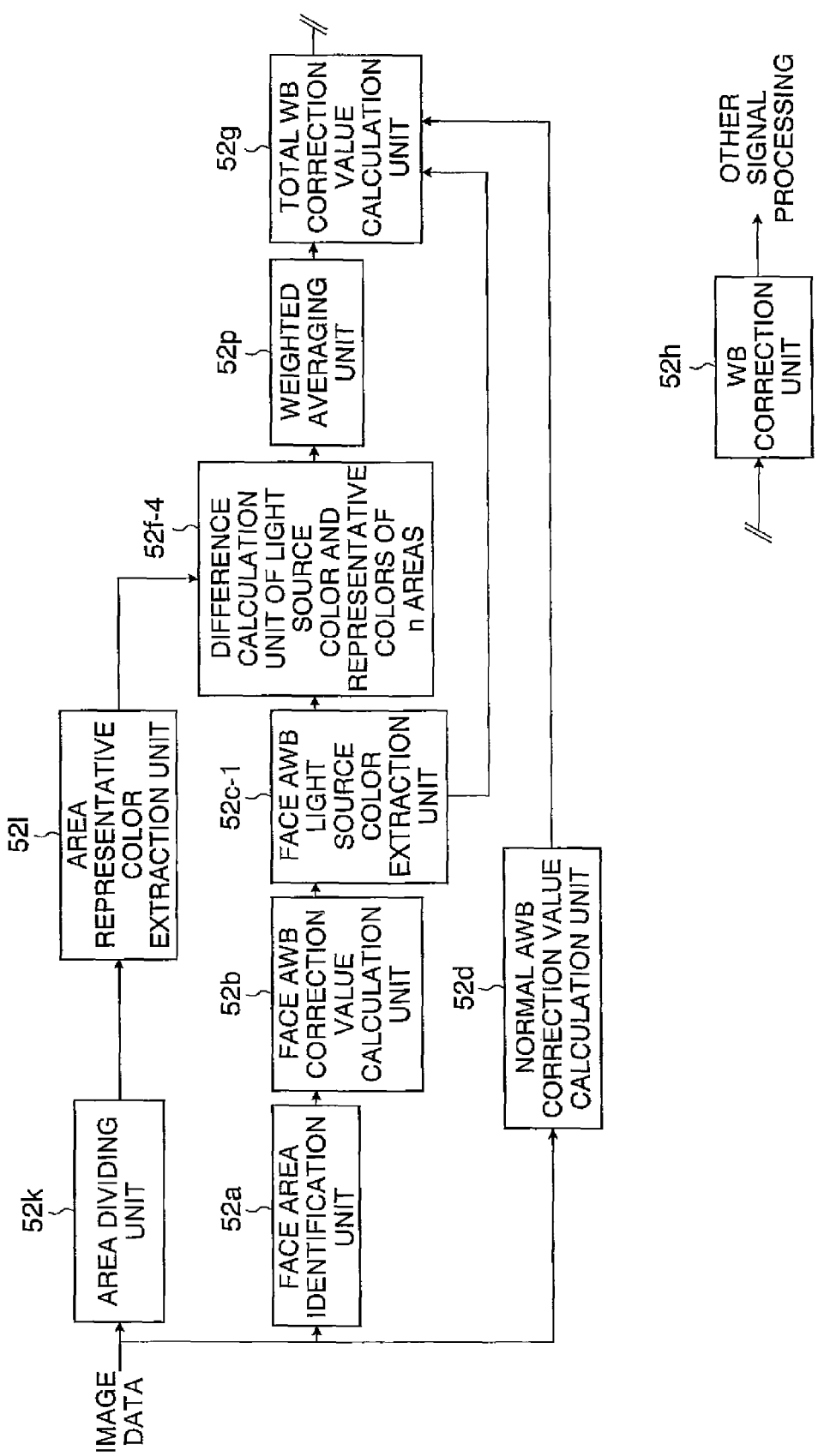
FIG. 32 is a block diagram of the image signal processing circuit according to a tenth embodiment.

FIG. 32 illustrates a block configuration of the image signal processing circuit 44 according to a tenth embodiment. Like reference numerals refer to like blocks in other embodiments.

A difference calculation unit 52f-4 of light source color and n representative colors of the areas calculates differences between the representative colors of the areas and the light source color of the face AWB light source color extraction unit 52c-1.

Figure 33:
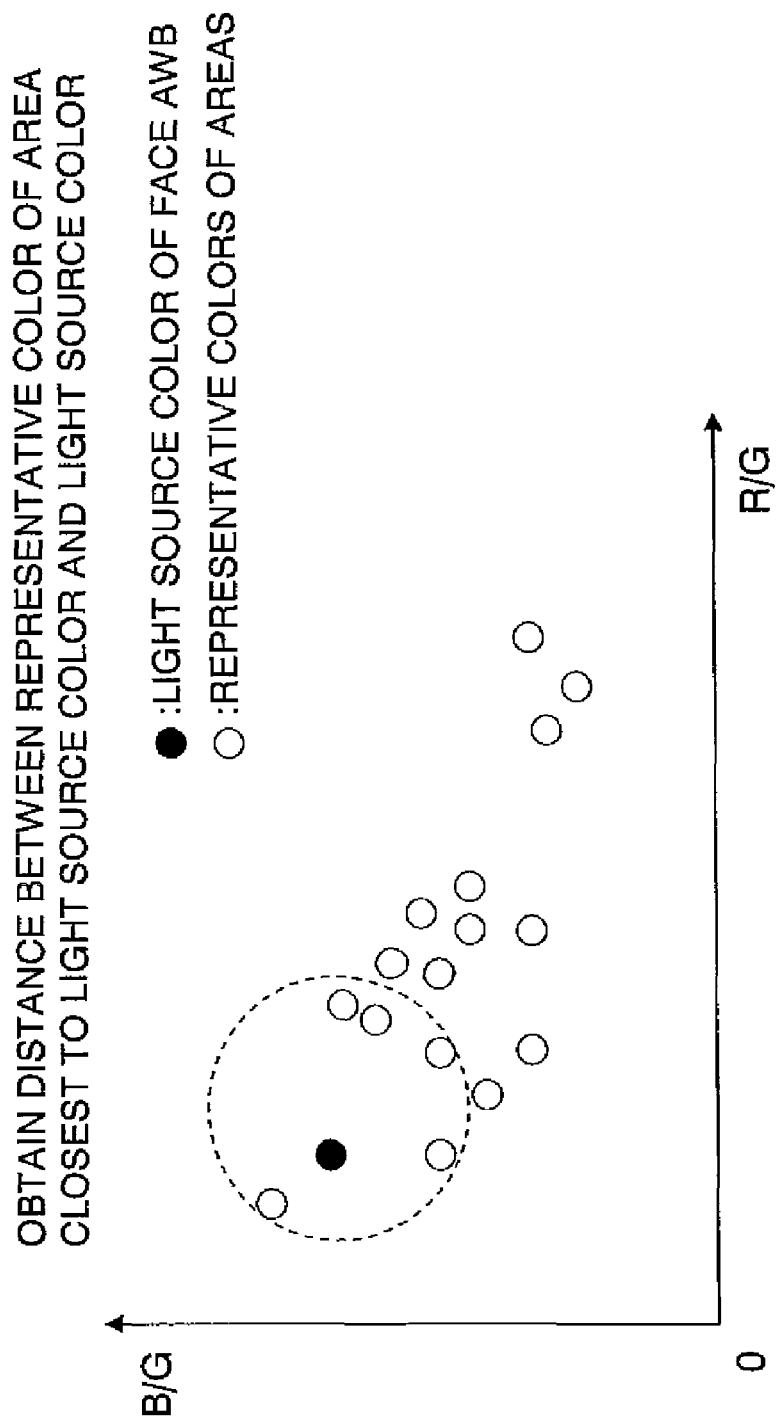
FIG. 33 illustrates locations of a predetermined number of representative colors located near the light source color and the light source color in the color space.

For example, as shown in FIG. 33, distances between a predetermined number (for example, about 5 to 20% of the number of total areas) of representative colors located near the light source color and the light source color are obtained for each representative color.

Figure 34:
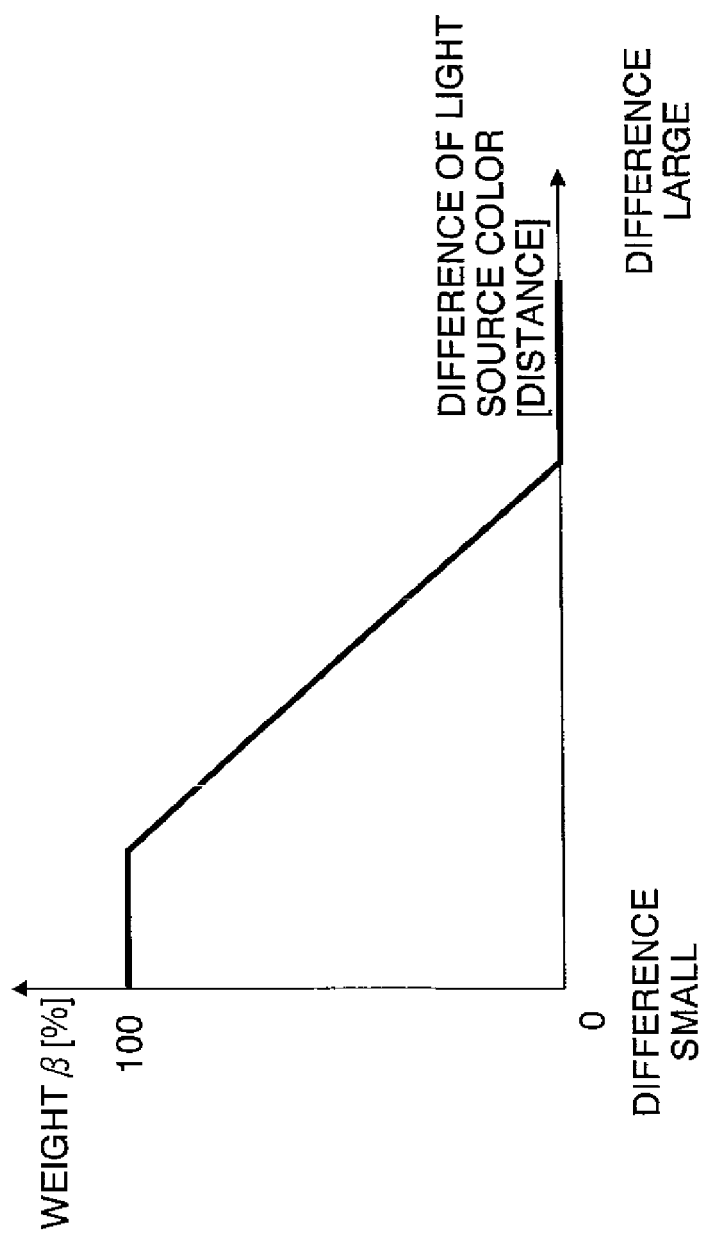
FIG. 34 illustrates a function defining a relationship between difference and weight for identifying a weight βi.

A weight averaging unit 52p calculates a weighted average of the differences by multiplying weight βi corresponding to the difference (distance) Li between the representative color of each area and the light source color (the formula is shown in FIG. 35). The weights βi (i=1 to n) corresponding to the differences Li are identified from, for example, a weight βi decision function defining the relationship between difference and weight as shown in FIG. 34.

Figure 36:
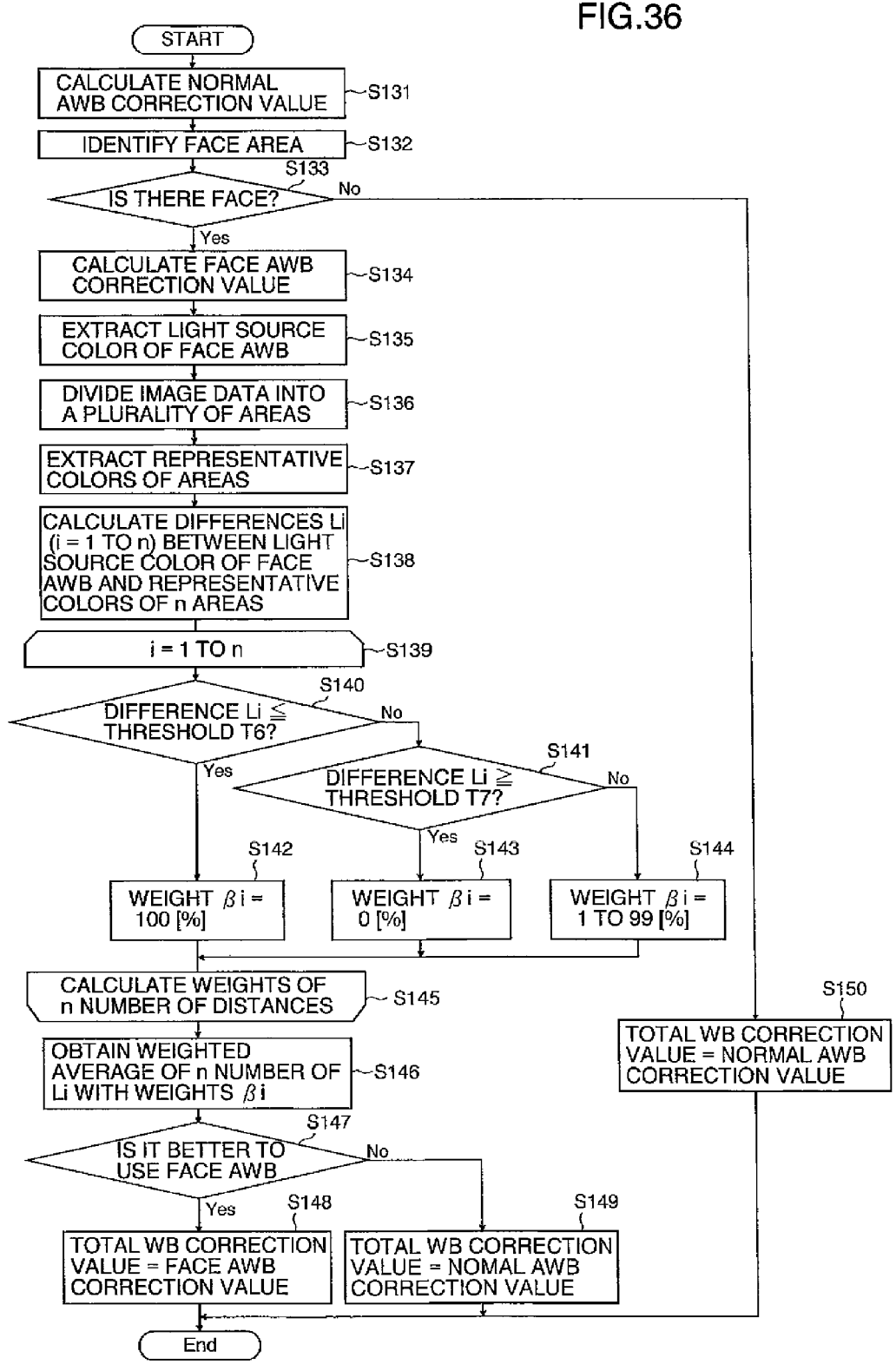
FIG. 36 is a flow chart of a white balance correction process according to the tenth embodiment.

FIG. 36 is a flow chart of a white balance correction process according to a tenth embodiment.

Steps S131 to S137 are the same as steps S111 to S117.

In step S138, difference (distance) Li (i=1 to n) between the representative color of each area and the light source color is calculated.

Steps S139 to S145 are processes repeated until all (n pieces) weights βi each of which corresponds to the difference Li of each area are calculated.

In step S140, whether the difference Li is equal to or less than a threshold T6 is judged. If the judgment is "Y", the process proceeds to step S142. If the judgment is "N", the process proceeds to step S141.

In step S141, whether the difference Li is equal to or greater than a predetermined threshold T7 is judged. If the judgment is "Y", the process proceeds to step S143. If the judgment is "N", the process proceeds to step S144.

In step S142, the weight βi is set to 100% in accordance with the weight decision function of FIG. 34.

In step S143, the weight βi is set to 0% in accordance with the weight decision function of FIG. 34.

In step S144, the weight βi is set to 1 to 99% in accordance with the weight decision function of FIG. 34.

In step S145, whether n number of weights have been calculated is determined. If the calculation has been performed, the process proceeds to step S146. If the calculation has not been performed, the process returns to step S140.

In step S146, a weighted average L' of the differences is calculated by weighting and averaging the differences Li with the weights βi corresponding to the differences Li (see FIG. 35).

In step S147, the total WB correction value calculation unit 52g selects an appropriate correction value calculation method based on the difference weighted average L'. The specific example for this selection is the same as described above. If a first calculation method (for example, face AWB correction value) is selected, the process proceeds to step S148. If a second calculation method (for example, normal AWB correction value) is selected, the process proceeds to step S149.

Steps S148 to S150 are the same as steps S120 to S122.

Eleventh Embodiment

Figure 37:
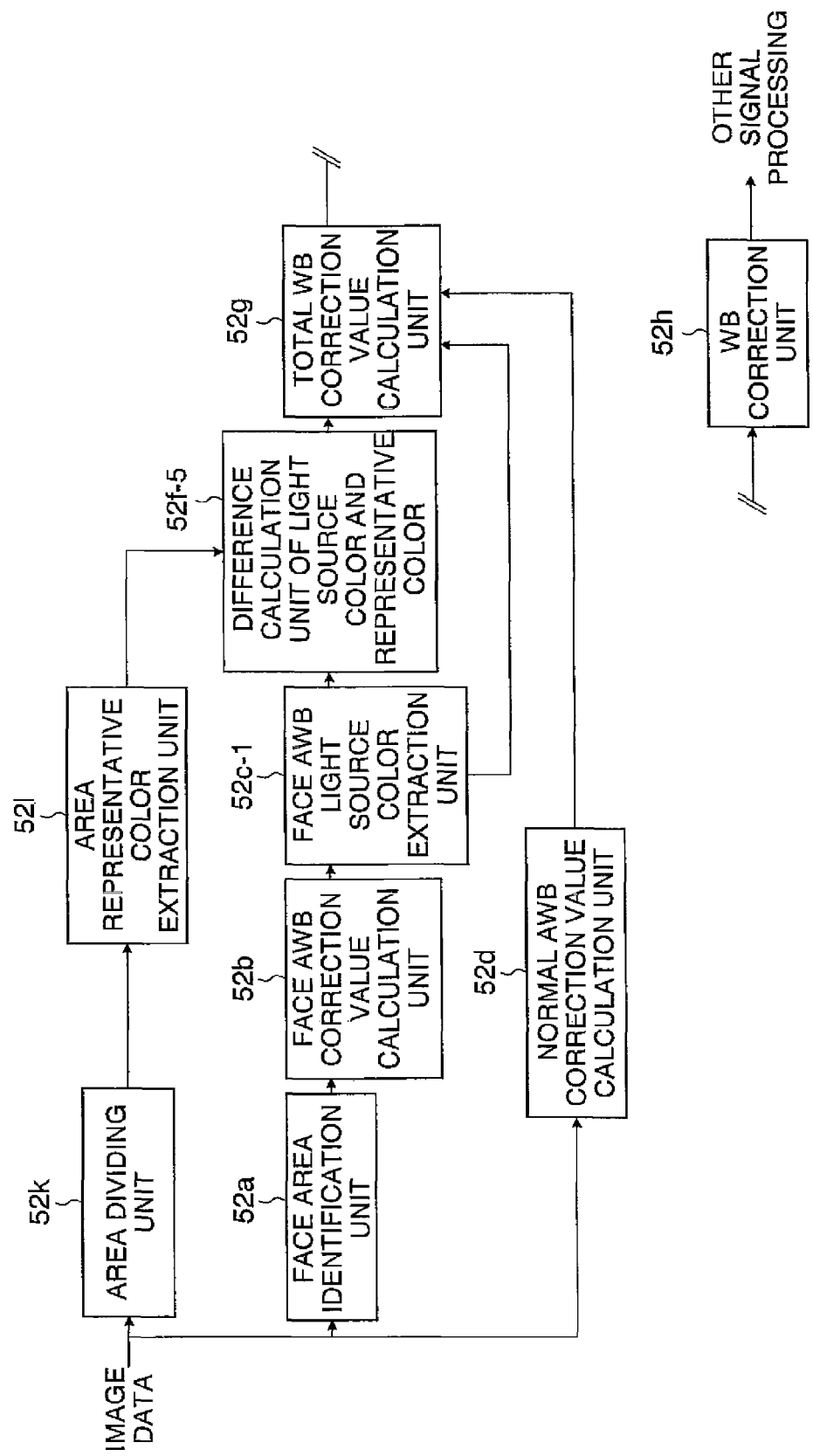
FIG. 37 is a block diagram of the image signal processing circuit according to en eleventh embodiment.

FIG. 37 illustrates a block configuration of the image signal processing circuit 44 according to an eleventh embodiment. Like reference numerals refer to like blocks in other embodiments.

A difference calculation unit 52f-5 of the light source color and the representative colors calculates a difference between the representative color of each area and the light source color from the face AWB light source color extraction unit 52c-1.

Figure 38:
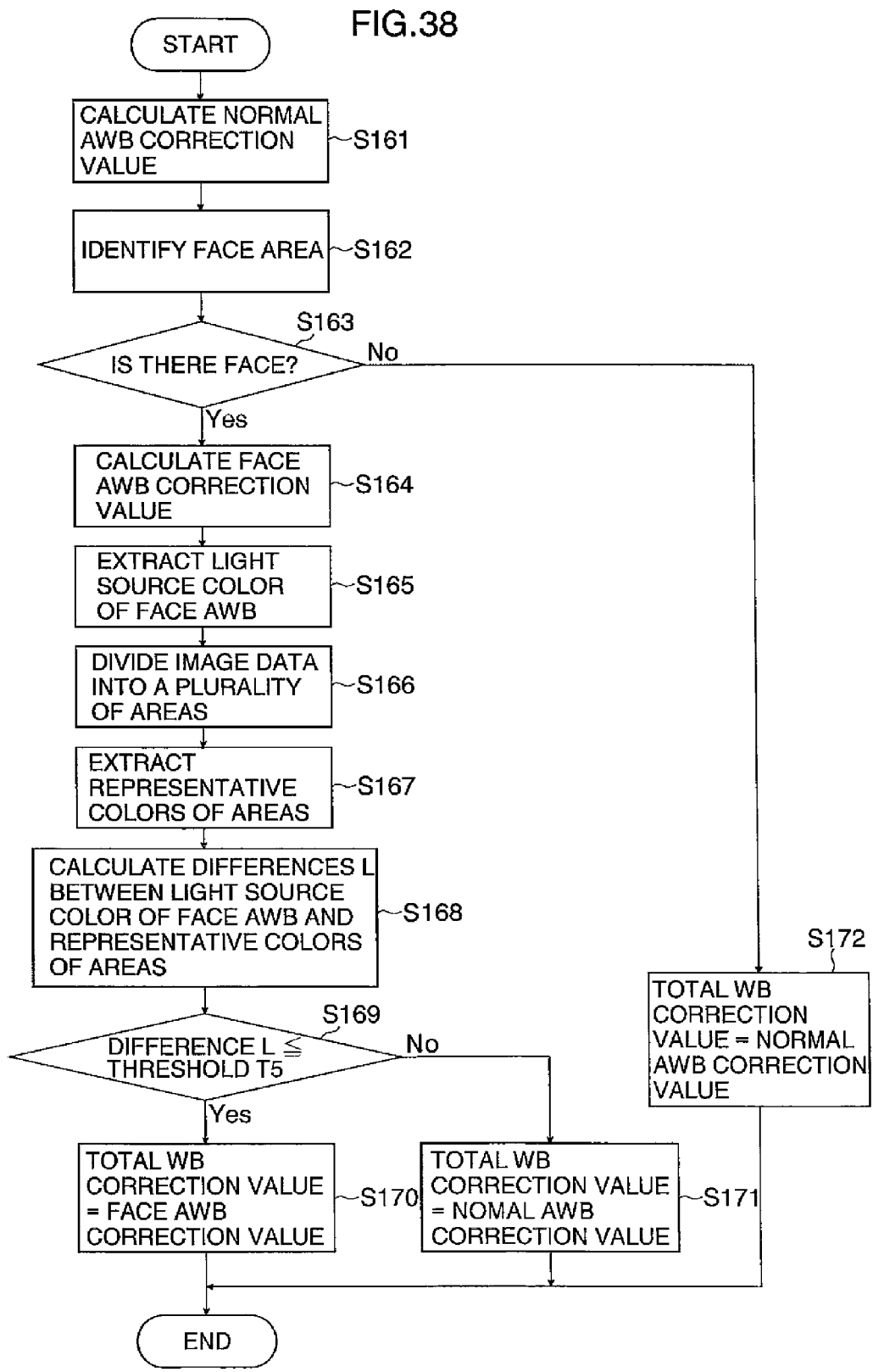
FIG. 38 is a flow chart of a white balance correction process according to the eleventh embodiment.

FIG. 38 is a flow chart of the white balance correction process according to the eleventh embodiment.

Steps S161 to S167 are the same as steps S131 to S137.

In step S168, a difference L between the light source color of the face AWB and the representative color of each area is calculated. What kind of difference is to be used can be determined arbitrarily, and for example, the minimum value Lmin of the differences or the weight average L' of the differences may be used.

In step S169, whether the difference L is equal to or less than a predetermined threshold T5 is determined. If L≦T5 the process proceeds to step S170. If L>T5, the process proceeds to step S171.

Steps S170 to S172 are the same as steps S28 to S30.

Twelfth Embodiment

Figure 39:
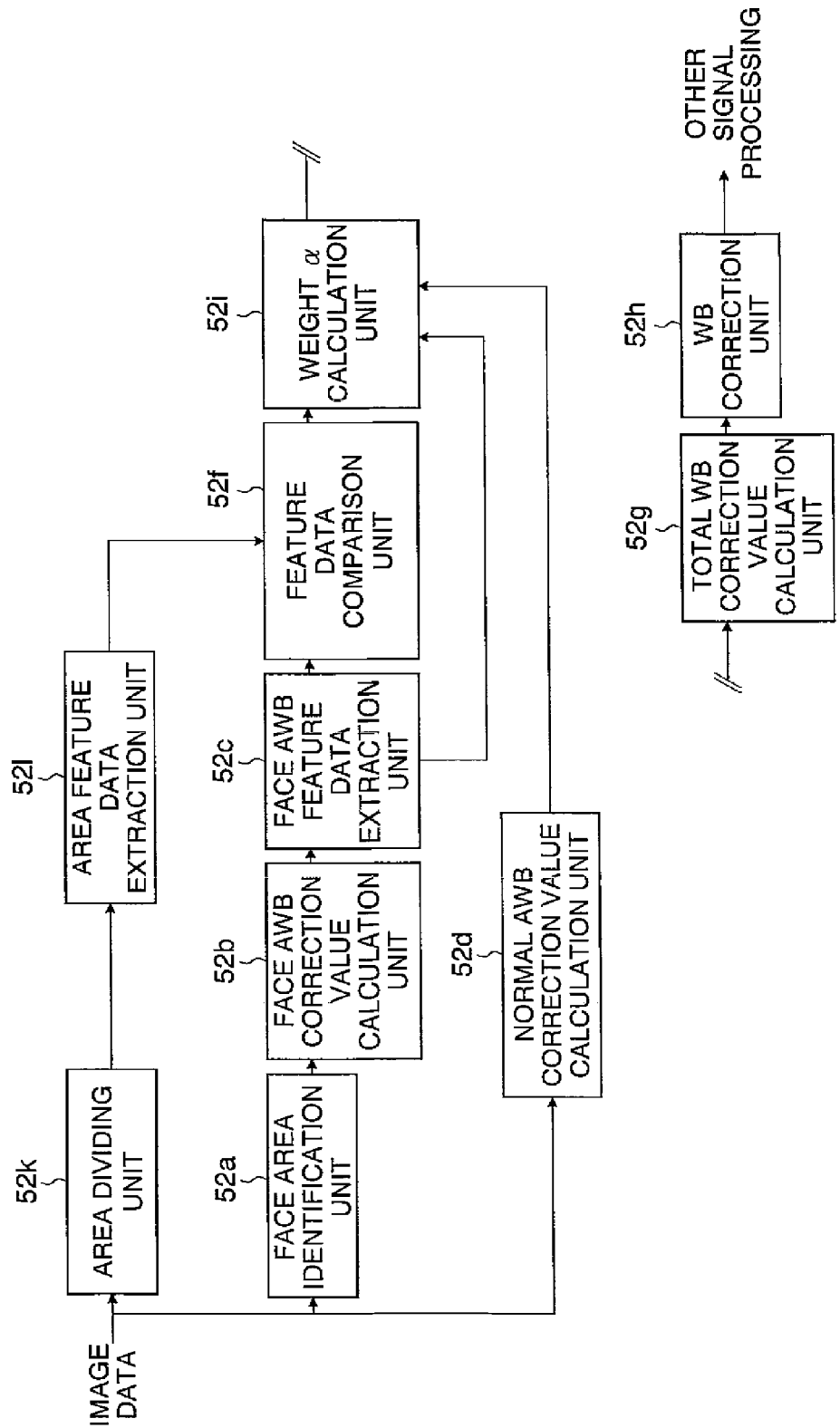
FIG. 39 is a block diagram of the image signal processing circuit according to a twelfth embodiment.

FIG. 39 illustrates a block configuration of the image signal processing circuit 44 according to a twelfth embodiment. Like reference numerals refer to like blocks in other embodiments.

Figure 40:
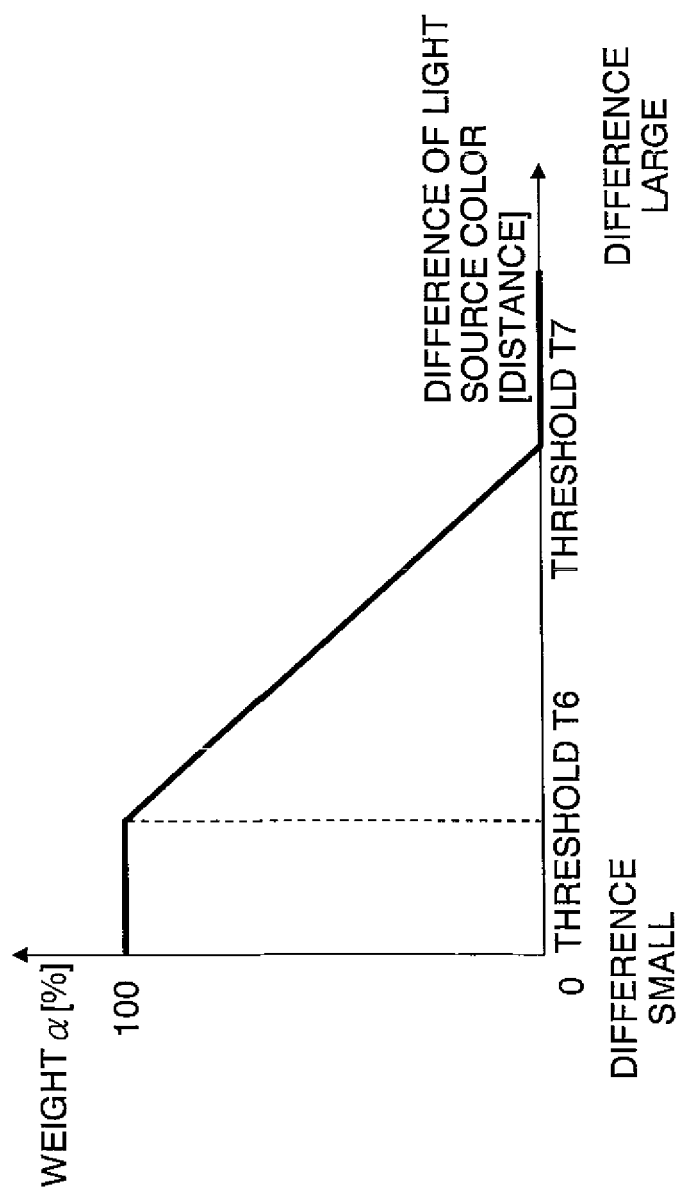
FIG. 40 illustrates a function defining a relationship between difference and weight for identifying a weight α corresponding to a value of a difference L.

The weight α calculation unit 52i stores a function, such as the one in FIG. 40, defining the relationship between difference L and weight α in advance and calculates a weight α by identifying the weight α corresponding to the value of difference L from the function.

Figure 41:
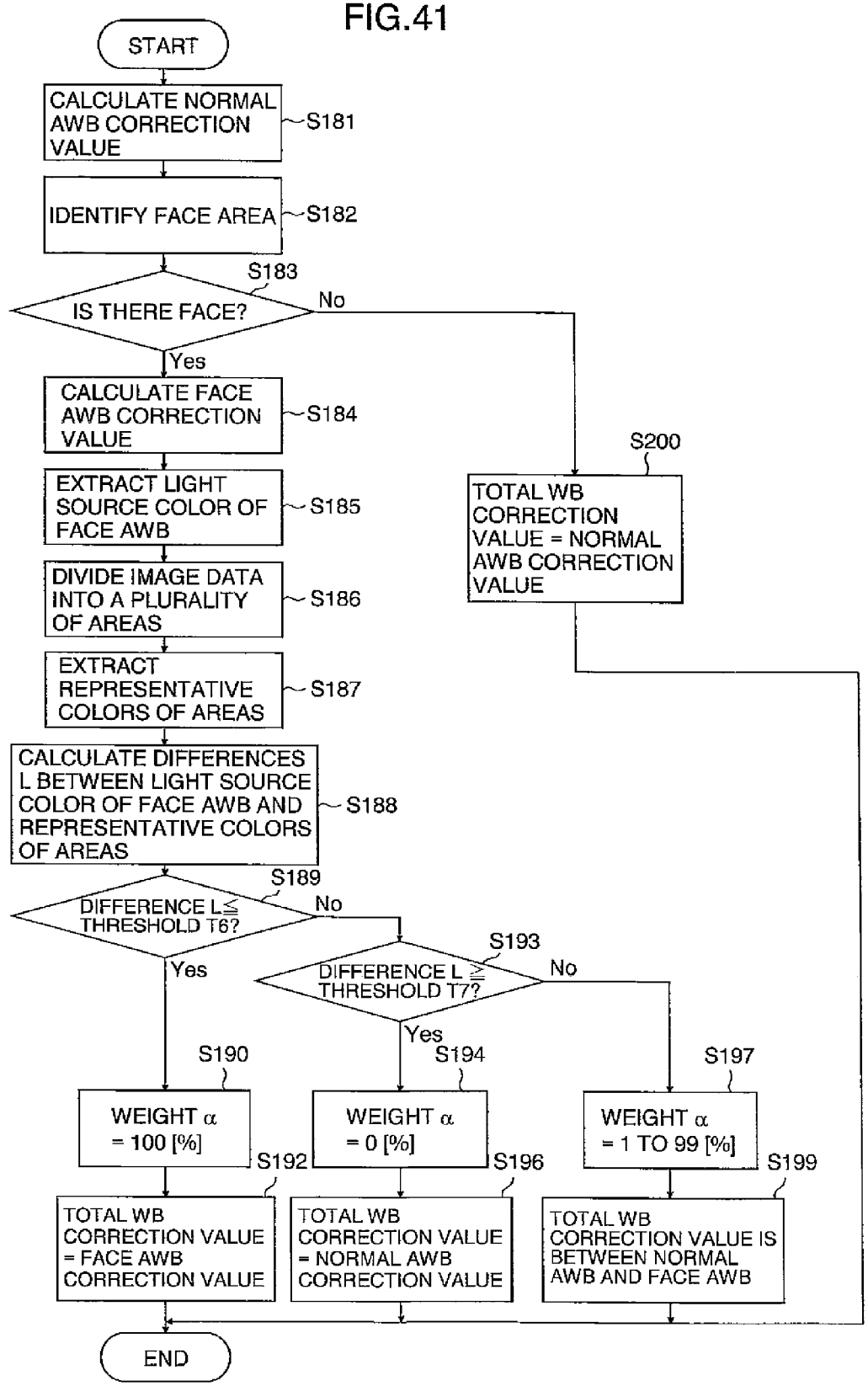
FIG. 41 is a flow chart of a white balance correction process according to the twelfth embodiment.

FIG. 41 is a flow chart of a white balance correction process according to the twelfth embodiment.

Steps S181 to S188 are the same as steps S161 to S168.

Steps S189 to S200 are identical to steps S37 to S48 (FIG. 16). However, thresholds used in steps S189 and S193 are T6 and T7 respectively.

Thirteenth Embodiment

Figure 42:
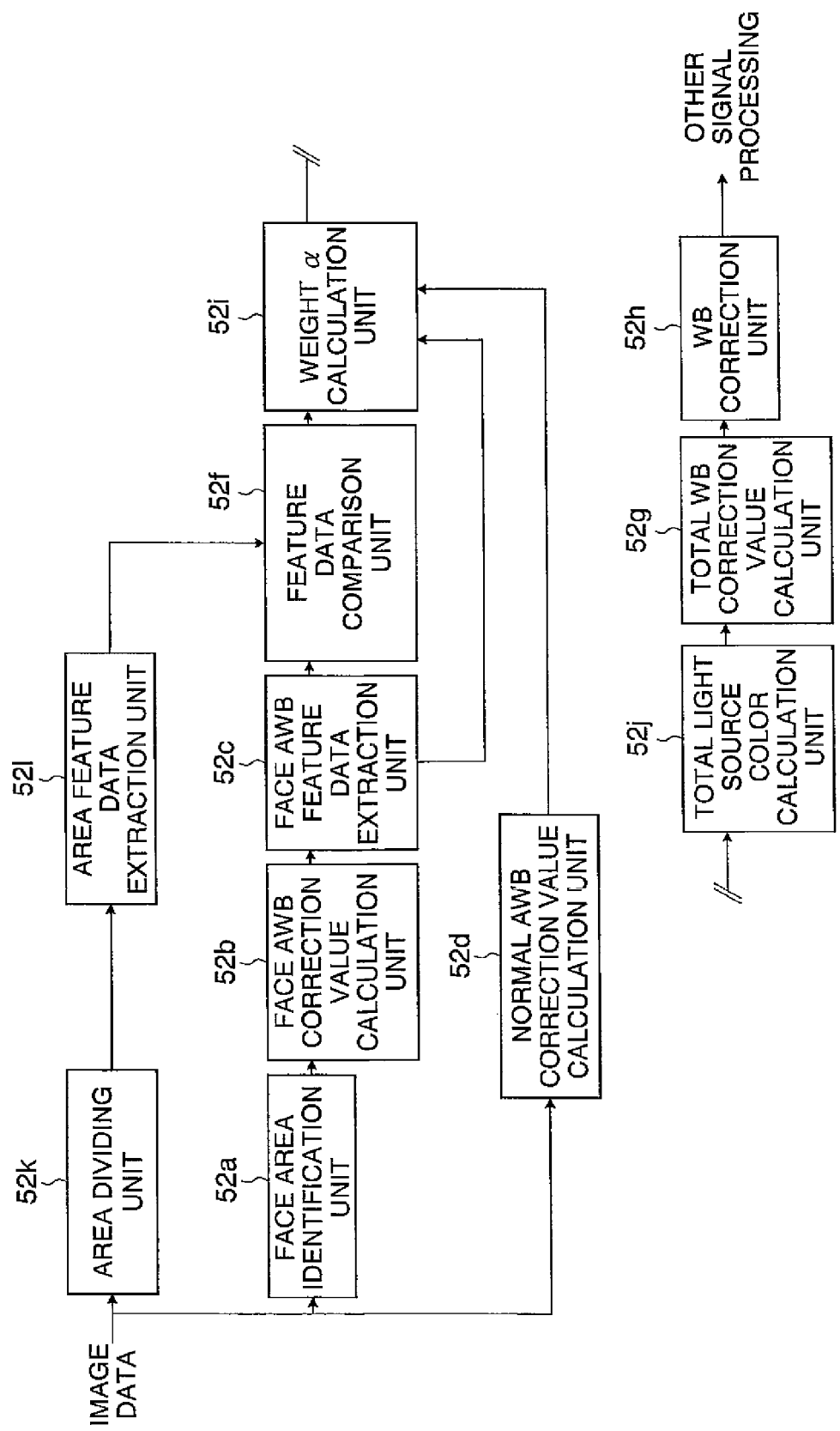
FIG. 42 is a block diagram of the image signal processing circuit according to a thirteenth embodiment.

FIG. 42 illustrates a block configuration of the image signal processing circuit 44 according to a thirteenth embodiment. Like reference numerals refer to like blocks in other embodiments.

Figure 43:
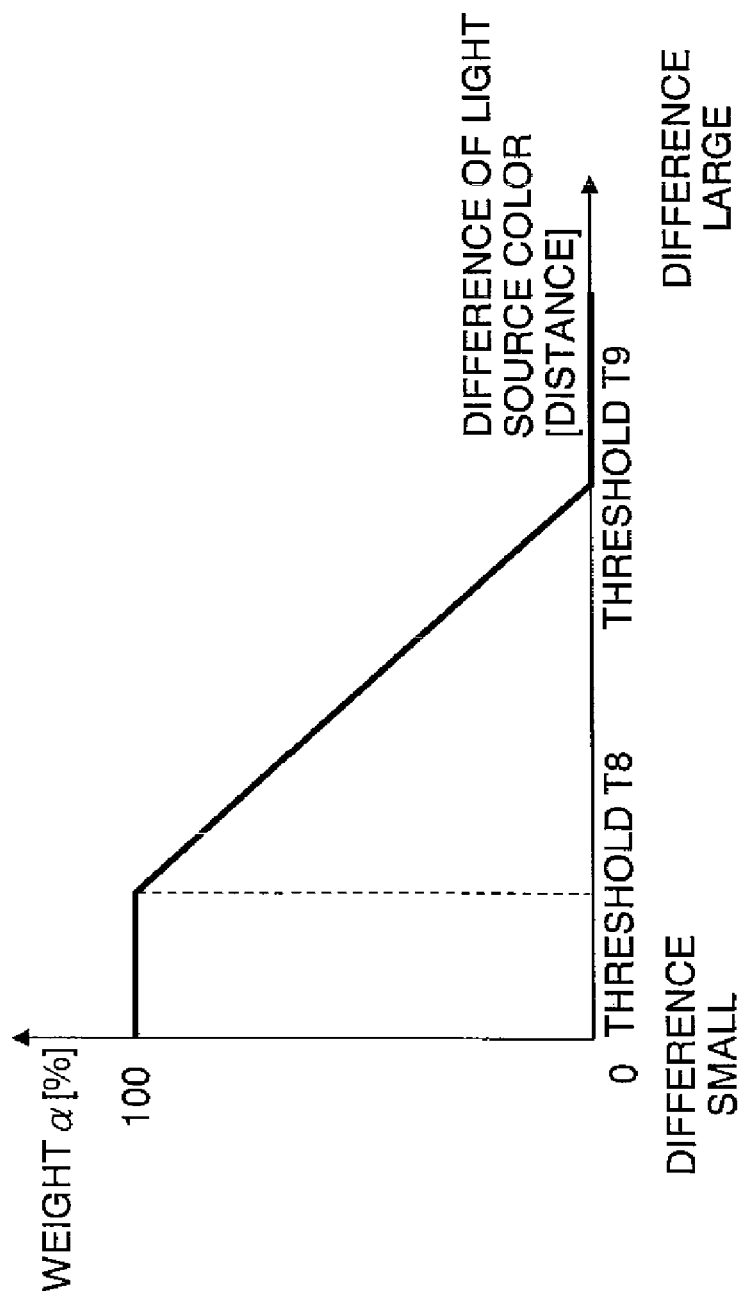
FIG. 43 illustrates a weight α decision function.

The total light source color calculation unit 52j stores a weight decision function, such as the one in FIG. 43, defining the relationship between difference L and weight α and calculates a weight α by identifying the weight α corresponding to the value of difference L from the function.

Figure 44:
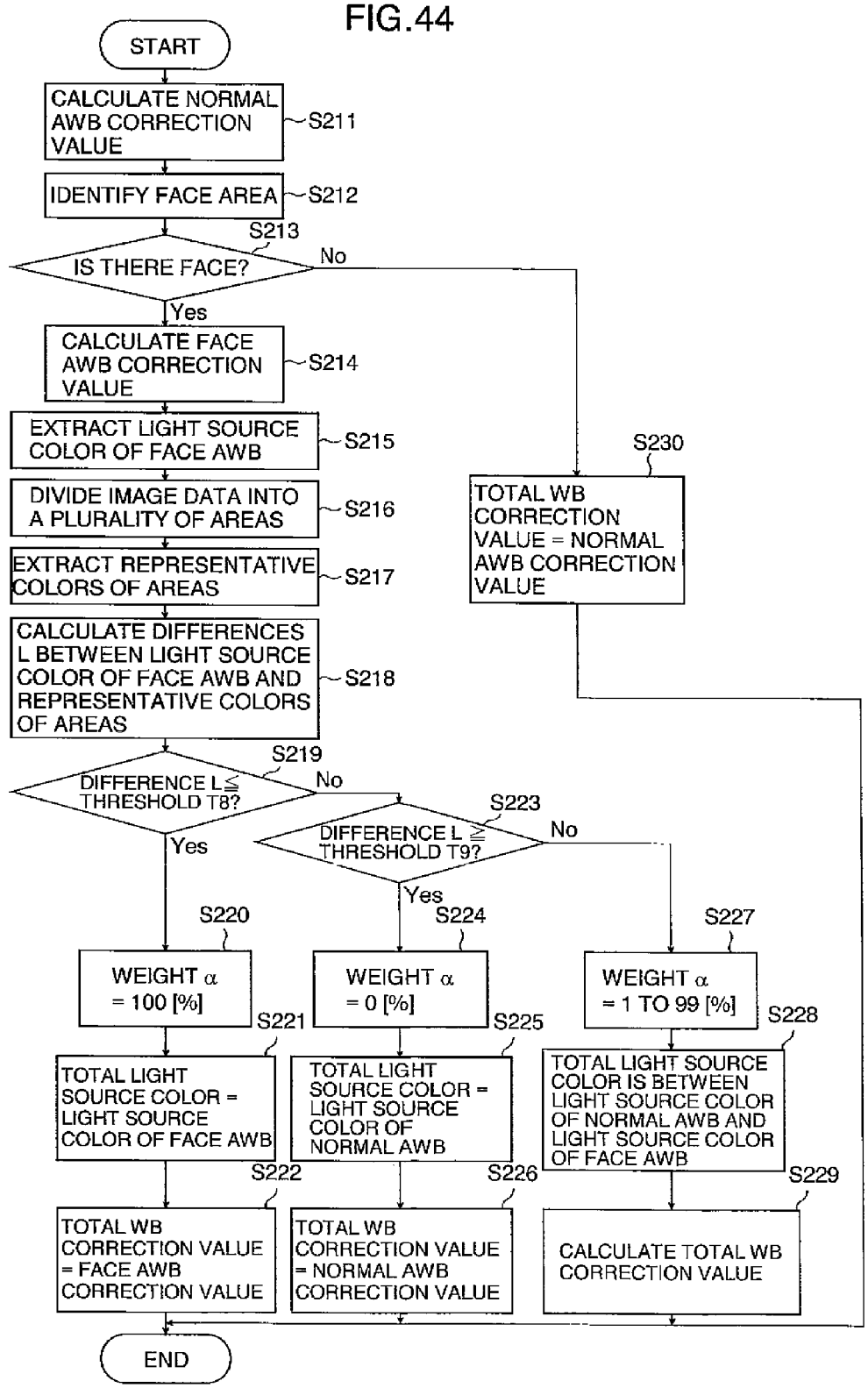
FIG. 44 is a flow chart of a white balance correction process according to the thirteenth embodiment.

FIG. 44 is a flow chart of a white balance correction process according to the thirteenth embodiment.

Steps S211 to S218 are the same as steps S181 to S188.

Steps S219 to S230 are the same as steps S57 to S68 (FIG. 19). However, thresholds used in steps S219 and S223 are T8 and T9 respectively.

Fourteenth Embodiment

Figure 45:
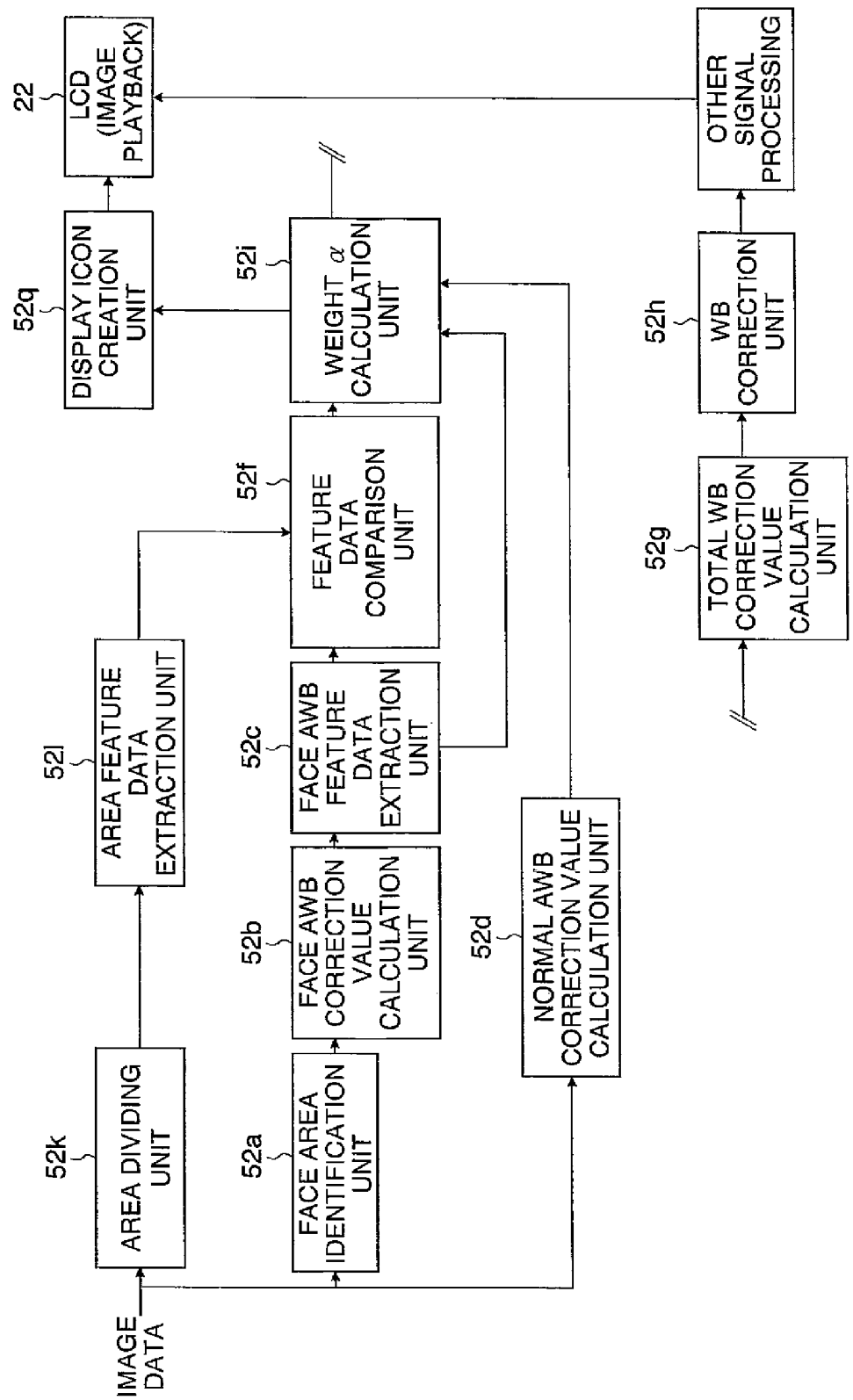
FIG. 45 is a block diagram of the image signal processing circuit according to the fourteenth embodiment.

FIG. 45 illustrates a block configuration of the image signal processing circuit 44 according to a fourteenth embodiment. Like reference numerals refer to like blocks in other embodiments.

Figure 46:
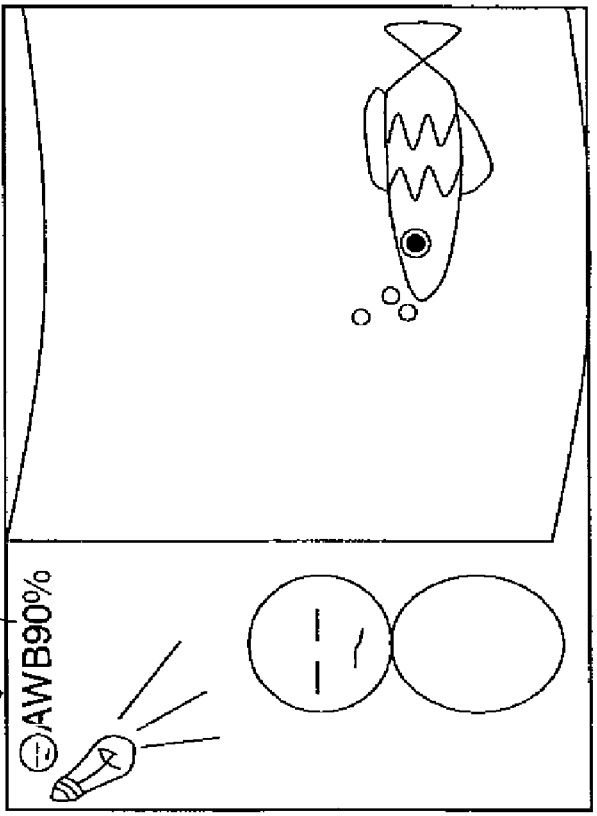
FIG. 46 depicts an example of superimposing of the weight α on image data and displaying of the weight α on post-view.

As illustrated in FIG. 46, a display icon creation unit 52q generates a video signal of an icon IC indicative of weight α ( ), superimposes the video signal on the photographed image data, and outputs the video signal on the LCD 22 to thereby display the video signal with the image.

Figure 47:
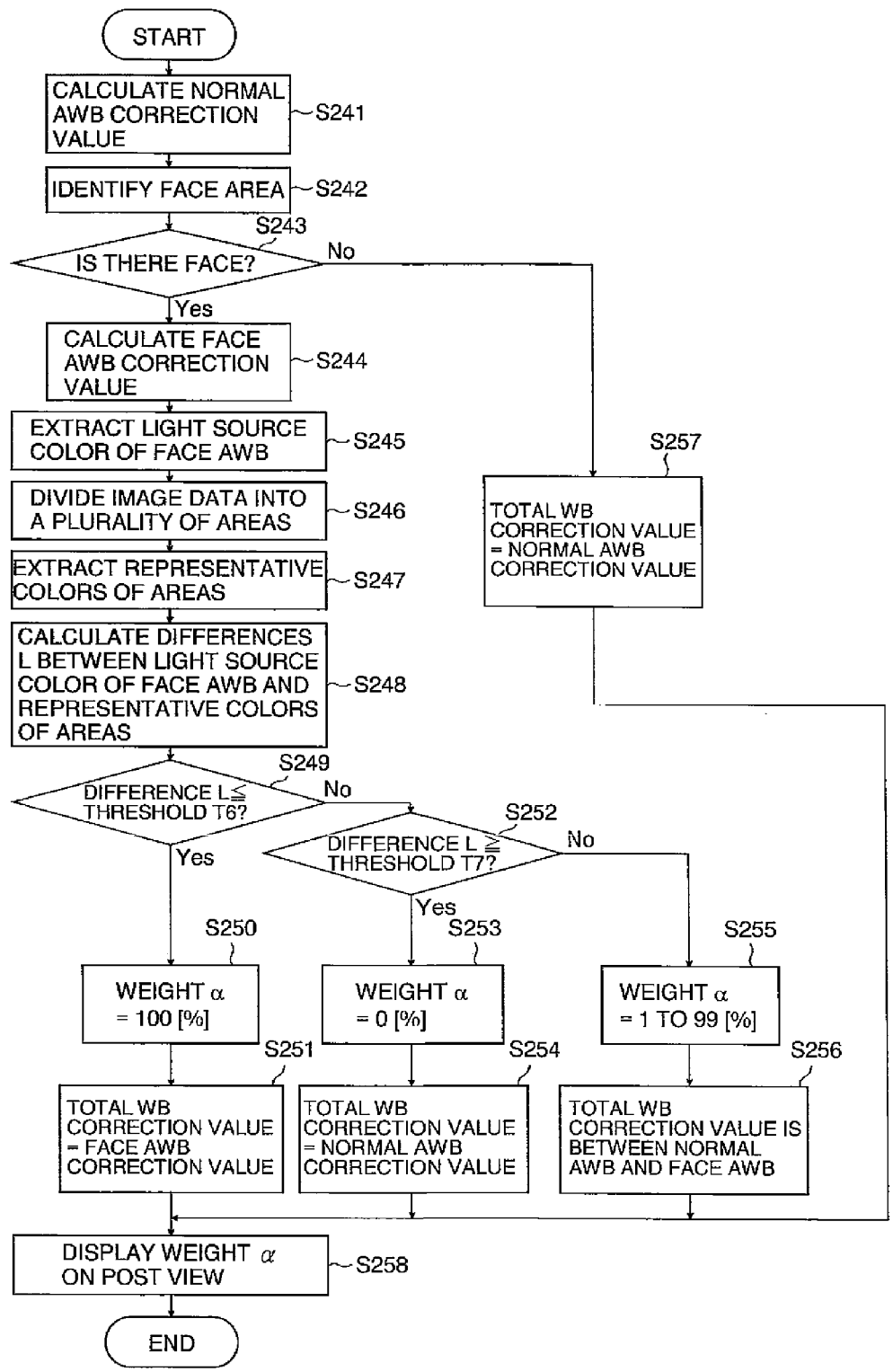
FIG. 47 is a flow chart of a white balance correction process according to the fourteenth embodiment.

FIG. 47 is a flow chart of a white balance correction process according to the fourteenth embodiment.

Steps S241 to S257 are the same as steps 181 to 200 (FIG. 41).

In step S258, a video signal of an icon IC indicative of the weight α is generated, and the video signal is superimposed on the photographed image data, outputted to the LCD 22, and displayed as a post-view (image view after shooting) with the image. This enables for the user to recognize what kind of weight is applied. When visually determining that the weight is inappropriate, the user can retry shooting.

Fifteenth Embodiment

Figure 48:
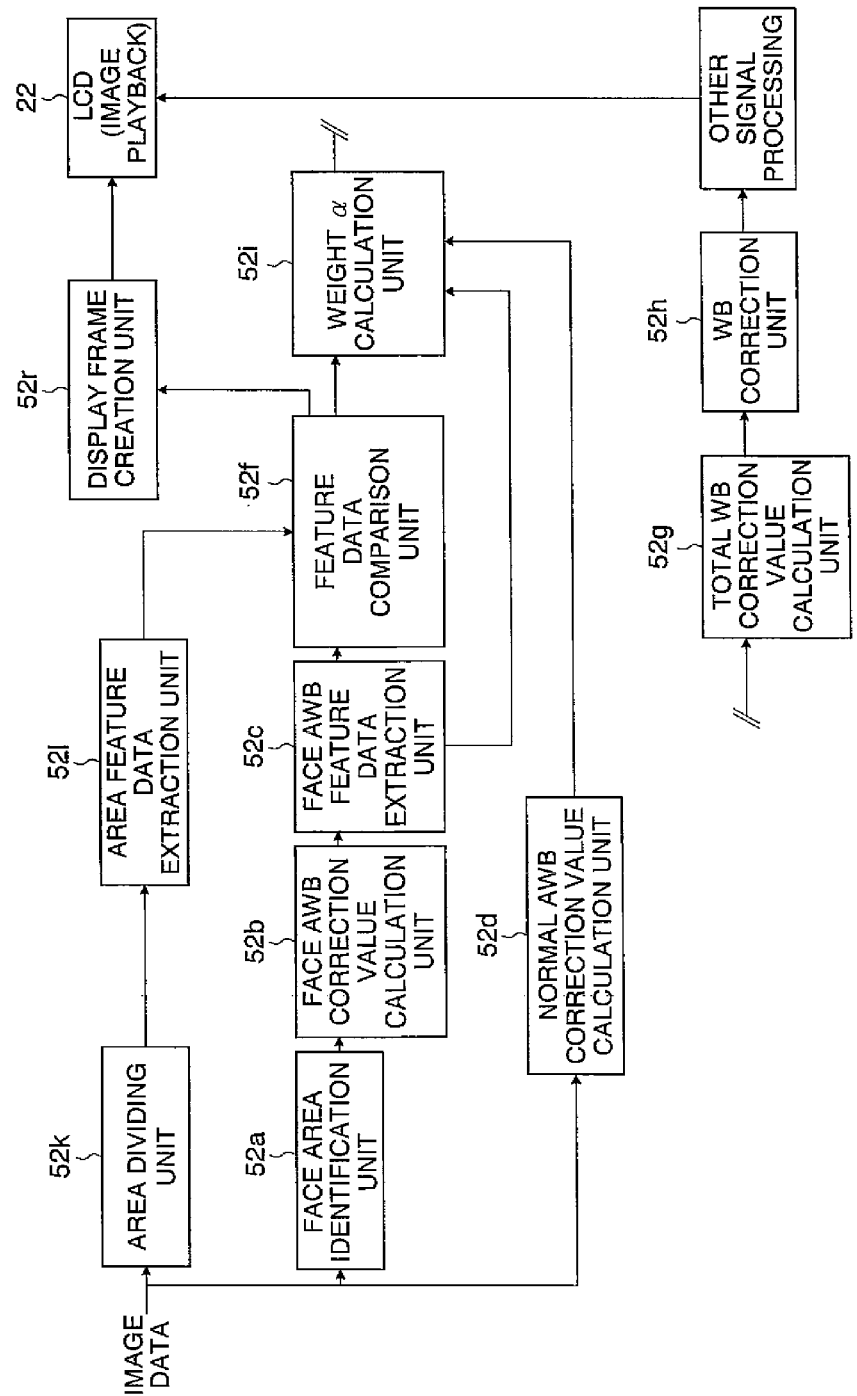
FIG. 48 is a block diagram of the image signal processing circuit according to a fifteenth embodiment.

FIG. 48 illustrates a block configuration of the image signal processing circuit 44 according to a fifteenth embodiment. Like reference numerals refer to like blocks in other embodiments.

Figure 49:
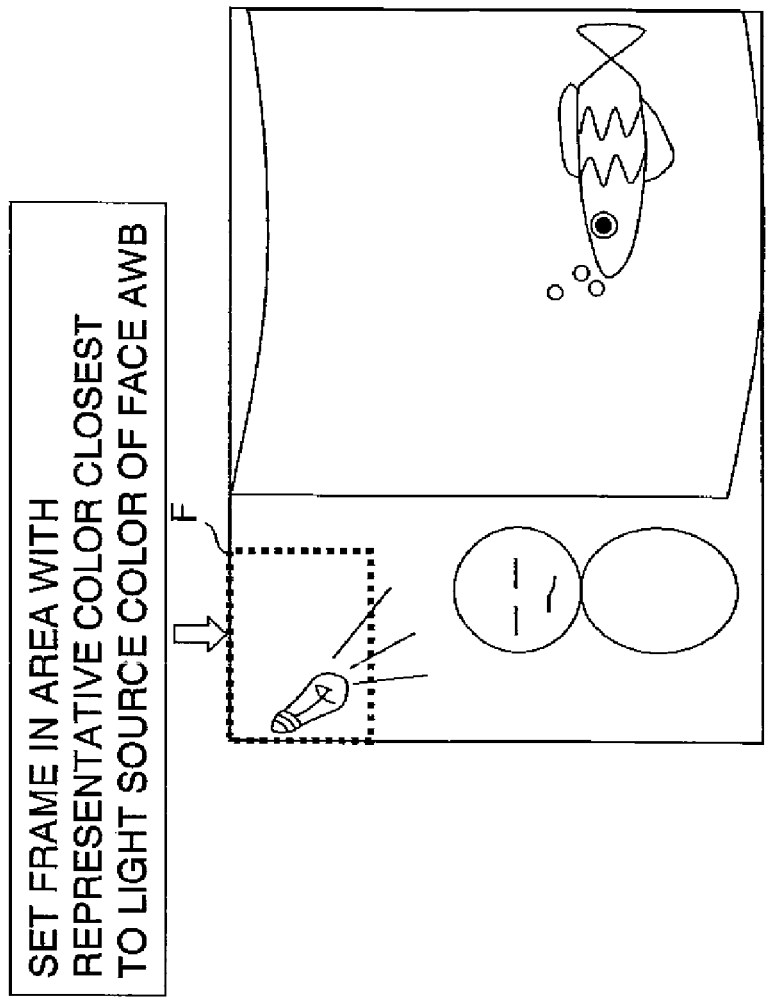
FIG. 49 depicts an example of superimposing of a frame indicative of a divided area, in which a light source color of the face AWB and a representative color of the face AWB are compared, on the image data and displaying of the frame on post-view.

As illustrated in FIG. 49, the display frame creation unit 52q generates a video signal of a frame F indicative of an area having a representative color closest to the light source color of the face AWB, superimposes the video signal on the photographed image data, and outputs the video signal to the LCD 22, thereby displaying the video signal with the image.

Figure 50:
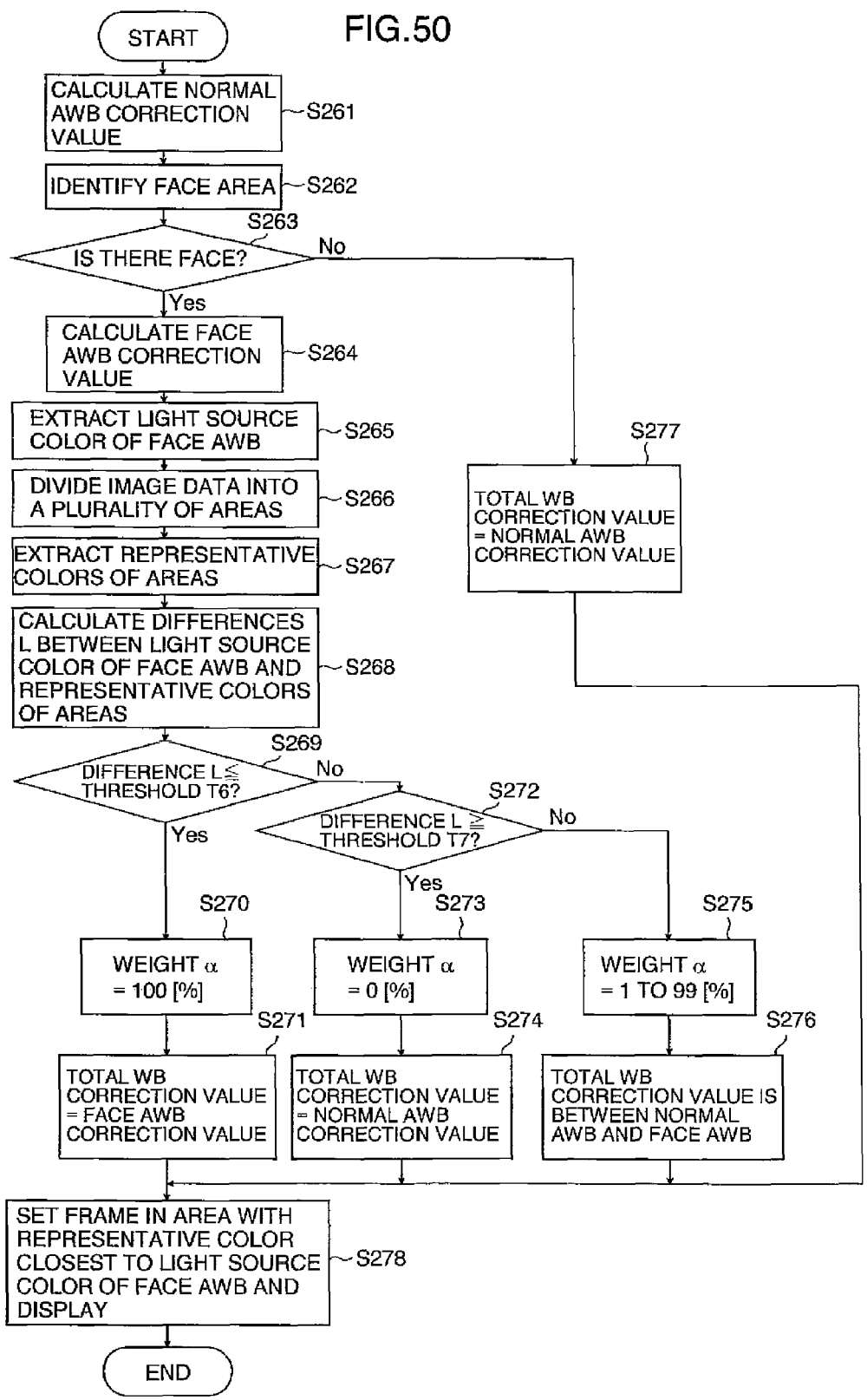
FIG. 50 is a flow chart of a white balance correction process according to the fifteenth embodiment.

FIG. 50 is a flow chart of a white balance correction process according to the fifteenth embodiment.

Steps S261 to S267 are the same as steps S181 to S200.

In step S278, a video signal of the frame F indicative of the area having a representative color closest to the light source color of the face AWB is generated. The video signal is then superimposed on the photographed image data, outputted to the LCD 22, and displayed as a post-view with the image. This enables for the user to recognize which feature data of the areas serves as a reference of the white balance. When visually determining that the reference is inappropriate, the user can retry shooting.

Sixteenth Embodiment

Figure 51:
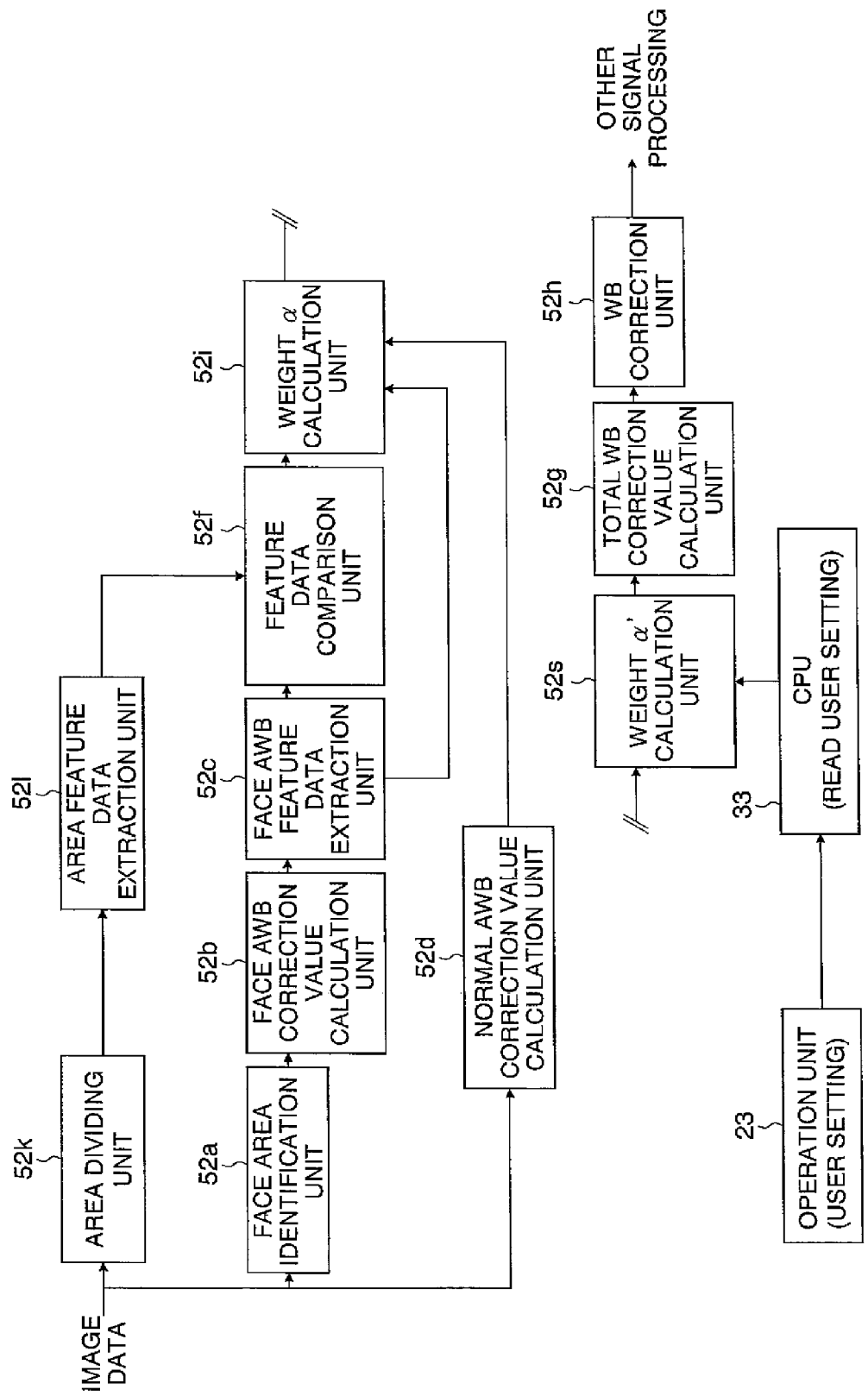
FIG. 51 is a block diagram of the image signal processing circuit according to a sixteenth embodiment.

FIG. 51 illustrates a block configuration of the image signal processing circuit 44 according to a sixteenth embodiment. Like reference numerals refer to like blocks in other embodiments.

A weight α' calculation unit 52s calculates a weight α' based on the priority of the face AWB read from the operation unit 23 in accordance with an instruction of the CPU 33.

The priority of the face AWB includes, for example, three levels: high (the setting priority is higher than a standard priority, and the weight α' is set to be larger than the weight α calculated in the image signal processing circuit 44); middle (the setting priority is the same as the standard priority, and the weight α' is set to be identical to the weight α calculated in the image signal processing circuit 44); and low (the setting priority is lower than the standard priority, and the weight α' is set to be smaller than the weight α calculated in the image signal processing circuit 44). The user can select a desired level from the three levels. Obviously, the high-low levels may have further subdivided levels so that the weight α' can be increased and decreased for a desired width.

FIG. 52 is a flow chart of a white balance correction process according to the sixteenth embodiment.

Steps S281 to S295 are the same as steps S261 to S275 (FIG. 50).

In step S296, the setting of the priority of the face AWB (weight α') is read from the operation unit 23. Whether the set priority of the face AWB (weight α') matches the reference priority of the face AWB (weight α) is determined. If the priorities match, the process proceeds to step S297. If the priorities do not match, the process proceeds to step S298.

In step S297, the total WB correction value is calculated based on the weight α, as in step S47.

In step S298, whether the set priority of the face AWB (weight α') is greater than the reference priority of the face AWB (weight α) is judged. If the judgment is "Y", the process proceeds to step S299. If the judgment is "N", the process proceeds to step S301.

In step S299, the total WB correction value is calculated based on the weight α'. In this case, the weight of the face AWB increases accordingly. Therefore, a total correction value close to the face AWB correction value can be obtained (S300).

In step S301, the total WB correction value is calculated based on the weight α'. In this case, the weight of the face AWB decreases accordingly. Therefore, a total correction value close to the normal AWB correction value can be obtained (S302).

Step S303 is the same as step S277.

In this way, changing of the weights of the face AWB and the normal AWB in accordance with the preference of the user enables to obtain image data intended by the user.

While the image signal processing devices have been explained in detail, the present invention is not limited to the above examples, and needless to say, various improvements and modifications may be added without departing from the scope of the present invention.

For example, by providing a program causing a computer to execute the auto white balance correction value calculation method according to the embodiments and causing a computer on which the program is installed to execute the program, it may be possible to implement the image signal processing devices according to the embodiments. Further, by providing a recording medium on which the program causing a computer to execute the auto white balance correction value calculation method, installing the program on a computer using the recording medium and causing the computer to execute the program, it may be possible to implement the image signal processing devices according to the embodiments.

What is claimed is:

1. An auto white balance correction value calculation method comprising:
   inputting image data;
   calculating a normal AWB correction value, which is a first auto white balance (AWB) correction value, based on the inputted image data;
   identifying a face area from the image data;
   calculating a face AWB correction value, which is a second AWB correction value, based on the face area of the image data;
   extracting first feature data from the image data and extracting second feature data from image data in the face area; and
   selecting one of the face AWB correction value and the normal AWB correction value as a total AWB correction value based on whether the comparison result of the first feature data and the second feature data is equal to or greater than a predetermined threshold or less than the threshold.

2. The auto white balance correction value calculation method according to claim 1, wherein
   the first feature data is a light source color identified based on the image data, and the second feature data is a light source color identified based on the face area.

3. The auto white balance correction value calculation method according to claim 2, further comprising:
   calculating a difference between the light source color of the image data and the light source color of the face area; and
   calculating the total AWB correction value based on the difference.

4. The auto white balance correction value calculation method according to claim 2, further comprising:
   obtaining a total light source color by finding a weighted average of the light source color of the image data and the light source color of the face area with a predetermined weight α, which is 0% or more and 100% or less, based on the comparison result of the first feature data and the second feature data; and
   calculating the total AWB correction value in accordance with the total light source color.

5. The auto white balance correction value calculation method according to claim 4, further comprising
   changing the predetermined weight α depending on a difference between the light source color of the image data and the light source color of the face area.

6. The auto white balance correction value calculation method according to claim 1, further comprising
   calculating the total AWB correction value by obtaining a weighted average of the face AWB correction value and the normal AWB correction value with a predetermined weight α, which is 0% or more and 100% or less, based on the comparison result of the first feature data and the second feature data.

7. A non-transitory recording medium in which an auto white balance correction value calculation program for causing a computer to execute the auto white balance correction value calculation is stored, the program comprising computer-executable instructions of:
   obtaining image data;
   calculating a normal AWB correction value, which is a first auto white balance (AWB) correction value, based on the obtained image data;
   identifying a face area from the image data;
   calculating a face AWB correction value, which is a second AWB correction value, based on the face area of the image data;
   extracting first feature data from the image data and extracting second feature data from image data in the face area; and
   selecting one of the face AWB correction value and the normal AWB correction value as a total AWB correction value based on whether the comparison result of the first feature data and the second feature data is equal to or greater than a predetermined threshold or less than the threshold.

8. An auto white balance correction value calculation device comprising:
   an image data input unit which inputs image data;
   a normal AWB correction value calculation unit which calculates a normal AWB correction value, which is a first auto white balance (AWB) correction value, based on the image data inputted in the image data input unit;
   a face area identification unit which identifies a face area from the image data;
   a face AWB correction value calculation unit which calculates a face AWB correction value, which is a second AWB correction value, based on the face area of the image data;
   a feature data extraction unit which extracts first feature data from the image data and extracts second feature data from the image data in the face area; and
   a total AWB correction value calculation unit which calculates a total AWB correction value to be one of the face AWB correction value and the normal AWB correction value based on whether the comparison result of the first feature data and the second feature data is equal to or greater than a predetermined threshold or less than the threshold.

9. The auto white balance correction value calculation device according to claim 8, wherein
   the first feature data is a light source color identified based on the image data, and the second feature data is a light source color identified based on the face area.

10. The auto white balance correction value calculation device according to claim 9, further comprising
    a difference calculation unit which calculates a difference between the light source color of the image data and the light source color of the face area, wherein
    the total AWB correction value calculation unit calculates the total AWB correction value based on the difference.

11. The auto white balance correction value calculation device according to claim 9, further comprising
    a total light source color calculation unit which obtains a total light source color by finding a weighted average of the light source color of the image data and the light source color of the face area with the predetermined weight α, which is 0% or more and 100% or less, based on the comparison result of the first feature data and the second feature data, wherein
    the total AWB correction value calculation unit calculates the total AWB correction value in accordance with the total light source color.

12. The auto white balance correction value calculation device according to claim 8, wherein
    the total AWB correction value calculation unit selects one of the face AWB correction value and the normal AWB correction value as the total AWB correction value based on the comparison result of the first feature data and the second feature data.

13. The auto white balance correction value calculation device according to claim 8, wherein
the total AWB correction value calculation unit calculates the total AWB correction value by obtaining a weighted average of the face AWB correction value and the normal AWB correction value with a predetermined weight α, which is 0% or more and 100% or less, based on the comparison result of the first feature data and the second feature data.

14. An image pickup device comprising:
an auto white balance correction value calculation device according to claim 8;
an image pickup element which receives an object image through a photographing optical system and outputs an analog image signal indicative of the object image;
an image data output unit which converts the analog image signal to digital image data and outputs the digital image data to the image data input unit; and
a correction unit which corrects a white balance of the image data based on the total AWB correction value calculated by the auto white balance correction value calculation device.

* * * * *